United States Patent
Ogawa et al.

(10) Patent No.: US 6,631,704 B2
(45) Date of Patent: Oct. 14, 2003

(54) CONTROL SYSTEM AND METHOD AND ENGINE CONTROL UNIT FOR INTERNAL COMBUSTION ENGINE

(75) Inventors: Ken Ogawa, Saitama-ken (JP); Toru Kimura, Saitama-ken (JP); Yutaka Kohda, Saitama-ken (JP); Kazuhiro Ueda, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 22 days.

(21) Appl. No.: 09/927,865

(22) Filed: Aug. 10, 2001

(65) Prior Publication Data

US 2002/0020386 A1 Feb. 21, 2002

(30) Foreign Application Priority Data

Aug. 10, 2000 (JP) ........................................ 2000-243380

(51) Int. Cl.⁷ .......................... F02B 17/00; G06F 19/00
(52) U.S. Cl. ...................... 123/295; 123/698; 123/299; 701/104
(58) Field of Search ................................ 123/295, 299, 123/443, 568.19, 568.11, 568.21, 298, 305, 309, 698; 701/103, 104, 108

(56) References Cited

U.S. PATENT DOCUMENTS

| | | | | | |
|---|---|---|---|---|---|
| 5,775,099 A | * | 7/1998 | Ito et al. | ........................ | 60/274 |
| 5,970,950 A | * | 10/1999 | Shimizu et al. | ............... | 123/295 |
| 5,979,396 A | * | 11/1999 | Yasuoka | ....................... | 123/295 |
| 6,029,622 A | * | 2/2000 | Kadota et al. | ............... | 123/295 |
| 6,062,191 A | * | 5/2000 | Ooba | ............................ | 123/295 |
| 6,073,606 A | * | 6/2000 | Shimizu et al. | .............. | 123/295 |
| 6,116,208 A | * | 9/2000 | Nishimura et al. | .......... | 123/295 |
| 6,142,117 A | * | 11/2000 | Hori et al. | ..................... | 123/295 |
| 6,209,516 B1 | * | 4/2001 | Yamashita | .................... | 123/305 |
| 6,234,139 B1 | * | 5/2001 | Taga et al. | ..................... | 123/295 |
| 6,283,089 B1 | * | 9/2001 | Fuwa et al. | ................... | 123/295 |
| 6,293,246 B1 | * | 9/2001 | Tanahashi et al. | ........... | 123/305 |
| 6,298,835 B1 | * | 10/2001 | Horie et al. | ............ | 123/568.21 |
| 6,354,264 B1 | * | 3/2002 | Iwakiri et al. | ................ | 123/305 |
| 6,422,200 B1 | * | 7/2002 | Morikawa et al. | ........... | 123/305 |
| 6,439,189 B1 | * | 8/2002 | Esteghlal et al. | ............ | 123/295 |
| 6,470,850 B1 | * | 10/2002 | Sasaki et al. | ................. | 123/305 |

FOREIGN PATENT DOCUMENTS

JP     130007    *  5/2002   ........... F02D/41/04

* cited by examiner

*Primary Examiner*—Hieu T. Vo
*Assistant Examiner*—Hai Huynh
(74) *Attorney, Agent, or Firm*—Lahive & Cockfield, LLP

(57) ABSTRACT

There are provided a control system and method and an engine control unit for an internal combustion engine, which are capable of determining an amount of fuel to be injected during a two-stage fuel injection combustion mode and a duration period of this mode such that stable combustion and smooth transition between combustion and smooth transition between combustion modes are ensured. The control system includes an ECU and a crank angle sensor. The ECU calculates a demanded torque PME demanded of the engine, and determines which of the homogenous combustion mode, the stratified combustion mode, and the two-stage fuel injection combustion mode should be selected as the combustion mode of the engine, based on the demanded torque PME. The ECU determines an injection time period ToutD during the compression stroke in two-stage fuel injection combustion mode based on the engine rotational speed.

45 Claims, 27 Drawing Sheets

F I G. 1 1
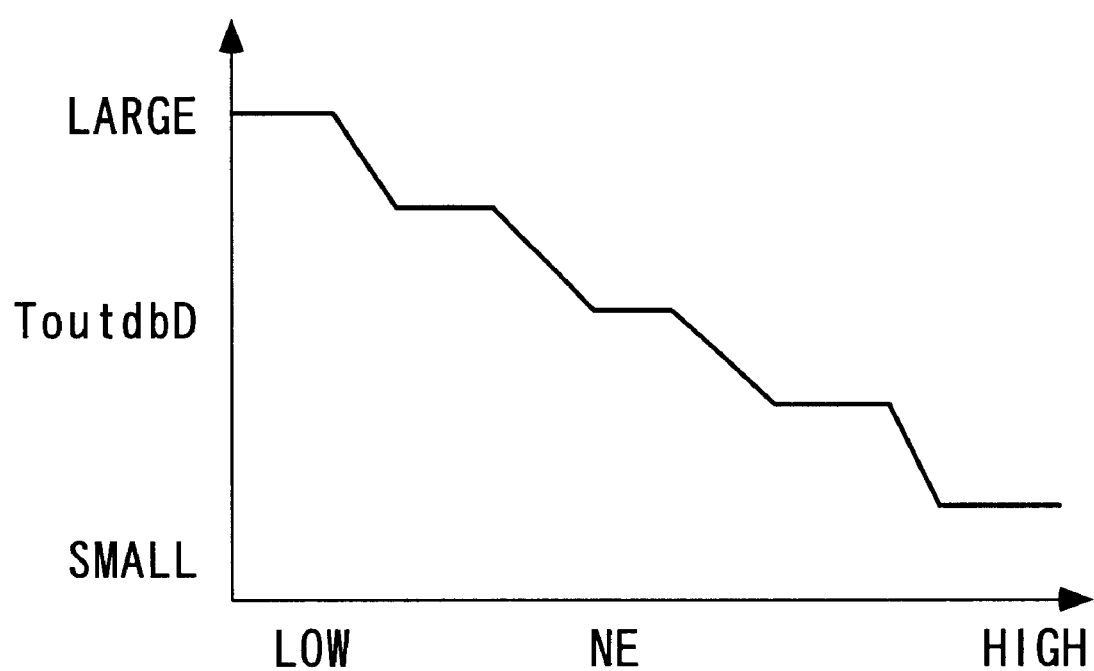

F I G. 1 3
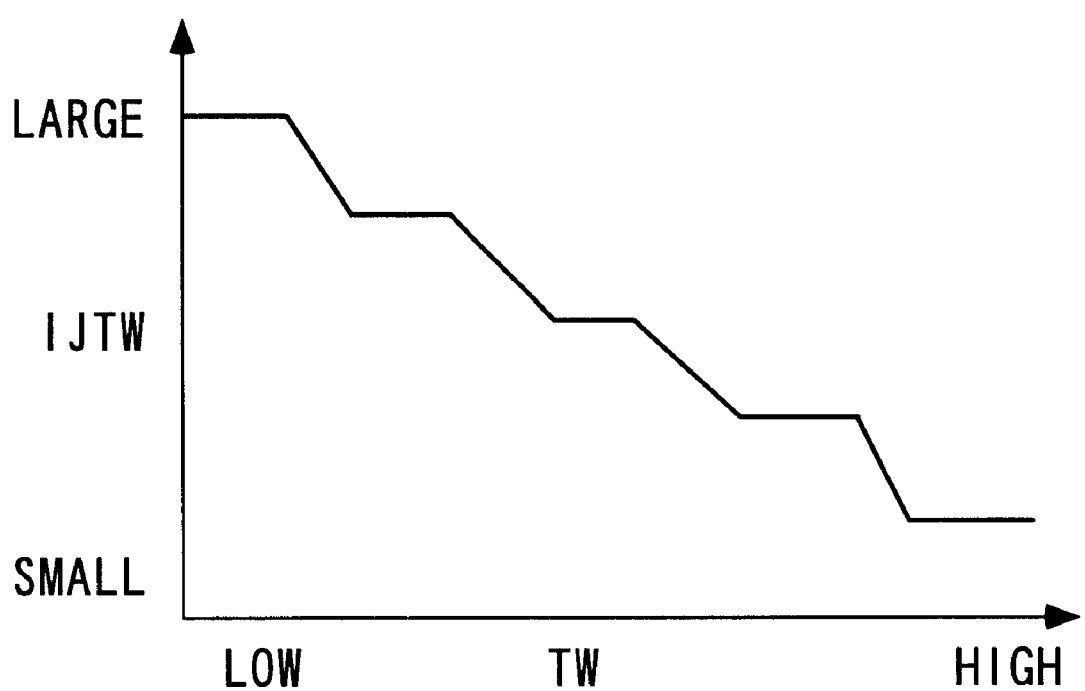

CONTROL SYSTEM AND METHOD AND ENGINE CONTROL UNIT FOR INTERNAL COMBUSTION ENGINE

RELATED APPLICATION

This application claims priority to Japanese Patent Application No. 243380/2000, filed on Aug. 10, 2000 in Japan. The contents of the aforementioned application are hereby incorporated by reference.

BACKGROUND OF THE INVENTION

1. Field of the Invention

This invention relates to a control system and method and an engine control unit for an internal combustion engine of an in-cylinder fuel injection type, the engine being operated while switching a combustion mode thereof between a homogeneous combustion mode in which fuel injection into each cylinder is performed during an intake stroke, a stratified combustion mode in which the fuel injection into the cylinder is performed during a compression stroke, and a two-stage fuel injection combustion mode in which the fuel injection into the cylinder is performed once during the intake stroke and once during the compression stroke during transition between the homogeneous combustion mode and the stratified combustion mode.

2. Description of the Prior Art

Conventionally, a fuel injection control system of the above-mentioned kind has been proposed e.g. by Japanese Laid-Open Patent Publication (Kokai) No. 11-82135. In this control system, the combustion mode of the engine is selected from the stratified combustion mode, the homogeneous combustion mode, and the two-stage fuel injection combustion mode, depending on the engine rotational speed and a target torque, and the engine is controlled to enter the two-stage fuel injection combustion mode when the combustion mode is switched between the stratified combustion mode and the homogeneous combustion mode so as to reduce torque steps. In the two-stage fuel injection combustion mode, a final fuel injection amount which is the sum total of two amounts of fuel to be injected during the compression stroke and during the intake stroke, respectively, is determined based on the intake air amount and the engine rotational speed, and one of the two amounts is set to a fixed amount, while the other is determined by subtracting the one amount (fixed amount) from the final fuel injection amount. Then, the fuel injection is performed during the compression stroke and during the intake stroke by using the one and the other amounts of fuel thus determined.

Further, another control system of the same kind has been proposed in Japanese Laid-Open Patent Publication (Kokai) No. 11-93731. An internal combustion engine incorporating this control system includes a swirl control valve for control of a swirl of fuel, and an EGR control valve for control of the EGR rate. In this control system as well, similarly to the above control system, the combustion mode of the engine is selected from the stratified combustion mode, the homogeneous combustion mode, and the two-stage fuel injection combustion mode, depending on the engine rotational speed and a target fuel injection amount (target torque). Further, the engine is controlled to enter the two-stage fuel injection combustion mode when the combustion mode is switched between the stratified combustion mode and the homogeneous combustion mode, and the duration period of the two-stage fuel injection combustion mode is determined based on a difference between a target value of the degree of opening of the swirl control valve and an actually detected value of the same.

A still another control system of the same kind has been proposed in Japanese Laid-Open Patent Publication (Kokai) No. 11-22508. Similarly to the above control system, this control system also selects the stratified combustion mode or the homogeneous combustion mode depending on the engine rotational speed and engine load, and the engine is controlled to enter the two-stage fuel injection combustion mode when the combustion mode is switched between the stratified combustion mode and the homogeneous combustion mode. In the two-stage fuel injection combustion mode, the target air-fuel ratio (equivalent ratio) is progressively changed between a rich value for the homogeneous combustion mode and a lean value for the stratified combustion mode by using a weighted mean value of the target air-fuel ratio. Further, the total fuel injection amount is divided into respective amounts of fuel for injections during the intake stroke and during the compression stroke such that a ratio between the divided amounts is also progressively changed, to thereby reduce torque steps.

Of the three conventional control systems described above, the first-mentioned control system sets one of the respective amounts of fuel to be injected during the compression stroke and during the intake stroke to a fixed value in the two-stage fuel injection combustion mode, and hence if an operating condition of the engine, particularly the engine rotational speed, has changed during this mode, the state of flow of air within the cylinder is changed to vary the minimum fuel injection amount in which injected fuel can be ignited during the compression stroke, which sometimes hinders an appropriate air-fuel mixture from being formed. As result, the state of combustion of the engine becomes unstable to cause undesired variation in the engine output, which degraded drivability and fuel economy.

Generally, when EGR control is executed, the EGR rate has a significant influence on the combustion of the mixture, and it is necessary to properly control the EGR rate to ensure the stability of combustion of the engine. Also, in general, so long as the torque demanded of the engine is identical, the degree of opening of a throttle valve and the EGR rate set by the EGR control valve are controlled to respective fairly larger values in the stratified combustion mode than in the homogeneous combustion mode, so that during transition from one of these modes to the other, it takes time for the EGR control valve controlled to a target valve lift amount for one of these combustion modes to be changed to a target value lift amount for the other. That is, the EGR control valve has the lowest response of all devices directly related to the fuel combustion of the engine, and at the same time the most significant influence thereon. The second-mentioned control system, however, merely determines the duration period of the two-stage fuel injection combustion mode based on the difference between the target value of the degree of opening of the swirl control valve and the actually detected value of the same, so that shortage or excess of the EGR rate due to delayed response of the EGR control valve can make the combustion unstable upon termination of the two-stage fuel injection combustion mode. This leads, similarly to the case of the first-mentioned control system, to degraded fuel economy, and degraded drivability due to undesired variation of the engine output.

Further, the third-mentioned conventional control system only progressively changes the target air-fuel ratio in the two-stage fuel injection combustion mode between the rich value suitable for the homogeneous combustion mode and the lean value suitable for the stratified combustion mode, so that when an operating condition of the engine has changed during the two-stage fuel injection combustion mode, the torque actually generated can deviate from a target torque. This causes torque steps upon termination of the two-stage fuel injection combustion mode, leading to degraded drivability.

SUMMARY OF THE INVENTION

It is an object of the invention to provide a control system and method and an engine control unit for an internal combustion engine, which are capable of properly determining an amount of fuel to be injected during a two-stage fuel injection combustion mode and a duration period of the two-stage fuel injection fuel combustion mode, such that stable combustion and smooth transition between combustion modes are ensured, thereby attaining excellent drivability and fuel economy.

To attain the above object, according to a first aspect of the invention, there is provided a control system for an internal combustion engine of an in-cylinder fuel injection type, the engine being operated while switching a combustion mode thereof between a homogeneous combustion mode in which fuel injection into each cylinder is performed during an intake stroke, a stratified combustion mode in which the fuel injection into the cylinder is performed during a compression stroke, and a two-stage fuel injection combustion mode in which the fuel injection into the cylinder is performed once during the intake stroke and once during the compression stroke during transition between the homogeneous combustion mode and the stratified combustion mode.

The control system according to the first aspect of the invention is characterized by comprising:
 a demanded torque-calculating module for calculating a demanded torque which is demanded of the engine;
 an engine rotational speed-detecting module for detecting a rotational speed of the engine;
 a combustion mode-determining module for determining, based on the calculated demanded torque, which of the homogeneous combustion mode, the stratified combustion mode, and the two-stage fuel injection combustion mode should be selected as the combustion mode; and
 a fuel injection amount-determining module for determining an amount of fuel to be injected during the compression stroke in the two-stage fuel injection combustion mode, based on the detected rotational speed of the engine.

According to this control system for an internal combustion engine, the combustion mode-determining module determines, based on the demanded torque which is demanded of the engine, which of the homogeneous combustion mode, the stratified combustion mode, and the two-stage fuel injection combustion mode should be selected as the combustion mode. Further, when the selected combustion mode is the two-stage fuel injection combustion mode, the amount of fuel to be injected during the compression stroke is determined by the fuel injection amount-determining module based on the rotational speed of the engine. This makes it possible to set the amount of fuel to be injected during the compression stroke in the two-stage fuel injection mode to the minimum amount in which the injected fuel can be ignited, while taking into account a change in the flow of air within the cylinder caused by a change in the rotational speed of the engine even when the change in the flow of air within the cylinder is caused.

Conversely, it is possible to secure as long a fuel injection time period as possible for the intake stroke in which an air-fuel mixture in an easily flammable condition is produced. As a result, it is possible to ensure stable combustion of fuel injected in the two-stage fuel injection combustion mode, and excellent fuel economy and drivability.

To attain the above object, according to a second aspect of the invention, there is provided a control method for an internal combustion engine of an in-cylinder fuel injection type, the engine being operated while switching a combustion mode thereof between a homogeneous combustion mode in which fuel injection into each cylinder is performed during an intake stroke, a stratified combustion mode in which the fuel injection into the cylinder is performed during a compression stroke, and a two-stage fuel injection combustion mode in which the fuel injection into the cylinder is performed once during the intake stroke and once during the compression stroke during transition between the homogeneous combustion mode and the stratified combustion mode.

The control method according to the second aspect of the invention is characterized by comprising the steps of:
 calculating a demanded torque which is demanded of the engine;
 detecting a rotational speed of the engine;
 determining, based on the calculated demanded torque, which of the homogeneous combustion mode, the stratified combustion mode, and the two-stage fuel injection combustion mode should be selected as the combustion mode; and
 determining an amount of fuel to be injected during the compression stroke in the two-stage fuel injection combustion mode, based on the detected rotational speed of the engine.

This control method provides the same advantageous effects as described above concerning the control system according to the first aspect of the invention.

To attain the above object, according to a third aspect of the invention, there is provided an engine control unit including a control program for causing a computer to carry out control of an internal combustion engine of an in-cylinder fuel injection type, the engine being operated while switching a combustion mode thereof between a homogeneous combustion mode in which fuel injection into each cylinder is performed during an intake stroke, a stratified combustion mode in which the fuel injection into the cylinder is performed during a compression stroke, and a two-stage fuel injection combustion mode in which the fuel injection into the cylinder is performed once during the intake stroke and once during the compression stroke during transition between the homogeneous combustion mode and the stratified combustion mode.

The engine control unit according to the third aspect of the invention is characterized in that the control program causes the computer to calculate a demanded torque which is demanded of the engine, detect a rotational speed of the engine, determine, based on the calculated demanded torque, which of the homogeneous combustion mode, the stratified combustion mode, and the two-stage fuel injection combustion mode should be selected as the combustion mode, and determine an amount of fuel to be injected during the compression stroke in the two-stage fuel injection combustion mode, based on the detected rotational speed of the engine.

This engine control unit provides the same advantageous effects as described above concerning the control system according to the first aspect of the invention.

Preferably, the control system further includes a storage module for storing data of a fuel injection timing for the homogeneous combustion mode and a fuel injection timing for the stratified combustion mode, which are set in advance in a manner correlated to an operating condition of the engine, an operating condition-detecting module for detecting the operating condition of the engine, and a fuel injection timing-setting module for setting a fuel injection timing during the intake stroke and a fuel injection timing during the compression stroke in the two-stage fuel injection combustion mode, to the fuel injection timing for the homogeneous combustion mode and the fuel injection timing for the stratified combustion mode, respectively, in dependence on the detected operating condition of the engine.

According to this preferred embodiment of the control system, the fuel injection timing during the intake stroke and that during the compression stroke in the two-stage fuel injection combustion mode are set by the fuel injection timing-determining module to the fuel injection timing for the homogeneous combustion mode and that for the stratified combustion mode stored in the storage module, respectively, in dependence on the detected operating condition of the engine. This makes it possible to execute fuel injection during the intake stroke and that during the compression stroke in the two-stage fuel injection combustion mode at respective appropriate timings. Further, it is not necessary to separately or additionally provide a device for determining these fuel injection timings in the two-stage fuel injection combustion mode or software therefor, so that the manufacturing costs can be reduced by so much amount.

Preferably, the control method further includes the steps of storing data of a fuel injection timing for the homogeneous combustion mode and a fuel injection timing for the stratified combustion mode, which are set in advance in a manner correlated to an operating condition of the engine, detecting the operating condition of the engine, and setting a fuel injection timing during the intake stroke and a fuel injection timing during the compression stroke in the two-stage fuel injection combustion mode, to the fuel injection timing for the homogeneous combustion mode and the fuel injection timing for the stratified combustion mode, respectively, in dependence on the detected operating condition of the engine.

This preferred embodiment of the control method provides the same advantageous effects as provided by the corresponding preferred embodiment of the control system.

Preferably, the control program further causes the computer to store data of a fuel injection timing for the homogeneous combustion mode and a fuel injection timing for the stratified combustion mode, which are set in advance in a manner correlated to an operating condition of the engine, detect the operating condition of the engine, and set a fuel injection timing during the intake stroke and a fuel injection timing during the compression stroke in the two-stage fuel injection combustion mode, to the fuel injection timing for the homogeneous combustion mode and the fuel injection timing for the stratified combustion mode, respectively, in dependence on the detected operating condition of the engine.

This preferred embodiment of the engine control unit provides the same advantageous effects as provided by the corresponding preferred embodiment of the control system.

More preferably, the control system further includes an ignition timing-determining module for determining ignition timing for the two-stage fuel injection combustion mode, based on the detected rotational speed of the engine and the fuel injection timing for the stratified combustion mode.

As described hereinabove, while the engine rotational speed has a significant influence on the stability of combustion in the two-stage fuel injection combustion mode, the fuel injection timing during the compression stroke in the two-stage fuel injection combustion mode is the fuel injection timing for the stratified combustion mode. The fuel injected this time is involved in the ignition of the whole injected fuel. According to this preferred embodiment of the control system, the ignition timing-determining module determines the ignition timing in the two-stage fuel injection combustion mode based on the engine rotational speed and the fuel injection timing for the stratified combustion mode. This makes it possible to set the ignition timing such that stable or reliable ignition can be ensured in the two-stage fuel injection raw combustion mode, whereby further stable combustion can be ensured.

More preferably, the control method further includes the step of determining ignition timing for the two-stage fuel injection combustion mode, based on the detected rotational speed of the engine and the fuel injection timing for the stratified combustion mode.

This preferred embodiment of the control method provides the same advantageous effects as provided by the corresponding preferred embodiment of the control system.

More preferably, the control program further causes the computer to determine ignition timing for the two-stage fuel injection combustion mode, based on the detected rotational speed of the engine and the fuel injection timing for the stratified combustion mode.

This preferred embodiment of the engine control unit provides the same advantageous effects as provided by the corresponding preferred embodiment of the control system.

The engine includes an intake system, and preferably, the control system further includes an EGR control valve for controlling an EGR rate at which exhaust gases are recirculated into the intake system, and a duration period-determining module for determining a duration period of the two-stage fuel injection combustion mode, based on a parameter indicative of response of the EGR control valve.

According to this preferred embodiment of the control system, the duration period-determining module determines the duration period of the two-stage fuel injection combustion mode in dependence on a parameter indicative of the response of the EGR control valve. This enables the two-stage fuel injection combustion mode to be continued until the actual valve lift amount of the EGR control valve is positively changed such that it becomes substantially equal to the target valve lift amount of the EGR control valve set for a combustion mode following the present two-stage fuel injection combustion mode. As a result, the stable combustion can be ensured upon termination of the two-stage fuel injection combustion mode, whereby stable drivability in which the engine output variation is small can be ensured. Further, since the duration period of the two-stage fuel injection combustion mode is determined as described above, it can be reduced to the minimum necessary time period, whereby the degradation of fuel economy can be prevented.

The engine includes an intake system and an EGR control valve, and preferably, the control method further includes the steps of controlling an EGR rate at which exhaust gases are recirculated via the EGR control valve into the intake system, and determining a duration period of the two-stage fuel injection combustion mode, based on a parameter indicative of response of the EGR control valve.

This preferred embodiment of the control method provides the same advantageous effects as provided by the corresponding preferred embodiment of the control system.

The engine includes an intake system and an EGR control valve, and preferably, the control program further causes the computer to control an EGR rate at which exhaust gases are recirculated via the EGR control valve into the intake system, and determine a duration period of the two-stage fuel injection combustion mode, based on a parameter indicative of response of the EGR control valve.

This preferred embodiment of the engine control unit provides the same advantageous effects as provided by the corresponding preferred embodiment of the control system.

Preferably, the fuel injection amount-determining module sets the amount fuel to be injected during the compression stroke in the two-stage fuel injection combustion mode to a smaller valve as the rotational speed of the engine is higher.

Preferably, the step of determining the amount of fuel to be injected includes setting the amount fuel to be injected during the compression stroke in the two-stage fuel injection combustion mode to a smaller valve as the rotational speed of the engine is higher.

Preferably, when the control program causes the computer to determine the amount of fuel to be injected, the control program causes the computer to set the amount fuel to be injected during the compression stroke in the two-stage fuel injection combustion mode to a smaller valve as the rotational speed of the engine is higher.

More preferably, the control system includes an applied mode-changing module for causing a total amount of fuel for the two-stage fuel injection combustion mode to be injected at an injection timing for the stratified combustion mode, if a sum total of the amount of fuel to be injected during the compression stroke in the two-stage fuel injection combustion mode determined by the fuel injection amount-determining module and a predetermined fuel injection amount is equal to or smaller than the total amount of fuel.

More preferably, the control method includes the step of causing a total amount of fuel for the two-stage fuel injection combustion mode to be injected at an injection timing for the stratified combustion mode, if a sum total of the amount of fuel to be injected during the compression stroke in the two-stage fuel injection combustion mode determined by the step of determining the amount of fuel to be injected and a predetermined fuel injection amount is equal to or smaller than the total amount of fuel.

More preferably, the control program causes the computer to cause a total amount of fuel for the two-stage fuel injection combustion mode to be injected at an injection timing for the stratified combustion mode, if a sum total of the determined amount of fuel to be injected during the compression stroke in the two-stage fuel injection combustion mode and a predetermined fuel injection amount is equal to or smaller than the total amount of fuel.

More preferably, the homogeneous combustion mode comprises a stoichiometric combustion mode in which an air-fuel mixture having an air-fuel ratio equal to or richer than a stoichiometric air fuel ratio is burned, and a lean combustion mode in which an air-fuel mixture having an air-fuel ratio leaner than the stoichiometric air-fuel ratio is burned, and the fuel injection timing-setting module sets the fuel injection timing during the intake stroke in the two-stage fuel injection combustion mode to a fuel injection timing for the stoichiometric combustion mode when a combustion mode preceding the two-stage fuel injection combustion mode is the stoichiometric combustion mode, and to a fuel injection timing for the lean combustion mode when the combustion mode preceding the two-stage fuel injection combustion mode is other than the stoichiometric combustion mode.

More preferably, the homogeneous combustion mode comprises a stoichiometric combustion mode in which an air-fuel mixture having an air-fuel ratio equal to or richer than a stoichiometric air fuel ratio is burned, and a lean combustion mode in which an air-fuel mixture having an air-fuel ratio leaner than the stoichiometric air-fuel ratio is burned, and the step of setting the fuel injection timing includes setting the fuel injection timing during the intake stroke in the two-stage fuel injection combustion mode to a fuel injection timing for the stoichiometric combustion mode when a combustion mode preceding the two-stage fuel injection combustion mode is the stoichiometric combustion mode, and to a fuel injection timing for the lean combustion mode when the combustion mode preceding the two-stage fuel injection combustion mode is other than the stoichiometric combustion mode.

More preferably, the homogeneous combustion mode comprises a stoichiometric combustion mode in which an air-fuel mixture having an air-fuel ratio equal to or richer than a stoichiometric air fuel ratio is burned, and a lean combustion mode in which an air-fuel mixture having an air-fuel ratio leaner than the stoichiometric air-fuel ratio is burned, and when the control program causes the computer to set the fuel injection timing, the control program causes the computer to set the fuel injection timing during the intake stroke in the two-stage fuel injection combustion mode to a fuel injection timing for the stoichiometric combustion mode when a combustion mode preceding the two-stage fuel injection combustion mode is the stoichiometric combustion mode, and to a fuel injection timing for the lean combustion mode when the combustion mode preceding the two-stage fuel injection combustion mode is other than the stoichiometric combustion mode.

Preferably, the control system further includes an operation control values-setting module for setting at least a target air-fuel ratio, a target EGR rate, a fuel injection timing, and an ignition timing, in dependence on the combustion mode determined to be selected.

According to this preferred embodiment of the control system, the operation control values-setting module sets at least a target air-fuel ratio, a target EGR rate, a fuel injection timing, and an ignition timing, in dependence on the combustion mode determined to be selected, and therefore, by using these parameters, it is possible to control the two-stage fuel injection combustion mode and the combustion modes before and after the two-stage fuel injection combustion mode such that the torque generated by the engine becomes equal to the demanded torque. As a result, differently from the prior art, it is possible to prevent torque steps from being caused upon the start or the termination of the two-stage fuel injection combustion mode.

Preferably, the control method includes the step of setting at least a target air-fuel ratio, a target EGR rate, a fuel injection timing, and an ignition timing, in dependence on the combustion mode determined to be selected.

This preferred embodiment of the control method provides the same advantageous effects as provided by the corresponding preferred embodiment of the control system.

Preferably, the control program causes the computer to set at least a target air-fuel ratio, a target EGR rate, a fuel injection timing, and an ignition timing, in dependence on the combustion mode determined to be selected.

This preferred embodiment of the engine control unit provides the same advantageous effects as provided by the corresponding preferred embodiment of the control system.

The engine includes a fuel injection valve for injecting the fuel into the cylinder, the cylinder having a top wall facing a combustion chamber, and preferably, the fuel injection valve is arranged in a central portion of the top wall such that the fuel injection valve injects the fuel downward therefrom.

According to this preferred embodiment, the advantageous effects by the control system and method and the engine control unit according to the respective aspects of the invention and their preferred embodiments described above can be obtained in an optimized manner.

The above and other objects, features, and advantages of the invention will become more apparent from the following detailed description taken in conjunction with the accompanying drawings.

BRIEF DESCRIPTION OF THE DRAWINGS

FIG. 11 shows an example of an NE-ToutdbD table;

FIG. 13 shows an example of a TW-IJTW table;

DETAILED DESCRIPTION OF THE PREFERRED EMBODIMENT

Figure 1:
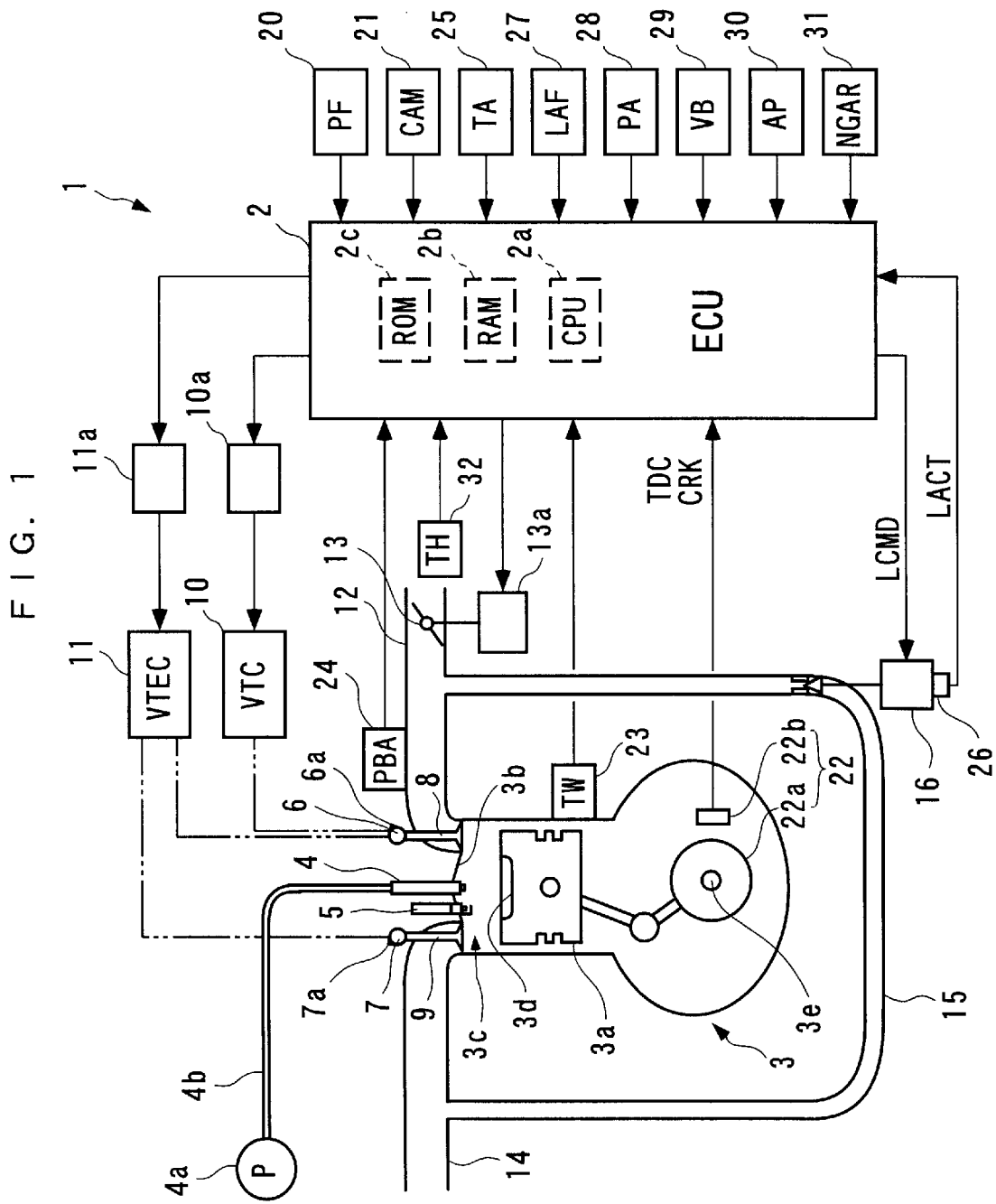
FIG. 1 is a block diagram schematically showing the arrangement of an internal combustion engine incorporating a control system therefor according to an embodiment of the invention.

The invention will now be described in detail with reference to the drawings showing a preferred embodiment thereof. Referring first to FIG. 1, there is schematically shown the arrangement of a control system for an internal combustion engine, according to an embodiment of the invention. As shown in the figure, the control system 1 includes an ECU 2. The ECU 2 carries out a fuel injection control process, an ignition timing control process, and a combustion mode transition-determining process for the internal combustion engine 3 (hereinafter simply referred to as "the engine 3").

The engine 3 is a straight type four-cylinder gasoline engine for an automotive vehicle, not shown. The engine 3 has four cylinders (only one of which is shown) in each of which a combustion chamber 3c is formed between the piston 3a and a cylinder head 3b. The piston 3a has a central portion of a top surface thereof formed with a recess 3d. The cylinder head 3b has a fuel injection valve 4 (hereinafter simply referred to as "the injector 4") and a spark plug 5 mounted therein such that they face the combustion chamber 3c. The engine 3 is a so-called in-cylinder fuel injection type in which fuel is directly injected into the combustion chamber 3c.

The injector 4 is arranged in a central portion of a top wall of the combustion chamber 3c and connected to a high-pressure pump 4b via a fuel pipe 4a. Fuel is pressurized by the high-pressure pump to a high pressure, and then supplied to the injector 4 in a state of the pressure thereof regulated by a regulator, not shown. The fuel is injected from the injector 4 toward the recess 3d of the piston 3a, and hits the top surface of the piston 3a including the recess 3d to form fuel jets. Particularly, in a stratified combustion mode, referred to hereinafter, most of the fuel injected by the injector 4 hits the recess 3d to form fuel jets.

A fuel pressure sensor 20 is mounted in a portion of the fuel pipe 4a at a location in the vicinity of the injector 4. The fuel pressure sensor 20 detects a fuel pressure PF of the fuel injected by the injector 4 and delivers a signal indicative of the sensed fuel pressure PF to the ECU 2. Further, the injector 4 is electrically connected to the ECU 2, and a final fuel injection time period Tout (i.e. fuel injection amount) over which the injector 4 is open and a fuel injection timing θinj (i.e. a valve-opening timing and a valve-closing timing of the injector 4) are controlled by a drive signal delivered from the ECU 2 to the injector 4, as referred to hereinafter.

The spark plug 5 is also connected to the ECU 2, and a high voltage is applied to the spark plug 5 at an ignition timing IG indicated by a drive signal delivered from the ECU 2, for electric discharge, whereby an air-fuel mixture is burned in the combustion chamber 3c.

The engine 3 is of a DOHC type and includes an intake camshaft 6 and an exhaust camshaft 7. The intake and exhaust cam shafts 6 and 7 have intake cams 6a and exhaust cams 7a, respectively, for opening and closing the intake valves 8 and exhaust valves 9. The intake and exhaust camshafts 6, 7 are connected to a crankshaft 3e via a timing belt, not shown, and each rotate once for every two rotations of the crankshaft 3e. The intake camshaft 6 has one end thereof provided with a cam phase change mechanism (hereinafter referred to as "VTC") 10.

The VTC 10 is driven by oil pressure, for continuously or steplessly advancing or retarding the phase angle (hereinafter referred to as "the cam phase CAIN") of the intake cam 6a relative to the crankshaft 3e, whereby the opening/closing timing of each intake valve 8 is advanced or retarded. This increases or decreases a valve overlap of the intake valve 8 and the exhaust valve 9, to thereby increase or decrease an internal EGR rate, and change the changing efficiency. The VTC 10 has a solenoid control valve 10a connected thereto which is driven by a drive signal from the ECU 2 to supply the oil pressure from an hydraulic pump, not shown, of a lubricating system of the engine 3 to the VTC 10, according to the duty ratio of the drive signal. Thus, the VTC 10 is controlled by the ECU 2 via the solenoid control valve 11, for advancing or retarding the cam phase CAIN.

A cam angle sensor 21 is arranged at the other end of the intake camshaft 6 opposite to the one end at which the VTC 10 is arranged. The cam angle sensor 21 is comprised e.g. of a magnet rotor and an MRE (magnetic resistance element) pickup, and delivers a CAM signal, which is a pulse signal, to the ECU 2 whenever the intake camshaft 6 rotates through a predetermined cam angle (e.g. one degree). The ECU 2 determines the actual cam phase CAIN from the CAM signal and a CRK signal, referred to hereinafter.

Further, although not shown in the figure, the intake cam 6a and the exhaust cam 7a are each comprised of a low-speed cam, and a high-speed cam having a higher cam nose than that of the low-speed cam. Further, the engine 3 is provided with a plurality of valve timing changeover mechanisms 11 (hereinafter referred to as "the VTEC's 11"). Each VTEC 11 switches each of the intake cam 6a and the exhaust cam 7a of each cylinder between the low-speed cam and the high-speed cam, to thereby change the valve timing of the intake valve 8 and the exhaust valve 9 between a low-speed valve timing (hereinafter referred to as "LO.VT") and a high-speed valve timing (hereinafter referred to as "HI.VT"). During the HI.VT, the valve-opening time periods over which the respective intake valve 8 and exhaust valve 9 are open and the valve overlap over which they are simultaneously open become longer and the valve lift amounts of them also become larger than during the LO.VT, thereby realizing a higher charging efficiency. The VTEC 11 is also driven by oil pressure supplied via a VTEC solenoid control valve 11a driven by the ECU 2, for execution of the above switching operations.

Further, the valve timing is set to LO.VT in a lean combustion mode included in a homogeneous combustion mode, the stratified combustion mode, and a two-stage fuel injection combustion mode, all referred to hereinafter, whereas it is set to HI.VT in a stoichiometric combustion mode and a rich combustion mode included in the homogeneous combustion mode, referred to hereinafter.

The crankshaft 3e has a magnet rotor 22a fitted thereon which constitutes a crank angle position sensor 22 together with an MRE (magnetic resistance element) pickup 22b. The crank angle position sensor 22 (engine rotational speed-detecting module, operating condition-detecting module) delivers to the ECU 2 the CRK signal and a TDC signal, which are both pulse signals, in accordance with rotation of the crankshaft 3e.

Each pulse of the CRK signal (CRK signal pulse) is generated whenever the crankshaft 3e rotates through a predetermined angle (e.g. 30 degrees). The ECU 2 determines a rotational speed NE (parameter indicative of an operating condition of the engine, hereinafter referred to as "the engine rotational speed NE") of the engine 3, based on the CRK signal. The TDC signal (TDC signal pulse) is indicative of a predetermined crank angle position of each cylinder in the vicinity of a top dead center (TDC) position at the start of an intake stroke of the piston 3a in the cylinder, and each pulse of the TDC signal is generated whenever the crankshaft rotates through 180 degrees in the case of the four-cylinder engine 3 according to the embodiment. Further, the engine 3 is provided with a cylinder-discriminating sensor, not shown. The cylinder-discriminating sensor generates a cylinder-discriminating signal, which is a pulse signal for discriminating each cylinder from the other ones, to deliver the signal to the ECU 2. The ECU 2 determines which of the strokes and which crank angle position in the determined stroke each cylinder is in, based on the cylinder-discriminating signal, the CRK signal, and the TDC signal.

An engine coolant temperature sensor 23 (operating condition-detecting module) formed of a thermistor is mounted in the cylinder block of the engine 3. The engine coolant temperature sensor 23 senses an engine coolant temperature TW (parameter indicative of an operating condition of the engine) which is a temperature of an engine coolant circulating within the cylinder block of the engine 3, and supplies an electric signal indicative of the sensed engine coolant temperature to the ECU 2.

The engine 3 has an intake pipe 12 having a throttle valve 13 arranged therein. The throttle valve 13 is driven by an electric motor 13a connected thereto to have its throttle valve opening (degree of opening of the throttle valve) TH varied. Further, attached to the throttle valve 7 is a throttle valve opening sensor 32 which senses the throttle valve opening TH of the throttle valve 7 to deliver a signal indicative of the sensed throttle valve opening TH to the ECU 2. The ECU 2 controls the throttle valve opening TH via the electric motor 13a in dependence on the operating conditions of the engine 3, to thereby control the amount of intake air supplied to the engine 3.

At a location downstream of the throttle valve 13 arranged in the intake pipe 12, there is arranged an intake pipe absolute pressure sensor 24 in a manner inserted into the intake pipe 12. The intake pipe absolute pressure sensor 24 is formed e.g. by a semiconductor pressure sensor, and senses an intake pipe absolute pressure PBA within the intake pipe 12 to deliver a signal indicative of the sensed absolute pressure PBA to the ECU 2. Further, an intake air temperature sensor 25 is inserted into the intake pipe 12. The intake air temperature sensor 25 is formed of a thermistor, and senses an intake air temperature TA within the intake pipe 12 to deliver a signal indicative of the sensed intake air temperature TA to the ECU 2.

Further, the engine 3 has an EGR pipe 15 connecting between a portion of the intake pipe 12 at a location downstream of the throttle valve and a portion of an exhaust pipe 14 at a location upstream of a catalytic device, not shown, arranged in the exhaust pipe 14. Exhaust gases emitted from the engine 3 are recirculated to an intake side of the engine 3 through the EGR pipe 15 to lower a combustion temperature within the combustion chamber 3c, whereby EGR operation is carried out to reduce NOx contained in the exhaust gases.

The EGR pipe 15 has an EGR control valve 16 mounted therein. The EGR control valve 16 is formed by a linear solenoid valve. The amount of valve lift (valve lift amount) of the EGR control valve 15 is changed linearly in response to a drive signal from the ECU 2, whereby the EGR pipe 15 is opened and closed. The EGR control valve 16 is provided with a valve lift sensor 26 that senses an actual valve lift amount LACT of the EGR control valve 16 to deliver a signal indicative of the sensed valve lift amount to the ECU 2.

The ECU 2 calculates a target valve lift amount LCMD (target EGR rate) of the EGR control valve 16 in dependence on operating conditions of the engine 3 and controls the EGR control valve 12 such that the actual valve lift amount LACT becomes equal to the target valve lift amount LCMD, to thereby control the EGR rate. The calculation of the target valve lift amount LCMD will be described in detail hereinafter.

A LAF sensor 27 is arranged in the exhaust pipe 14 at a location upstream of the catalyst device. The LAF sensor 27 is comprised of zirconia and platinum electrodes, and linearly detects the concentration of oxygen in exhaust gases in a broad air-fuel ratio range from a rich region to a lean region, to deliver a signal proportional to the sensed concentration of oxygen to the ECU 2. Further, an 02 sensor, not shown, is arranged in the exhaust pipe 14 at a location downstream of the catalyst device, for detecting oxygen concentration of exhaust gases on a downstream side of the catalyst device to deliver a signal having a signal value proportional to the detected oxygen concentration.

Further, the engine 3 has an atmospheric pressure sensor 28 mounted thereto. The atmospheric pressure sensor 28 is formed e.g. by a semiconductor pressure sensor and senses atmospheric pressure PA to deliver a signal indicative of the sensed atmospheric pressure PA to the ECU 2. Further, the ECU 2 has a battery voltage sensor 29 connected thereto. The battery voltage sensor 29 detects a voltage VB of a battery, not shown, which supplies a drive voltage to the injectors 4, and delivers a signal indicative of the sensed voltage VB to the ECU 2.

An accelerator pedal sensor 30 is mounted in an automotive vehicle on which the engine 3 is installed. The accelerator pedal sensor 30 detects an accelerator pedal opening AP, which represents an operation amount or stepping amount of an accelerator pedal, not shown, and delivers a signal indicative of the sensed accelerator pedal opening AP to the ECU 2. Further, an automatic transmission, not shown, of the engine 3 has a gear stage sensor 31 attached thereto, for detecting a gear stage NGAR of the automatic transmission to send a signal indicative of the detected gear stage to the ECU 2.

The ECU 2 (demanded torque-calculating module, engine rotational speed-detecting module, combustion mode-determining module, fuel injection amount-determining module, operating condition-detecting module, fuel injection timing-determining module, ignition timing-determining module, duration period-determining module, operation control values-setting module) is formed by a microcomputer (not shown) including a CPU 2a, a RAM 2b, a ROM 2c, and an I/O interface (not shown). The signals input from the sensors 20 to 32 to the ECU 2 are each delivered to the I/O interface for A/D conversion and waveform shaping, and then input into the CPU 2a. The CPU 2a carries out various kinds of arithmetic operations based on control programs, various tables and maps, referred to hereinafter, stored in the ROM 2c (storage module), and various flags and calculation values, referred to hereinafter, stored in the RAM 2b.

More specifically, the ECU 2 determines an operating condition of the engine from various signals of those described above, and switches the combustion mode (mode of combustion) of the engine 3 based on the result of the determination, e.g. to the stratified combustion mode when the engine is under a very low load operating condition e.g. during idling of the engine, and to the homogeneous combustion mode when the engine is in an operating condition other than the very low load operating condition. In switching the combustion mode, the ECU 2 sets the engine 3 to the two-stage fuel injection combustion mode. Further, in dependence on the combustion mode, the ECU 2 controls a final fuel injection period Tout and a fuel injection timing θinj for each injector 4 to thereby execute the fuel injection control process including the air-fuel ratio (A/F) feedback control, and at the same time, controls ignition timing IG of the spark plugs 5 and so forth.

In the stratified combustion mode, fuel is injected into the combustion chamber 3c during the compression stroke such that most of the injected fuel hits against the recess 3d, thereby forming fuel jets. The fuel jets and a flow of air taken in from the intake pipe 12 form an air-fuel mixture. At this time, the piston 3a in the compression stroke is near the top dead center position, which causes the air-fuel mixture which is extremely leaner than the stoichiometric air-fuel ratio (e.g. 27 to 60) to be unevenly distributed in the combustion chamber i.e. concentrated in the vicinity of the spark plug 5 whereby the mixture is burned by stratified combustion.

On the other hand, in the homogeneous combustion mode, fuel is injected into the combustion chamber 3c during the intake stroke such that a richer air-fuel mixture (having an air-fuel ratio of e.g. 12 to 22) than an air-fuel mixture in the stratified combustion mode is formed by fuel jets and a flow of air and homogeneously distributed in the combustion chamber 3c, whereby the mixture is burned by homogeneous combustion.

Further, in the two-stage fuel injection combustion mode, fuel injection is carried out two times per cycle of engine operation, with a time interval therebetween, to burn an air-fuel mixture having a richer A/F (e.g. 12 to 22) than in the stratified combustion mode. The two fuel injecting operations are carried out during the intake stroke and during the compression stroke, respectively.

Figure 2:
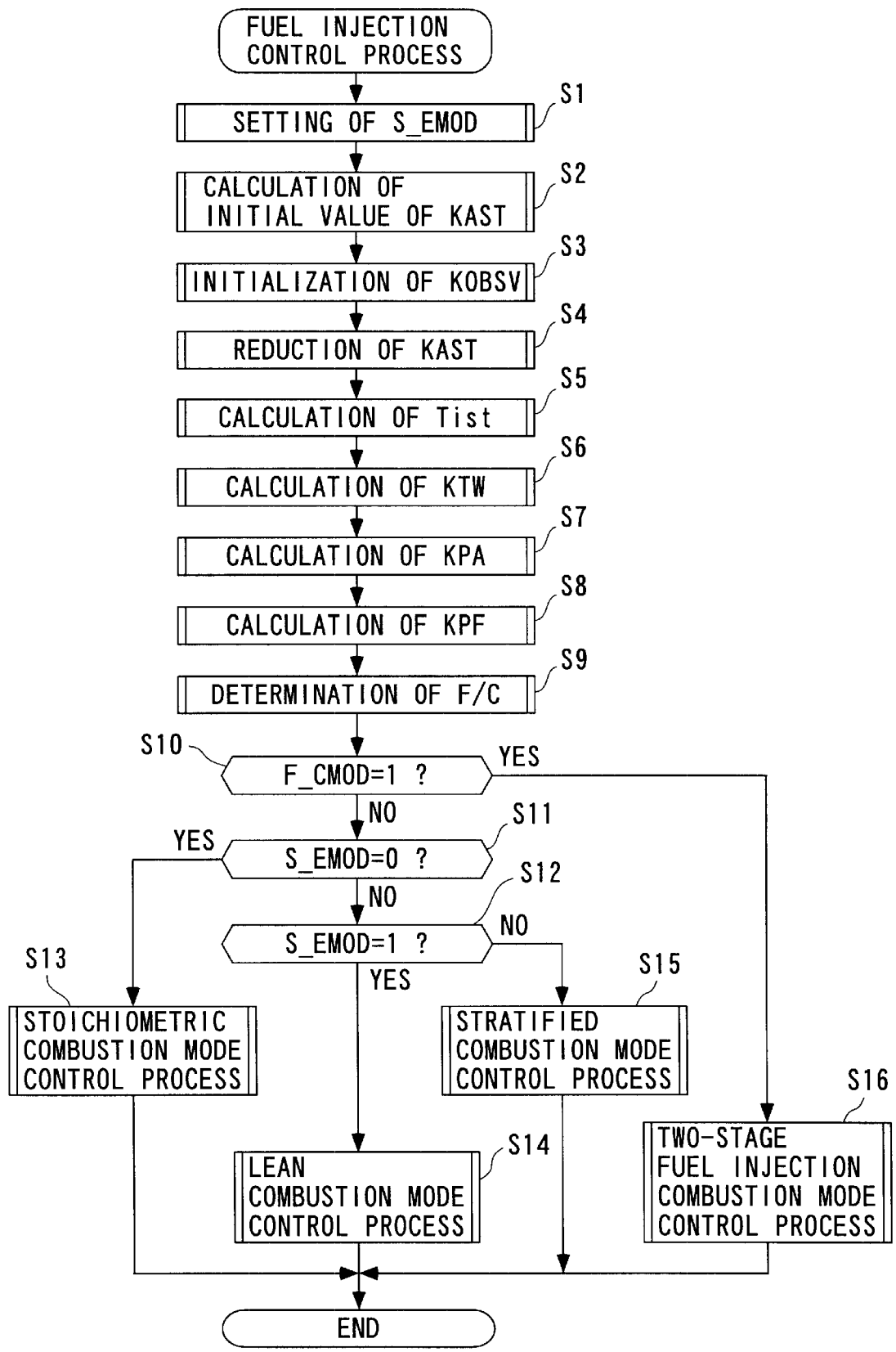
FIG. 2 is a flowchart showing a main routine of a fuel injection control process carried out by the FIG. 1 control system.

In the following, the fuel injection control process including the air-fuel ratio (A/F) feedback control process, which is executed by the ECU 2, will be described in detail with reference to FIGS. 2 to 17. FIG. 2 shows a main routine for carrying out this control process, which is executed by an interrupt handling routine in synchronism with input of each TDC signal pulse. As described hereinafter, in the fuel injection control process, a combustion mode monitor S_EMOD is determined at a step S1, and then various correction coefficients are calculated (steps S2 to S9). Further, depending on a value of a combustion mode transition flag F_CMOD and a value of the combustion mode monitor S_EMOD, each combustion mode control process is executed (steps S10 to S16).

Figure 3:
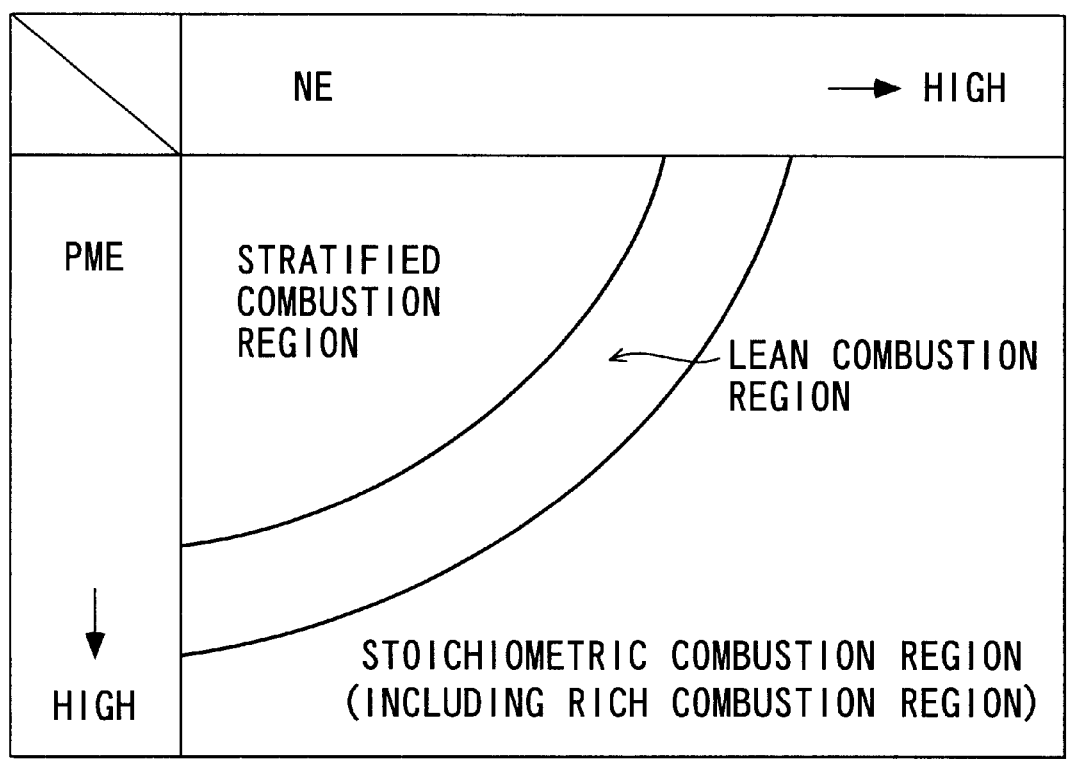
FIG. 3 shows a map for use in determining a value of a monitor S_EMOD used at a step S1 in FIG. 2.
Figure 4:
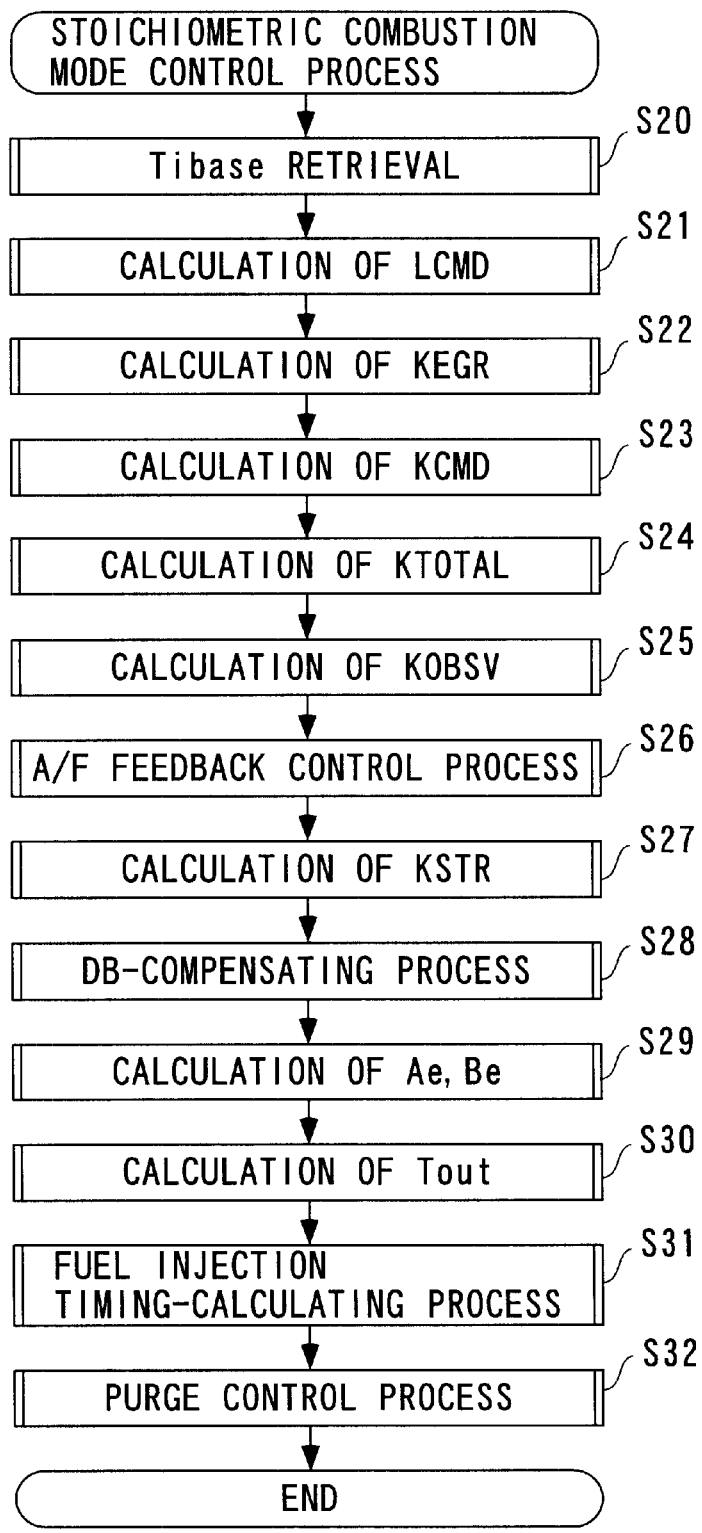
FIG. 4 is a flowchart showing a subroutine for carrying out a stoichiometric combustion mode control process which is executed at a step S13 in FIG. 2.

First, at a step S1, the combustion mode is determined in the manner described hereafter, and a value of the combustion mode monitor S_EMOD indicative of the determined combustion mode is set. That is, demanded torque PME (demanded output) is determined by searching a map, not shown, based on the engine rotational speed NE and the accelerator pedal opening AP, and based on the demanded torque PME and the engine rotational speed NE, a map shown in FIG. 3 is searched to thereby determine a combustion mode and set a value of the combustion mode monitor S_EMOD. More specifically, with reference to the FIG. 3 map, it is determined that the stratified combustion mode should be selected as the combustion mode when the operating condition of the engine is in a stratified combustion region in which the demanded torque PME and the engine rotational speed NE are both low, and the combustion mode monitor S_EMOD is set to 2. When the operating condition of the engine is in a lean combustion region of a homogeneous combustion region, in which the demanded torque PME and the engine rotational speed NE are higher than in the stratified combustion region, it is determined that the lean combustion mode should be selected as the combustion mode, and the combustion mode monitor S_EMOD is set to 1. Further, when the operating condition of the engine is in a stoichiometric combustion region of the homogeneous combustion region, in which the demanded torque PME and the engine rotational speed NE are still higher than in the lean combustion region, it is determined that the stoichiometric combustion mode should be selected as the combustion mode, and the combustion mode monitor S_EMOD is set to 0. It should be noted that the stoichiometric combustion region set in the map includes not only a region in which essentially an air-fuel mixture having an air-fuel ratio equal to the stoichiometric air-fuel ratio is burned, but also a region in which an air-fuel mixture having an air-fuel ratio richer than the stoichiometric air-fuel ratio is burned. Therefore, the term "stoichiometric combustion" used hereinafter is intended to include "rich combustion".

Then, the program proceeds to a step S2, wherein an initial value of a start-dependent correction coefficient KAST is calculated. The start-dependent correction coefficient KAST is used for increasing the fuel injection amount when the engine 3 is started.

Then, the program proceeds to a step S3, wherein a correction coefficient KOBSV is set to an initial value thereof. The correction coefficient KOBSV is a correction value used in an A/F feedback control process (steps S26, S46, S66, S86) described hereinafter.

Then, the program proceeds to a step S4, wherein the reduction of the start-depending correction coefficient KAST determined at the step S2 is carried out so as to progressively reduce the degree of an increase in the fuel injection amount to be effected by the start-dependent correction coefficient KAST as time elapses after the engine 3 has started to be cranked.

Then, the program proceeds to as a step S5, wherein a basic fuel injection time period Tist for the start of the engine is calculated.

Then, the program proceeds to a step S6, wherein a temperature-dependent correction coefficient KTW is determined by searching a map, not shown, based on the engine temperature TW and the intake pipe absolute pressure PBA.

Then, the program proceeds to a step S7, wherein an atmospheric pressure-dependent correction coefficient KPA is determined by searching a table, not shown, based on the atmospheric pressure PA.

Then, the program proceeds to a step S8, wherein a KPF-calculating process is carried out to determine a fuel pressure-dependent correction coefficient KPF. The fuel pressure-dependent correction coefficient KPF is determined by searching, a table, not shown, based on a differential pressure $\Delta PF$ between the fuel pressure PF and in-cylinder pressure PCYL. In this case, the in-cylinder pressure PCYL is estimated by searching a table, not shown, with reference to a crank angle position of each cylinder.

Then, the program proceeds to a step S9, wherein an F/C operation-determining process is carried out. In this process, it is determined whether or not the engine 3 is in an F/C (fuel cutoff) condition based on the engine rotational speed NE and the throttle valve opening TH, and set a flag indicative of the result of the determination.

Then, the program proceeds to a step S10, wherein it is determined whether or not the combustion mode transition flag F_CMOD assumes 1. The combustion mode transition flag F_CMD is set to 1 when the two-stage fuel injection combustion mode is selected as the combustion mode by a combustion mode transition-determining process (shown in FIG. 27 or FIG. 28), and to 0 when a combustion mode other than the two-stage fuel injection combustion mode is selected by the combustion mode transition-determining process. The engine 3 is controlled to enter the two-stage fuel injection combustion mode when the combustion mode undergoes transition between the lean combustion mode or the stoichiometric combustion mode and the stratified combustion mode.

When the answer to this question is negative (NO), i.e. if the engine is in a combustion mode other than the two-stage fuel injection combustion mode, the program proceeds to a step S11, wherein it is determined whether or not the combustion mode monitor S_EMOD set at the step S1 assumes 0. If the answer to this question is affirmative (YES), the program proceeds to a step S13, wherein a stoichiometric combustion mode control process, described hereinafter, is carried out, followed by terminating the program.

On the other hand, if the answer to the question of the step S11 is negative (NO), i.e. if the engine is in a combustion mode other than the stoichiometric combustion mode, the program proceeds to a step S12, wherein it is determined whether or not the combustion mode monitor S_EMOD set at the step S1 assumes 1. If the answer to this question is affirmative (YES), i.e. if the engine is in the lean combustion mode, the program proceeds to a step S14, wherein a lean combustion mode control process, described hereinafter, is carried out, followed by terminating the program.

On the other hand, if the answer to the question of the step S12 is negative (NO), i.e. if the engine is in the stratified combustion mode, the program proceeds to a step S15, wherein a stratified combustion mode control process, described hereinafter, is carried out, followed by terminating the program.

Further, if the answer to the question of the step S10 is affirmative (YES), i.e. if F_CMOD=1 holds, the program proceeds to a step S16, wherein a two-stage fuel injection combustion mode control process is carried out, followed by terminating the program.

Next, the stoichiometric combustion mode control process executed at the step S13 in FIG. 2 will be described. As shown in the figure, in this process, first, a Tibase-calculating process is carried out at a step S20 to calculate a basic fuel injection time period Tibase. Details of the Tibase-calculating process will be described hereinbelow.

Next, the program proceeds to a step S21, wherein an LCMD-calculating process is carried out. In this process, the target valve lift amount LCMD is calculated, as will be described hereinbelow.

Next, the program proceeds to a step S22, wherein a KEGR-calculating process is carried out to determine an EGR-dependent correction coefficient KEGR. In this process, the EGR-dependent correction coefficient KEGR is determined based on the demanded torque determined at the step S1, the engine rotational speed NE, the target valve lift amount LACT determined at the step S22, the actual valve lift amount LACT detected by the valve lift sensor 26, the intake pipe absolute pressure PBA, and a map value of the intake pipe absolute pressure PBAm, by searching three maps, not shown. The EGR-dependent correction coefficient KEGR compensates for a change in the amount of intake air caused by a change in the EGR rate.

Then, the program proceeds to a step S23, wherein a KCMD-calculating process is carried out to calculate a final target air-fuel ratio coefficient KCMD (target air-fuel ratio). More specifically, first, a basic target air-fuel ratio coefficient KBS is determined by searching a map, not shown, based on the demanded torque PME determined at the step S1 and the engine rotational speed NE. Then, the basic target air-fuel ratio coefficient KBS is multiplied by the coolant temperature-dependent correction coefficient KTW determined at the step S6 to calculate the final target air-fuel ratio coefficient KCMD. The basic target air-fuel ratio coefficient KBS and the final target air-fuel ratio coefficient KCMD are expressed as equivalent ratios which are inversely proportional to respective corresponding air-fuel ratios A/F.

Then, the program proceeds to a step S24, wherein a KTOTAL-calculating process is calculated to calculate a total correction coefficient KTOTAL. More specifically, the total correction coefficient KTOTAL is calculated by the following equation (1):

$$KTOTAL \times KAST \times KTA \times KPA \times KEGR \times KETC \quad (1)$$

wherein KTA represents an intake air-dependent correction coefficient determined by searching a table, not shown, based on the intake air temperature TA, and KETC represents a charging efficiency-dependent correction coefficient determined by searching a table, not shown, based on the final target air-fuel ratio coefficient KCMD.

Then, the program proceeds to a step S25, wherein a KOBSV-calculating process is carried out. In this process, a correction coefficient KOBSV used at the following step S26 is calculated by estimating an air-fuel ratio on a cylinder-by-cylinder basis by using an observer.

Then, the program proceeds to a step S26, wherein the A/F feedback control process is carried out. In this process, estimated air-fuel ratio feedback control is carried out by using the final target air-fuel ratio coefficient KCMD and the correction coefficient KOBSV calculated at the respective steps S23, S26.

Then, the program proceeds to a step S27, wherein a KSTR-calculating process is carried out to calculate a feedback correction coefficient KSTR. In this process, the feedback correction coefficient KSTR is determined based on the signal from the LAF sensor 27 by using an adaptive controller of self-tuning regulator type, not shown. The feedback correction coefficient KSTR is applied to the basic fuel injection time period Tibase to dynamically compensate for time it takes for the actual air-fuel ratio to become equal to the target air-fuel ratio due to delayed response of the fuel injection system of the engine, to thereby enhance the convergence of the air-fuel ratio control.

Then, the program proceeds to a step S28, wherein a DB-compensating process is carried out. In this process, a correction value TiDB is calculated which compensates for a large change in the engine rotational speed NE. The correction value TiDB is calculated as a positive or negative value.

Then, the program proceeds to a step S29, wherein a process for calculating a direct ratio Ae and a carry-off ratio Be is carried out. In this process, the direct ratio Ae and the carry-off ratio Be as fuel behavior parameters are calculated based on the engine rotational speed NE, the intake pipe absolute pressure PBA, and other parameters indicative of operating conditions of the engine.

Then, the program proceeds to a step S30, wherein a Tout-calculating process is carried out to calculate the final fuel injection time period Tout. More specifically, the basic fuel injection time period Tibase calculated as described above is multiplied by the total correction coefficient KTOTAL, the final target air-fuel ratio coefficient KCMD and the feedback correction coefficient KSTR, and the correction value TiDB is added to the product of the above multiplication to determine a demanded fuel injection time period Tcyl(i) on a cylinder-by-cylinder basis (Tcyl(i)= Tibase×KTOTAL×KCMD×TSTR+TiDB). It should be noted that the symbol i of the demanded fuel injection time period Tcyl(i) represents a cylinder number.

Next, by using the fuel pressure-dependent correction coefficient KPF, the direct ratio Ae and the carry-off ratio Be determined as described above, the final fuel injection time period Tout(i) is calculated on a cylinder-by-cylinder basis by the following equation (2):

$$Tout(i)=((Tcyl(i)-Be \times TWP(i)/Ae) \times KPF+TiVB \quad (2)$$

The Tout(i) value corresponds to a valve-opening time period over which each injector is open for the corresponding cylinder, and therefor represents an amount of fuel to be actually injected into the cylinder. In the equation, TiVB represents an ineffective time-correction time determined based on the battery voltage, and TWP(i) an attached fuel amount-equivalent value (time) corresponding to an amount of fuel attached to each cylinder. The attached fuel amount-equivalent value TWP(i) is determined in a TWP(i)-calculating process which is executed by another routine, by using the following equation (3):

$$TWP(i)n=((Tout(i)-TiVB/KPF) \times (1-Ae)+(1-Be) \times TWP(i)n-1 \quad (3)$$

wherein TWP(i)n and TWP(i)n−1 represent the present value and the immediately preceding value of the attached fuel amount-equivalent value TWP(i).

Next, the program proceeds to a step S31, wherein the fuel injection timing θinj is calculated by the fuel injection timing-calculating process. Details of this process will be described hereinbelow.

Then, the program proceeds to a step S32, wherein a purge control process is carried out, followed by terminating the program. In this process, evaporative fuel adsorbed in a canister of a purge system is delivered to the intake pipe 12, and the purge amount, i.e. the flow rate of the evaporative fuel is controlled.

Figure 5:
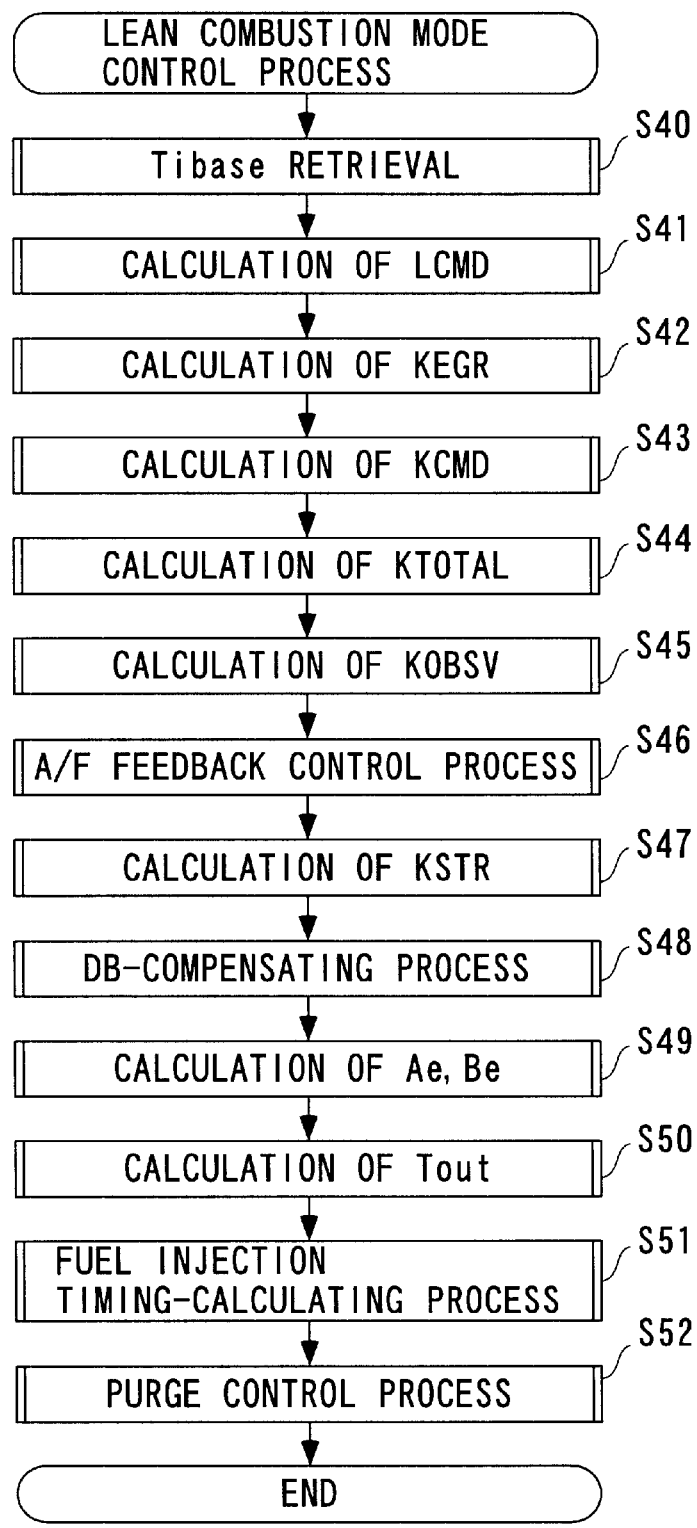
FIG. 5 is a flowchart showing a subroutine for carrying out a lean combustion mode control process which is executed at a step S14 in FIG. 2.
Figure 6:
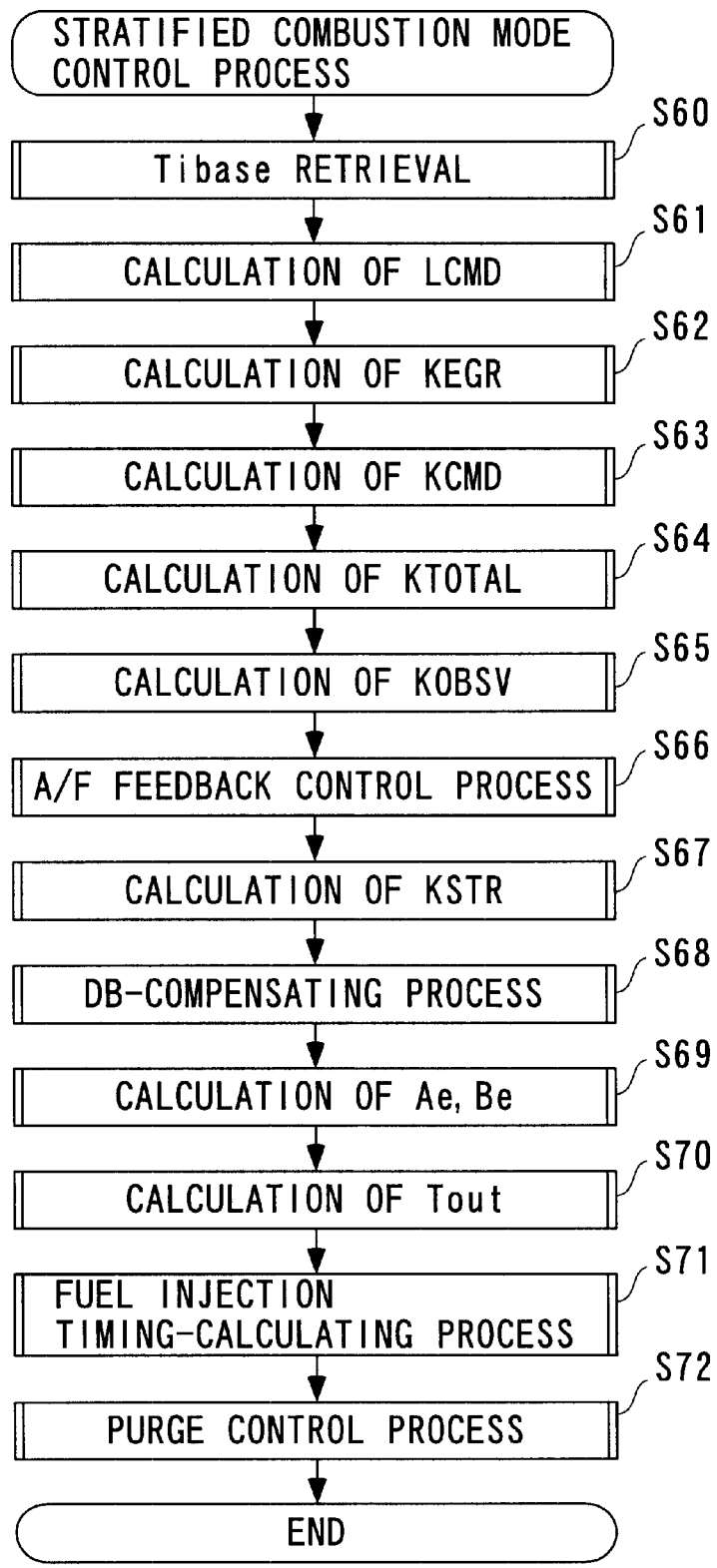
FIG. 6 is a flowchart showing a subroutine for carrying out a stratified combustion mode control process which is executed at a step S15 in FIG. 2.

FIGS. 5 and 6 show the lean combustion mode control process and the stratified combustion mode control process executed at the respective steps S14 and S15 in FIG. 2. As shown in the figures, the steps S40 to S52 and the steps S60 to S72 are the same as the steps S20 S32 of the stoichiometric combustion mode control process described above, and therefore, detailed description thereof is omitted.

Figure 7:
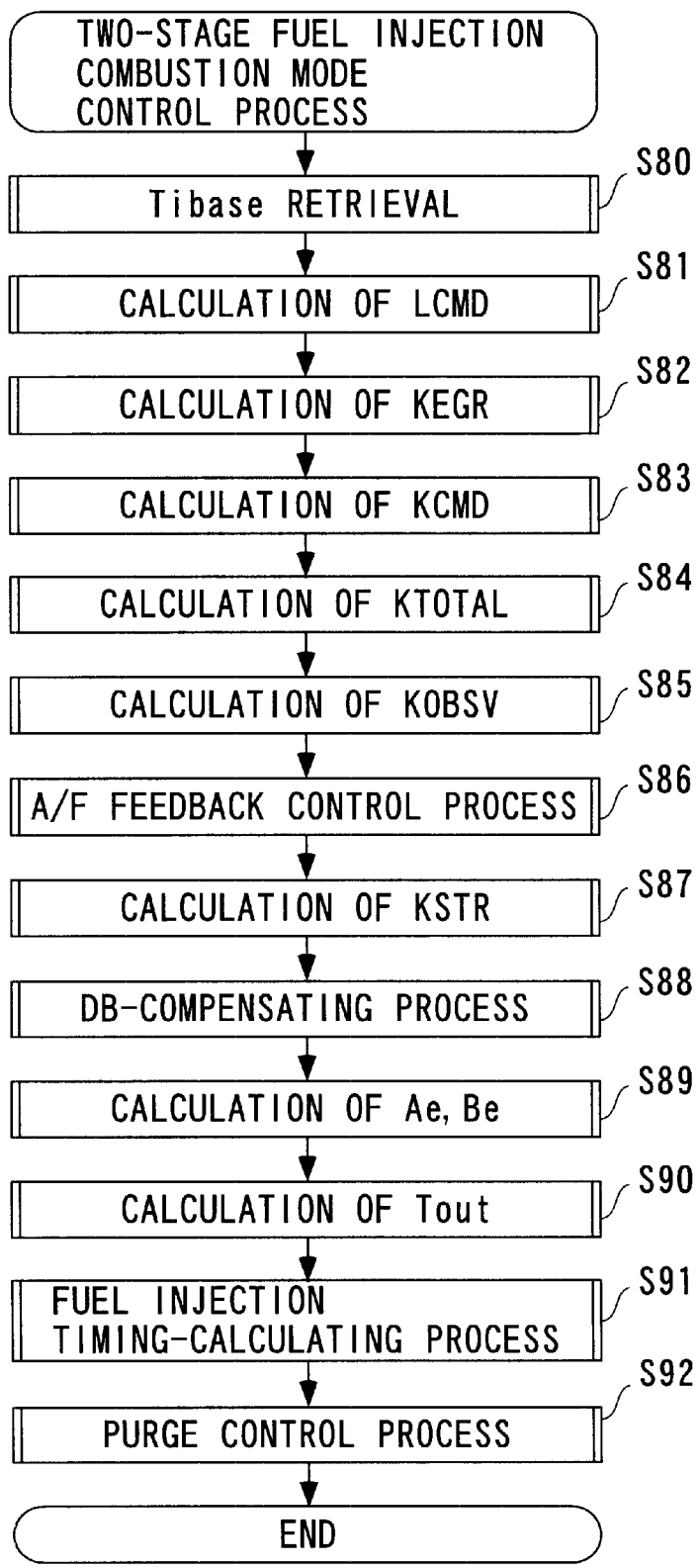
FIG. 7 is a flowchart showing a subroutine for carrying out a two-stage fuel injection combustion mode control process which is executed at a step S16 in FIG. 2.

Further, FIG. 7 shows the two-stage fuel injection combustion mode control process executed at the step S16 in FIG. 2. The steps S80 to S92 are the same as the steps S20 to S32 of the stoichiometric combustion mode control process described above, except for details of the KCMD-calculating process executed at a step S83 and therefore, detailed description of the steps other than this is omitted. The details of the KCMD-calculating process at the step S83 will be described hereinbelow.

Figure 8:
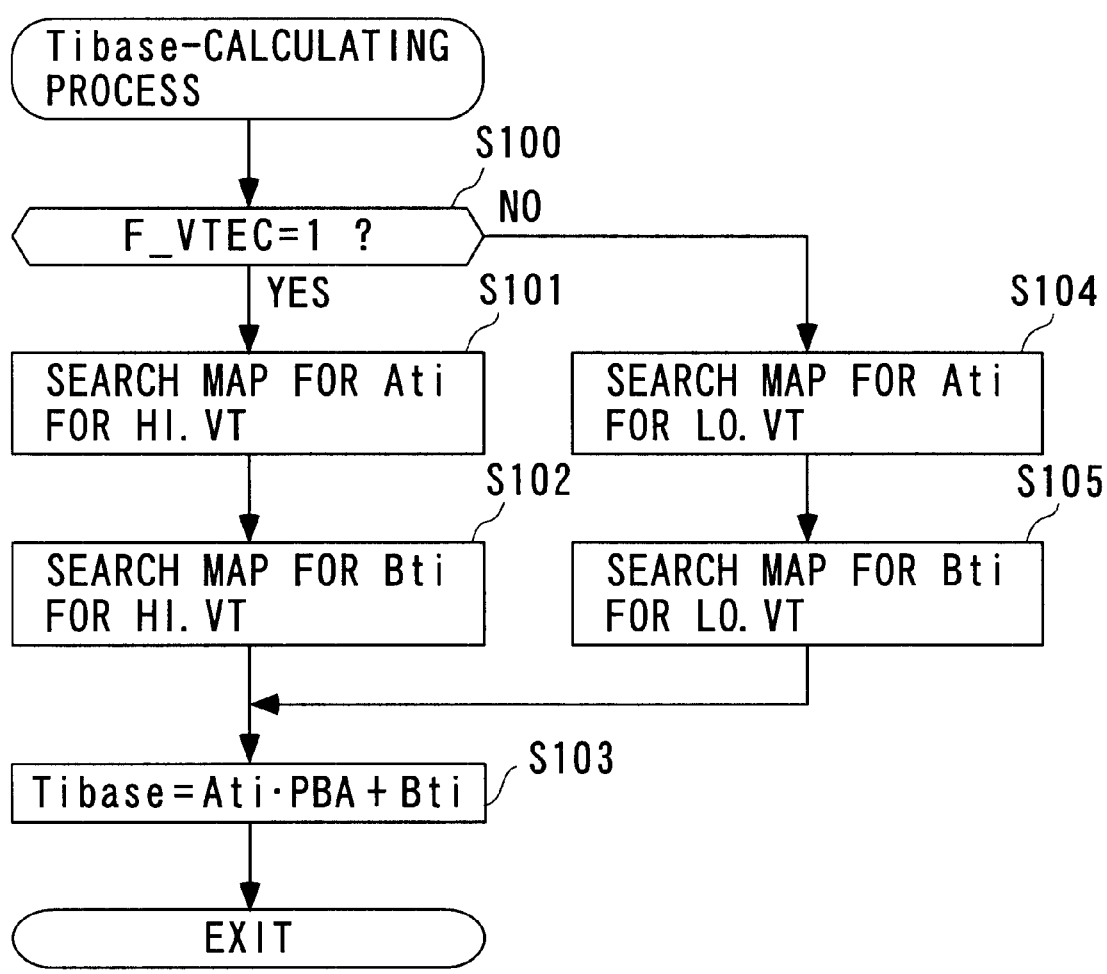
FIG. 8 is a flowchart showing a subroutine for a Tibase-calculating process executed in the subroutines in FIG. 4 to FIG. 7.

Next, the Tibase-calculating process at the steps S20, S40, S60, S80 will be described with reference to FIG. 8. As shown in FIG. 8, in this process, first, at a step S100, it is determined whether or not a VTEC-permitting flag F_VTEC assumes 1. The VTEC-permitting flag F_VTEC is set to 1 when the valve timing is set to HI.VT, whereas the same is set to 0 when the valve timing is set to LO.VT. It should be noted that in the lean combustion mode, the stratified combustion mode and the two-stage fuel injection combustion mode, F_VTEC=0 holds since the valve timing is set to LO.VT in these modes.

If the answer to the question of the step S100 is affirmative (YES), i.e. if the valve timing is set to HI.VT, the program proceeds to a step S101, wherein a multiplier term Ati is determined by searching a map, not shown, based on the engine rotational speed NE and the actual cam phase CAIN.

Next, the program proceeds to a step S102, wherein an addend term Bti for HI.VT is determined by searching a map, not shown, based on the engine rotational speed NE and the actual cam phase CAIN.

Then, the program proceeds to a step S103, wherein the basic fuel injection time period Tibase for HI.VT is calculated by the following equation (4):

$$Tibase = Ati \times PBA + Bti \quad (4)$$

followed by terminating the program.

On the other hand, if the answer to the question of the step S100 is negative (NO), i.e. if the valve timing is set to LO.VT, the program proceeds to a step S104, wherein a multiplier term Ati for LO.VT is determined in the same manner as at the step S101 by using another map.

Then, the program proceeds to a step S105, wherein an addend term Bti for LO.VT is determined in the same manner as at the step S102 by using another map.

Then, the program proceeds to the step S103 wherein the basic fuel injection time period Tibase for LO.VT is calculated by the following equation:

$$Tibase = Ati \times PBA + Bti \quad (4)$$

followed by terminating the program.

Figure 9:
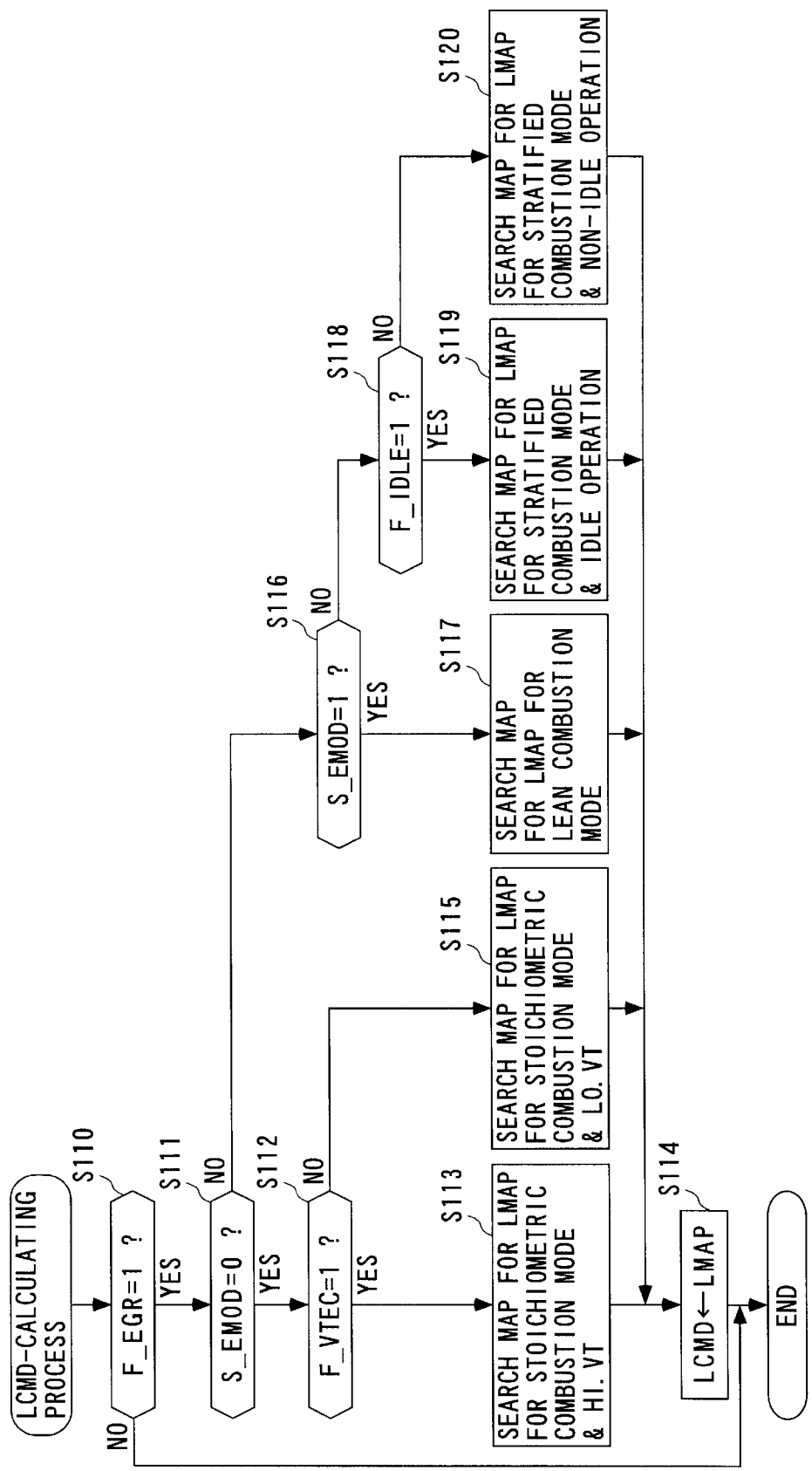
FIG. 9 is a flowchart showing a subroutine for an LCMD-calculating process executed in the subroutines in FIG. 4 to FIG. 7.

Next, the LCMD-calculating process (steps S21, S41, S61, S81) for calculating the target valve lift amount LCMD will be described with reference to FIG. 9. As shown in the figure, in this process, first at a step S110, it is determined whether or not an EGR-permitting flag F_EGR assumes 1.

The EGR-permitting flag F_EGR is set to 1 when the EGR operation is being executed by opening the EGR control valve 16 arranged across the EGR pipe 15 is opened to, and to 0 when the EGR operation is being inhibited by closing the EGR control valve 16.

If the answer to the question of the step S110 is negative (NO), i.e. if the EGR operation is not being executed, the present program is terminated, whereas if the answer to the question of the same is affirmative (YES), i.e. if the EGR operation is being executed, the program proceeds to a step S111, wherein it is determined whether or not the combustion mode monitor S_EMOD assumes 0. If the answer to this question is affirmative (YES), i.e. if the engine 3 is in the stoichiometric combustion mode, the program proceeds to a step S112, wherein it is determined whether or not the VTEC-permitting flag F_VTEC assumes 1.

If the answer to this question is affirmative (YES), i.e. if the valve timing is set to HI.VT, the program proceeds to a step S113, wherein a map value LMAP for the stoichiometric combustion mode and HI.VT is determined by searching a map, not shown, based on the engine rotational speed NE and the demanded torque PME. Then, the program proceeds to a step S114, wherein the map value LMAP determined at the step S113 is set to the target valve lift amount LCMD, followed by terminating the program.

On the other hand, if the answer to the question of the step S112 is negative (NO), the program proceeds to a step S115, wherein similarly to the step S113, a map valve LMAP for the stoichiometric combustion mode and LO.VT is determined by searching a map, not shown, based on the engine rotational speed NE and the demanded torque PME. Then, the step S114 is executed, followed by terminating the program.

On the other hand, if the answer to the question of the step S111 is negative (NO), i.e. if the engine 3 is not in the stoichiometric combustion mode, the program proceeds to a step S116, wherein it is determined whether or not the combustion mode monitor S_EMOD assumes 1. If the answer to this question is affirmative (YES), i.e. if the engine is in the lean combustion mode, the program proceeds to a step S117, wherein a map value LMAP for the lean combustion mode is determined in the same manner as at the steps S113, S115. Then, the step S114 is executed, followed by terminating the program.

On the other hand, if the answer to the question of the step S116 is negative (NO), i.e. if the engine 3 is in the stratified combustion mode, the program proceeds to a step S118, wherein it is determined whether or not an idle flag F_IDLE assumes 1. The idle flag F_IDLE is set to 1 when the engine 3 is idling, and set to 0 when the engine 3 is not idling.

If the answer to this question is affirmative (YES), i.e. if the engine is idling, the program proceeds to a step S119, wherein the map value LMAP for stratified combustion and idling is determined in the same manner as at the step S113. Then, the step S114 is executed, followed by terminating the program.

If the answer to the question of the step S118 is negative (NO), i.e. if the engine is not idling, the program proceeds to a step S120, wherein the map value LMAP for stratified combustion and no idling is determined in the same manner as at the step S113. Then, the step S114 is executed, followed by terminating the program. It should be noted that in the LCMD-calculating process at the step S81 in the two-stage fuel injection combustion mode, the target valve lift amount LCMD is determined in dependence on values of the flags F_EGR, F_VTEC, F_IDLE and the combustion mode monitor S_EMOD assumed before transition to the two-stage fuel injection combustion mode.

Figure 10:
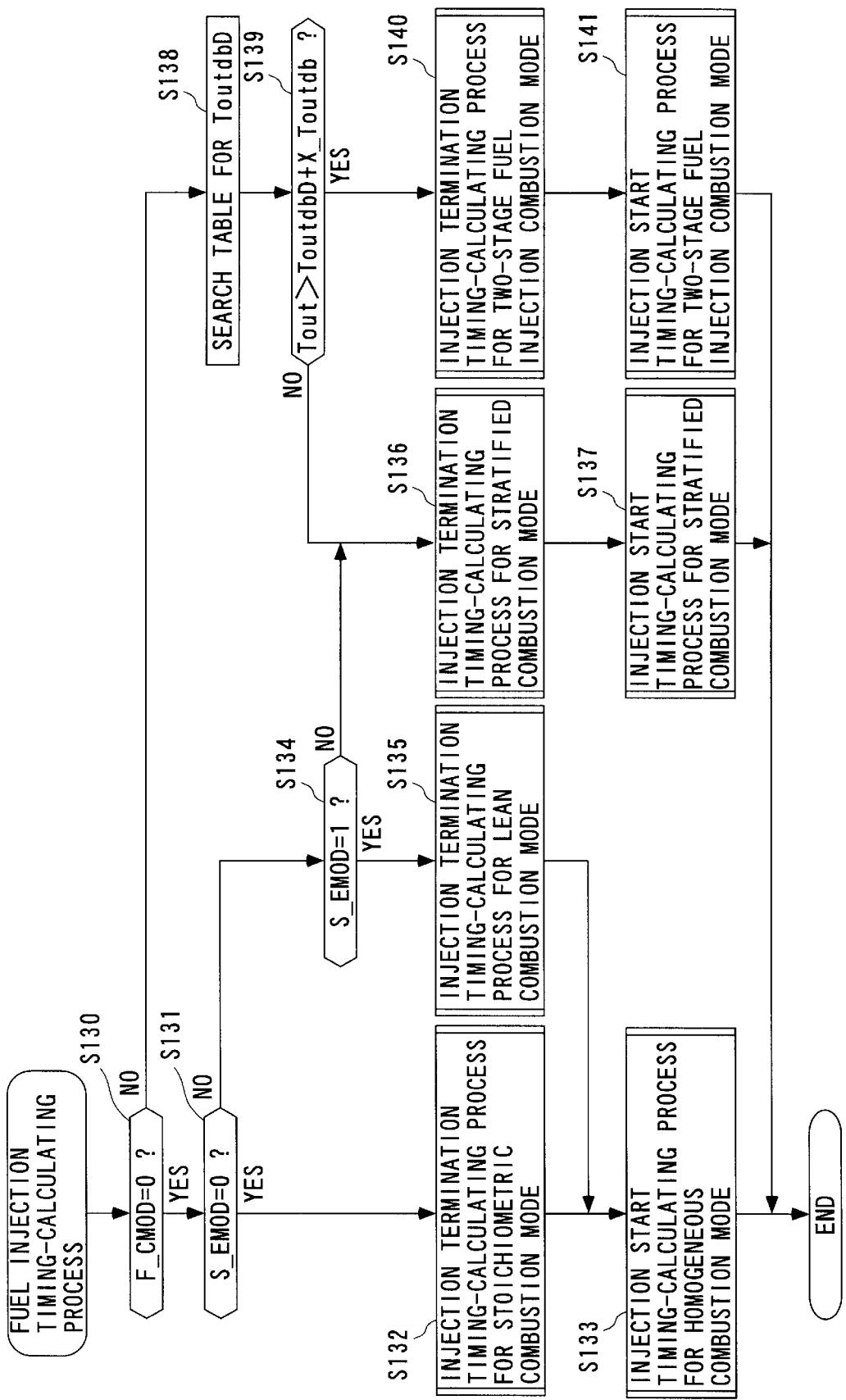
FIG. 10 is a flowchart showing a subroutine for a fuel injection timing-calculating process executed in the subroutines in FIG. 4 to FIG. 7.

Next, the fuel injection timing-calculating process executed in each of the combustion control processes (steps S31, S51, S71, S91) described hereinabove will be described with reference to FIGS. 10 to 15. In this process, as described hereinafter, the injection termination timing and the injection start timing of the fuel injection timing θinj for each combustion mode are calculated on a cylinder-by-cylinder basis. As shown in FIG. 10, first, at a step s130, it is determined whether or not the combustion mode transition flag F_CMOD assumes 0. If the answer to this question is affirmative (YES), i.e. if F_CMOD=0 holds, which means that the engine is not in the two-stage fuel injection combustion mode, the program proceeds to a step S131, wherein it is determined whether or not the combustion mode monitor S_EMOD assumes 0.

If the answer to the question is affirmative (YES), i.e. if S_EMOD=0 holds, which means that the engine 3 is in the stoichiometric combustion mode, the program proceeds to a step S132, wherein an injection termination timing-calculating process for the stoichiometric combustion mode is executed. In this process, an injection termination timing IJLOGH (injection timing for the homogeneous combustion mode) is calculated.

Then, the program proceeds to a step S133, wherein an injection start timing-calculating process for the homogeneous combustion mode is carried out, followed by terminating the program. In this process, an injection start timing for the stoichiometric combustion mode is calculated back from the injection termination timing IJLOGH calculated at the step S132, by using the final fuel injection time period Tout calculated at the step S30. The injection start timing and the injection termination timing IJLOGH are calculated as respective crank angle positions with reference to the TDC position in the intake stroke.

On the other hand, if the answer to the question of the step S131 is negative (NO), i.e. if the engine 3 is not in the stoichiometric combustion mode, the program proceeds to a step S134, wherein it is determined whether or not the combustion mode monitor S_EMOD assumes 1. If the answer to the question is affirmative (YES), i.e. if the engine 3 is in the lean combustion mode, the program proceeds to a step S135, wherein an injection termination timing-calculating process for the lean combustion mode, described in detail hereinafter, is carried out to calculate an injection termination timing IJLOGH for the lean combustion mode (fuel injection timing for the lean combustion mode).

Then, the program proceeds to the step S133, wherein the injection start timing for the lean combustion mode is calculated based on the injection termination timing IJLOGH and the final fuel injection time period Tout calculated at the respective steps S135 and S50, followed by terminating the program. The injection start timing and the injection termination timing IJLOGH for the lean combustion mode are both calculated as respective crank angle positions with reference to the TDC position in the intake stroke, similarly to those for the stoichiometric combustion mode described above.

On the other hand, if the answer to the question of the step S134 is negative (NO), i.e. if the engine 3 is in the stratified combustion mode, the program proceeds to a step S136, wherein an injection termination timing-calculating process for the stratified combustion mode is carried out to calculate an injection termination timing IJLOGD for the stratified combustion mode (fuel injection timing for the stratified combustion mode).

Then, the program proceeds to a step S137, wherein, similarly to the step S133, the injection start timing for the stratified combustion mode is calculated based on the injection termination timing IJLOGD and the final fuel injection time period Tout calculated at the respective steps S136 and S70, followed by terminating the program. The injection start timing and the injection termination timing IJLOGD are both calculated as respective crank angle positions with reference to the TDC position in the compression stroke, differently from those for the stoichiometric combustion mode and the lean combustion mode.

On the other hand, if the answer to the question of the step S130 is negative (NO), i.e. if the engine 3 is in the two-stage fuel injection combustion mode, the program proceeds to a step S138, wherein an NE-ToutdbD table, an example of which is shown in FIG. 11, is searched based on the engine rotational speed NE, to determine a compression-stroke injection time period ToutdbD.

The compression-stroke injection time period ToutdbD is an injection time period (second injection time period) in the compression stroke, which is one of the injection time periods of the respective two injections in the two-stage fuel injection combustion mode, and the reason for determining the time period ToutdbD as described above is as follows: In the two-stage fuel injection combustion mode, in which fuel is injected two times, i.e. during the intake stroke and during the compression stroke, it is preferred that to ensure stability of combustion, as much fuel as possible is injected in the intake stroke and at the same time, to ensure excellent fuel economy and exhaust emissions, the amount of fuel injected in the compression stroke is limited to as small an amount as possible (minimum fuel injection amount) in which injected fuel can be ignited. Further, the minimum fuel injection amount in which injected fuel can be ignited during the compression stroke changes as the state of flow of air within the cylinder changes with the engine rotational speed NE, and therefore, it is required to compensate for an amount of this change in the minimum fuel injection amount. Therefore, as described above, the compression-stroke fuel injection time period ToutdbD is determined independence on the engine rotational speed NE, whereby it is possible to ensure stability of combustion. Further, the NE-ToutdbD table is configured such that as the engine rotational speed NE is higher, the compression-stroke injection time period ToutdbD becomes smaller. This is because as the engine rotational speed NE is higher, the mixture becomes easier to ignite owing to a favorable flow of the mixture within the cylinder, which allows reduction of the minimum fuel injection amount in which injected fuel can be ignited.

Next, the program proceeds to a step S139, wherein it is determined whether or not the final fuel injection time period Tout calculated at the step S90 is longer than the sum of the compression-stroke injection time period ToutdbD and a predetermined time period X_Toutdb. If the answer to this question is negative (NO), i.e. if Tout≦ToutdbD+X_Toutdb holds, the steps S136, S137 are executed, followed by terminating the program. That is, even when the engine 3 is set to the two-stage fuel injection combustion mode, if the fuel injection amount is small, the fuel is not injected two times per cycle of engine operation, but similarly to the stratified combustion mode, only the fuel injection during the compression stroke alone is performed. This is because the final fuel injection time period Tout is so short that only the minimum fuel injection amount in which injected fuel can be ignited during the compression stroke can be secured, which makes it difficult to perform fuel injection during the intake stroke.

On the other hand, if the answer to the question of the step S139 is affirmative (YES), i.e. if Tout>ToutdbD+X_Toutdb holds, the program proceeds to a step S140, wherein two injection termination timings IJLOGH, IJLOGD (during the intake stroke and during the compression stroke) for the two-stage fuel injection combustion mode are calculated in an injection termination timing-calculating process for the two-stage fuel injection combustion mode by using the final fuel injection time period Tout and the compression-stroke injection time ToutdbD calculated at the respective steps S90 and S138.

Then, the program proceeds to a step S141, wherein two injection start timings for the two-stage fuel injection combustion mode are calculated based on an injection termination timing IJLOGH for a first-stage injection (during the intake stroke) and a fuel injection time period ToutH for the first-stage injection, referred to hereinafter, and an injection termination timing IJLOGD for a second-stage injection (during the compression stroke) and a fuel injection time period ToutD for the second-stage injection, referred to hereinafter, followed by terminating the program.

Figure 12:
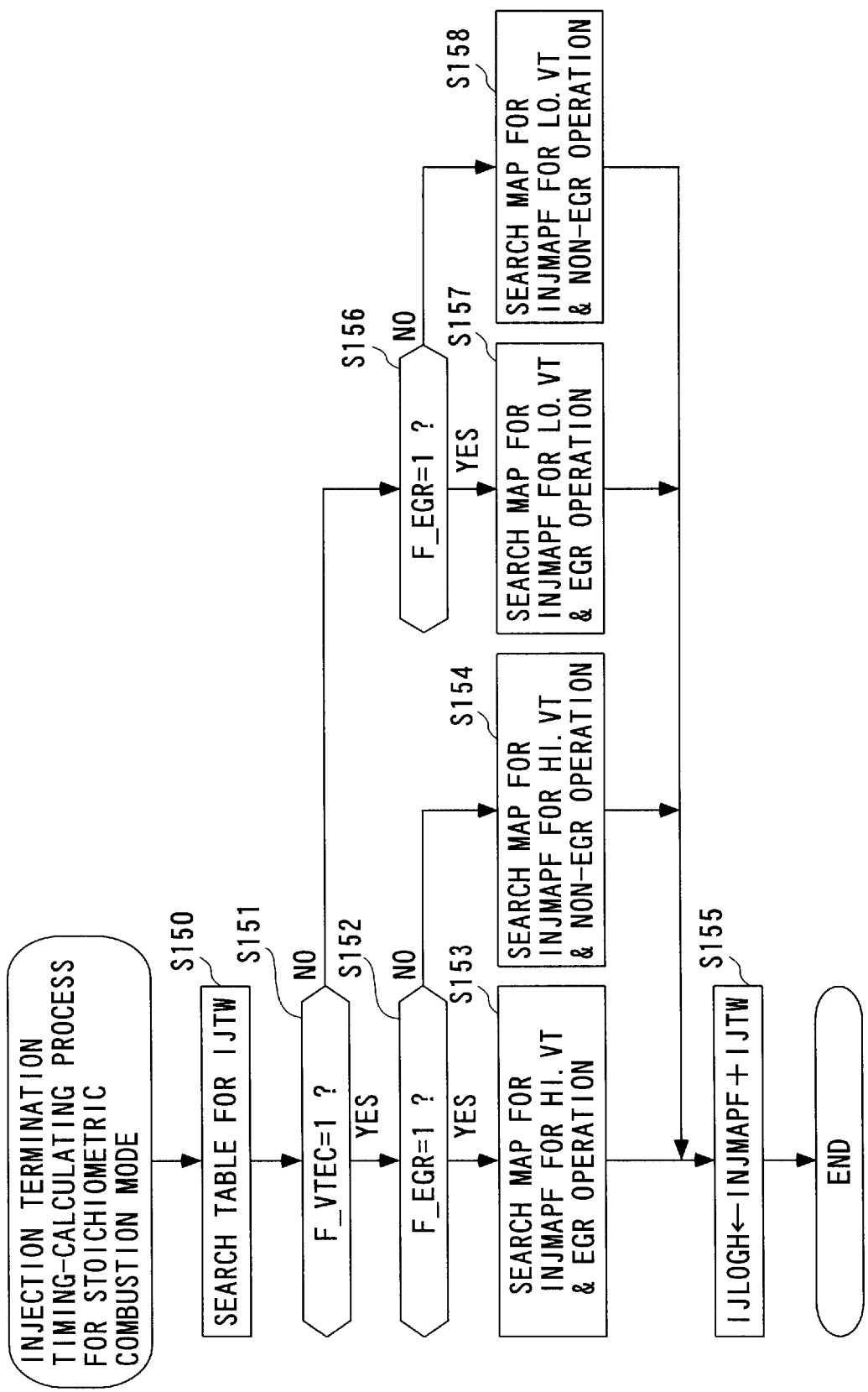
FIG. 12 is a flowchart showing a subroutine for carrying out a fuel injection termination timing-calculating process for a stoichiometric combustion mode, which is executed at a step S132 in FIG. 10.

Next, the injection termination timing-calculating process for the stoichiometric combustion mode, which is executed at the step S132 in FIG. 10, will be described with reference to FIG. 12. In the process, as described below, the injection termination timing IJLOGH for the stoichiometric combustion mode is calculated.

In the process, first, at a step S150, a coolant temperature-dependent correction term IJTW (preset fuel injection timing for homogeneous combustion) is determined. More specifically, the coolant temperature-dependent correction term IJTW is determined by searching a TW-IJTW table an example of which is shown in FIG. 13, based on the engine coolant temperature TW. As shown in the figure, in the TW-IJTW table, the coolant temperature-dependent correction term IJTW is set to a smaller value as the engine coolant temperature TW is higher. The correction term IJTW is thus set so as to generate torque efficiently by advancing the injection termination timing IJLOGH of the fuel injection timing θinj since fuel injected into the combustion chamber 3c is easier to ignite as the engine coolant temperature TW is higher and hence homogeneous combustion is carried out more efficiently.

Then, at a step S151, it is determined whether or not the VTEC-permitting flag F__VTEC assumes 1. If the answer to the question is affirmative (YES), i.e. if the valve timing is set to HI.VT, the program proceeds to a step S152, wherein it is determined whether or not the EGR-permitting flag F__EGR assumes 1.

If the answer to the question is affirmative (YES), i.e. if the EGR operation is being executed, the program proceeds to a step S153, wherein a basic injection termination timing INJMAPF (preset fuel injection timing for homogeneous combustion) for HI.VT and EGR operation is determined by searching a map, not shown, based on the engine rotational speed NE and the final fuel injection time period Tout obtained at the step S30.

Then, the program proceeds to a step S155, wherein the injection termination timing IJLOGH is set to a value obtained by adding the coolant temperature-dependent correction term IJTW calculated at the step S150 to the basic injection termination timing INJMAPF, followed by terminating the program.

On the other hand, if the answer to the question of the step S152 is negative (NO), i.e. if the EGR operation is not being executed, the program proceeds to a step S154, wherein a basic injection termination timing INJMAPF for HI.VT and non-EGR operation is determined, in the same manner as at the step S153. Then, at the step S155, an injection termination timing IJLOGH for HI.VT and non-EGR operation is calculated, followed by terminating the program.

If the answer to the question of the step S151 is negative (NO), i.e. if the valve timing is set to LO.VT, the program proceeds to a step S156, wherein it is determined whether or not the EGR-permitting flag F__EGR assumes 1.

If the answer to this question is affirmative (YES), i.e. if the EGR operation is being carried out, the program proceeds to a step S157, wherein in the same manner as at the step S153, a basic injection termination timing INJMAPF for LO.VT and EGR operation is determined. Then, at the step S155, an injection termination timing IJLOGH for LO.VT and EGR operation is calculated, followed by terminating the program.

On the other hand, if the answer to the question of the step S156 is negative (NO), i.e. if the EGR operation is not being carried out, the program proceeds to a step S158, wherein in the same manner as at the step S153, a basic injection termination timing INJMAPF for LO.VT and non-EGR operation is determined. Then, the program proceeds to the step S155, wherein an injection termination timing IJLOGH for LO.VT and non-EGR operation is calculated, followed by terminating the present program.

Figure 14:
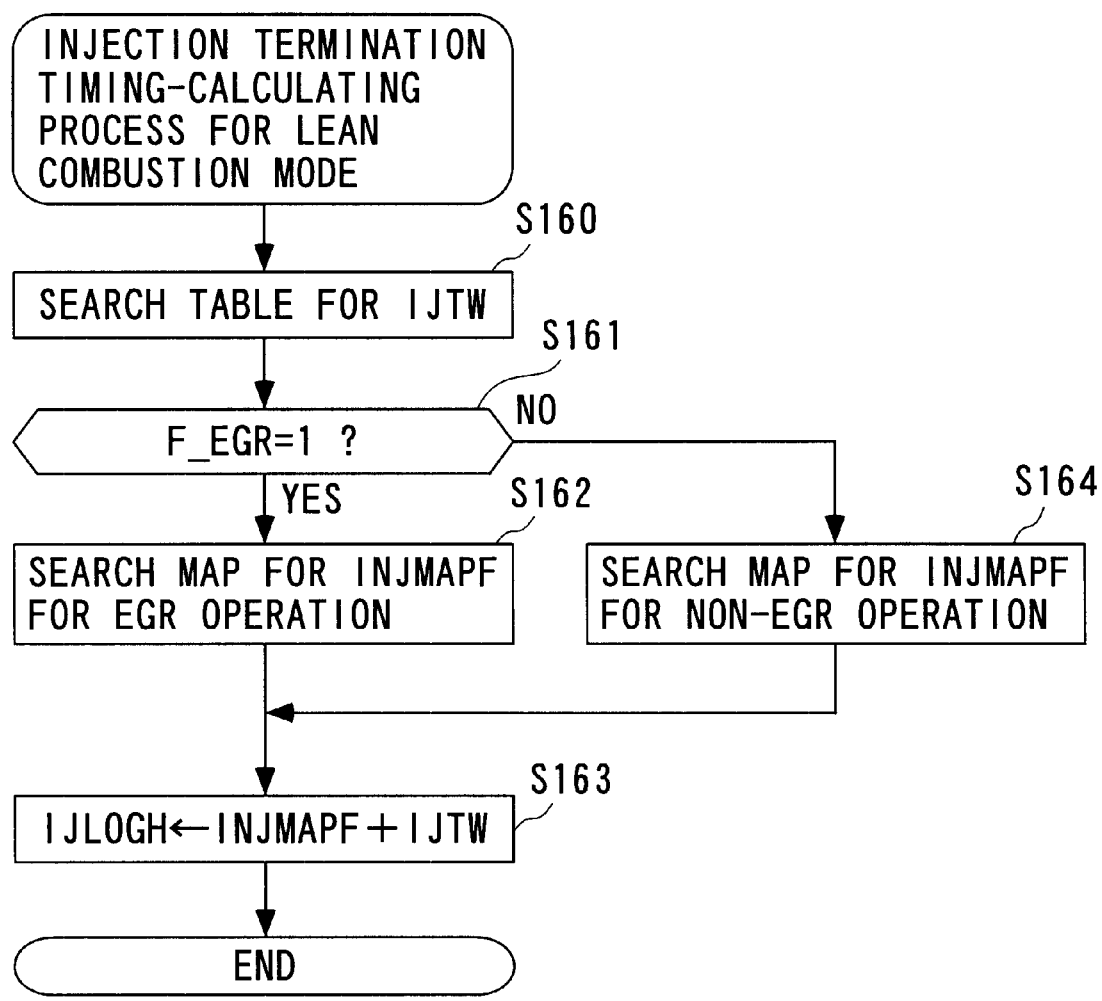
FIG. 14 is a flowchart showing a subroutine for carrying out a fuel injection termination timing-calculating process for a lean combustion mode, which is executed at a step S135 in FIG. 10.

Next, the injection termination timing-calculating process for the lean combustion mode, which is executed at the step S135 in FIG. 10, will be described with reference to FIG. 14. In this process, first, at a step S160, similarly to the step S150, the coolant temperature-dependent correction term IJTW is determined by searching the FIG. 13 TW-IJTW table based on the engine coolant temperature TW.

Then, the program proceeds to a step S161, wherein it is determined whether or not the EGR-permitting flag F__EGR assumes 1. If the answer to the question is affirmative (YES), i.e. if the EGR operation is being carried out, the program proceeds to a step S162, wherein a basic injection termination timing INJMAPF for EGR operation is determined by searching a map, not shown, based on the engine rotational speed NE and the final fuel injection time period Tout determined at the step S50.

Then, the program proceeds to a step S163, and the injection termination timing IJLOGH is set to a value obtained by adding the coolant temperature-dependent correction term IJTW calculated at the step S160 to the basic injection termination timing INJMAPF, followed by terminating the program.

On the other hand, if the answer to the question of the step S161 is negative (NO), i.e. if the EGR operation is not being carried out, the program proceeds to a step S164, wherein a basic injection termination timing INJMAPF for non-EGR operation is determined, in the same manner as at the step S162. Then, at the step S163, an injection termination timing IJLOGH for non-EGR operation is calculated, followed by terminating the program.

Figure 15:
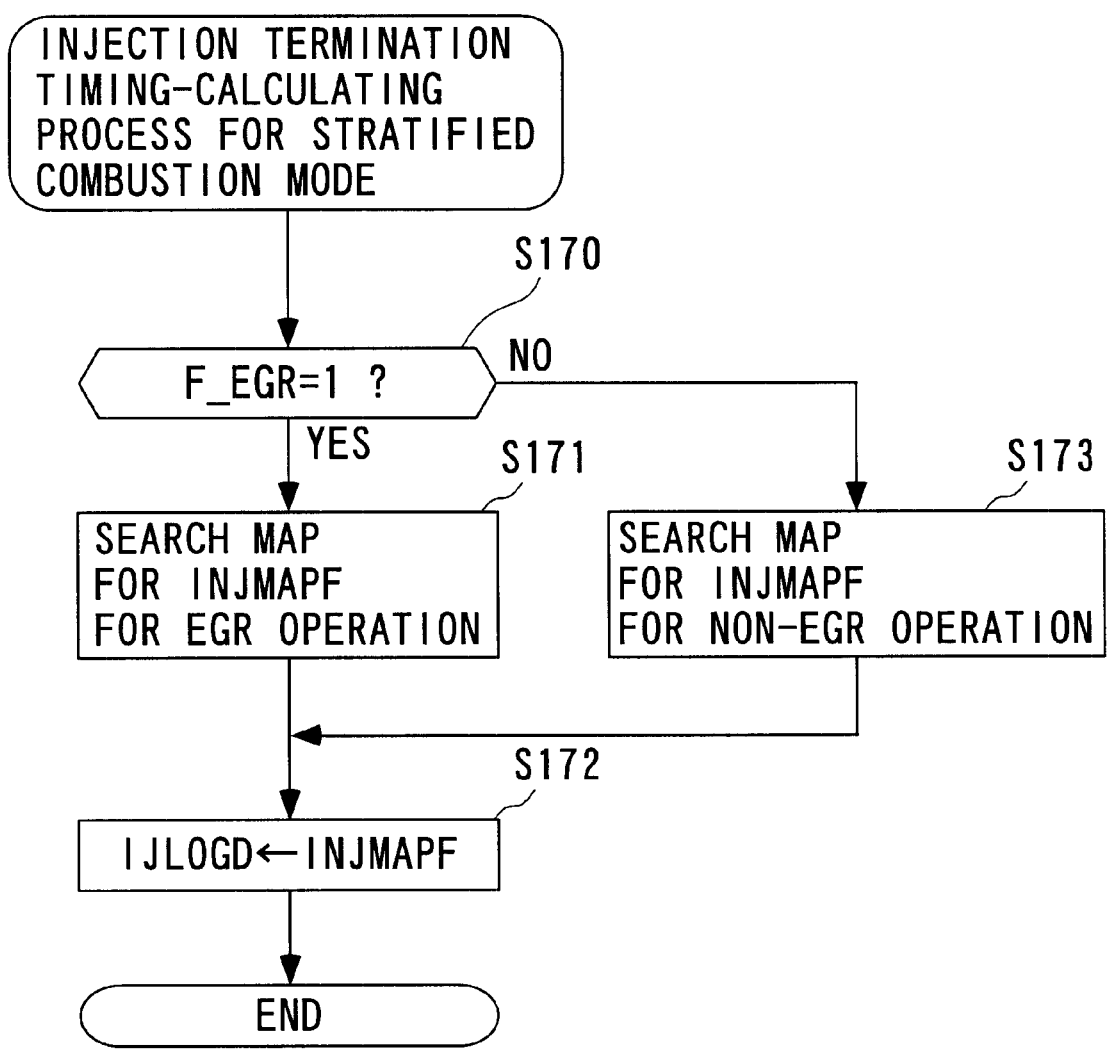
FIG. 15 is a flowchart showing a subroutine for carrying out a fuel injection termination timing-calculating process for a stratified combustion mode, which is executed at a step S136 in FIG. 10.

Next, the injection termination timing-calculating process for the stratified combustion mode, which is executed at the step S136 in FIG. 10, will be described with reference to FIG. 15. In this process, differently from the injection termination timing for the stoichiometric combustion mode and the lean combustion mode, the injection termination timing IJLOGD is calculated as a crank angle position after TDC of the compression stroke.

In the process, first, it is determined at a step S170 whether or not the EGR-permitting flag F__EGR assumes 1. If the answer to the question is affirmative (YES), i.e. if the EGR operation is being carried out, the program proceeds to a step S171, wherein a basic injection termination timing INJMAPF (preset fuel injection timing for the stratified combustion mode) for EGR operation is determined based on the engine rotational speed NE and the final fuel injection time period Tout determined at the step S70.

Then, the program proceeds to a step S172, wherein the basic injection termination timing INJMAPF is set to the injection termination timing IJLOGD for EGR operation, followed by terminating the program.

On the other hand, if the answer to the question of the step S170 is negative (NO), i.e. if the EGR operation is not being carried out, the program proceeds to a step S173, wherein a basic injection termination timing INJMAPF for non-EGR operation is determined, in the same manner as at the step S171. Then, at the step S172, the basic injection termination timing INJMAPF is set to an injection termination timing IJLOGD for non-EGR operation, followed by terminating the program.

Figure 16:
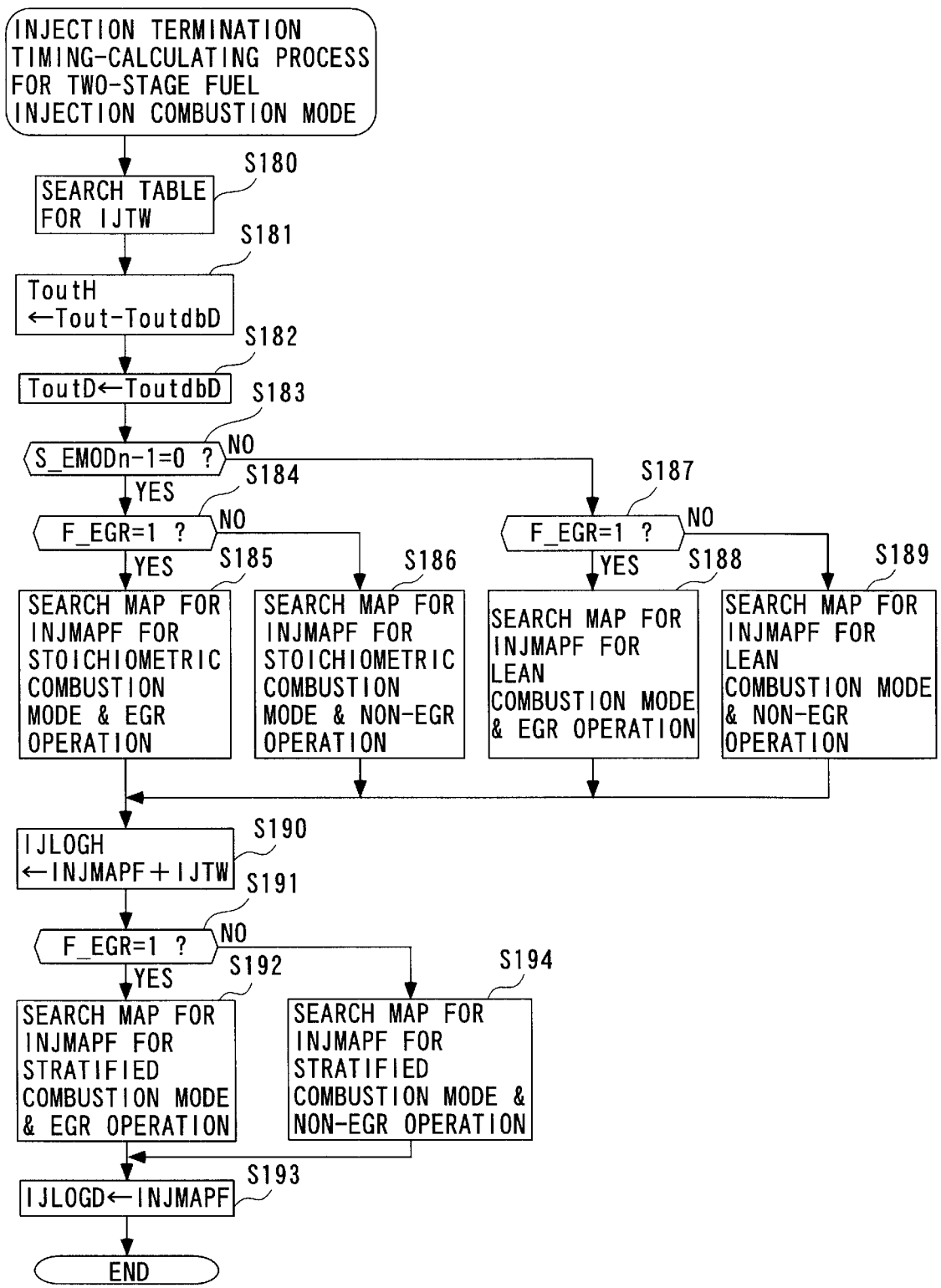
FIG. 16 is a flowchart showing a subroutine for carrying out a fuel injection termination timing-calculating process for a two-stage fuel injection combustion mode, which is executed at a step S140 in FIG. 10.

Next, the injection termination timing-calculating process for the two-stage fuel injection combustion mode executed at the step S140 in FIG. 10 will be described with reference to FIG. 16. In this process, as will be described in detail hereinafter, the two injection termination timings IJLOGH, IJLOGD of the fuel injection timing θinj for the two-stage fuel injection combustion mode are calculated. In this case, the first-stage injection termination timing IJLOGH is calculated as a crank angle position after TDC in the intake stroke, and the second-stage injection termination timing IJLOGD is calculated as a crank angle position after TDC in the compression stroke.

In this process, first, at a step S180, similarly to the steps S150, S160, the coolant temperature-dependent correction coefficient IJTW is determined by searching the TW-IJTW table.

Then, the program proceeds to a step S181, wherein a value obtained by subtracting the compression-stroke injection time period ToutdbD determined at the step S138 from the final fuel injection time period Tout for the two-stage fuel injection combustion mode determined at the step S90 is set to the first-stage injection time period ToutH (fuel injection time period during the intake stroke for the two-stage fuel injection combustion mode).

Then, the program proceeds to a step S182, wherein the compression-stroke injection time period ToutdbD is set to the second-stage injection time period ToutD (injection time period during the compression stroke for the two-stage fuel injection combustion mode).

Next, the program proceeds to a step S183, wherein it is determined whether or not the immediately preceding value S_EMODn-1 of the combustion mode monitor assumes 0. If the answer to this question is affirmative (YES), i.e. if the combustion mode before transition to the two-stage fuel injection combustion mode is the stoichiometric combustion mode, similarly to the step S156 to S158 of the injection termination timing-calculating process for the stoichiometric combustion mode, the following steps S184 to S186 are executed.

More specifically, if the answer to the question of the step S184 is affirmative (YES), i.e. if the EGR operation is being executed, the program proceeds to a step S185, wherein the map used at the step S157 is searched based on the engine rotational speed NE and the first-stage injection time period ToutH determined at the step S181 to determine a basic injection termination timing INJMAPF for the stoichiometric combustion mode and EGR operation.

On the other hand, if the answer to the question of the step S184 is negative (NO), i.e. if the EGR operation is not being executed, the program proceeds to a step S186, wherein in the same manner as at the step S185, a basic injection termination timing INJMAPF for the stoichiometric combustion mode and non-EGR operation is determined by using the map used at the step S158.

On the other hand, if the answer to the question of the step S183 is negative (NO), i.e. if the combustion mode before transition to the two-stage fuel injection combustion mode is not the stoichiometric combustion mode, the following steps S187 to S189 are executed similarly to the steps S161, S162, S164 of the injection termination timing-calculating process for the lean combustion mode.

More specifically, if the answer to the question of the step S187 is affirmative (YES), i.e. if the EGR operation is being executed, the program proceeds to a step S188, wherein in the same manner as at the step S185, a basic injection termination timing INJMAPF for the lean combustion mode and EGR operation is determined by using the map used at the step S162.

On the other hand, if the answer to the question of the step S187 is negative (NO), i.e. if the EGR operation is not being executed, the program proceeds to a step S189, wherein in the same manner as at the step S185, an injection termination timing INJMAPF for the lean combustion mode and non-EGR operation is determined by using the map used at the step S164.

Following any of the steps S185, S186, S188, and S189, the program proceeds to a step S190, wherein a value obtained by adding the temperature-dependent correction term IJTW to the basic injection termination timing INJMAPF is set to the first-stage injection termination timing IJLOGH.

Next, the following steps S191 to S194 are carried out similarly to the steps S170 to S173 of the injection termination timing-calculating process for the stratified combustion mode. More specifically, it is determined at a step S191 whether or not F_EGR assumes 1. If the answer to this question is affirmative (YES), i.e. if the EGR operation is being executed, the program proceeds to a step S192, wherein a basic injection termination timing INJMAPF for the stratified combustion mode and EGR operation is determined by searching the map used at the step S171 based on the engine rotational speed NE and the second-stage injection time period ToutD determined at the step S182. Then, the program proceeds to a step S193, wherein the basic injection termination timing INJMAPF for the stratified combustion mode and EGR operation is set to the second-stage injection termination timing IJLOGD, followed by terminating the program.

On the other hand, if the answer to the question of the step S191 is negative (NO), i.e. if the EGR operation is not being executed, the program proceeds to a step S194, wherein in the same manner as at the step S192, a basic injection termination timing INJMAPF for the stratified combustion mode and non-EGR operation is determined by searching the map used at the step S173, and then the program proceeds to the step S193, wherein the basic injection termination timing INJMAPF is set to the second-stage injection termination timing IJLOGD, followed by terminating the program.

As described above, at the steps S180 to S193, the injection termination timing in the intake stroke for the two-stage fuel injection combustion mode is set to the injection termination timing IJLOGH for the homogeneous combustion mode retrieved from the map for the homogeneous combustion mode, while the injection termination timing in the compression stroke for the same mode is set to the injection termination timing IJLOGD for the stratified combustion mode retrieved from the map for the stratified combustion mode. Therefore, it is not necessary to provide a map additionally to the maps for the homogeneous combustion mode and the stratified combustion mode, whereby the number of ROMs 2c or the capacity of the ROM 2c can be decreased.

Figure 17:
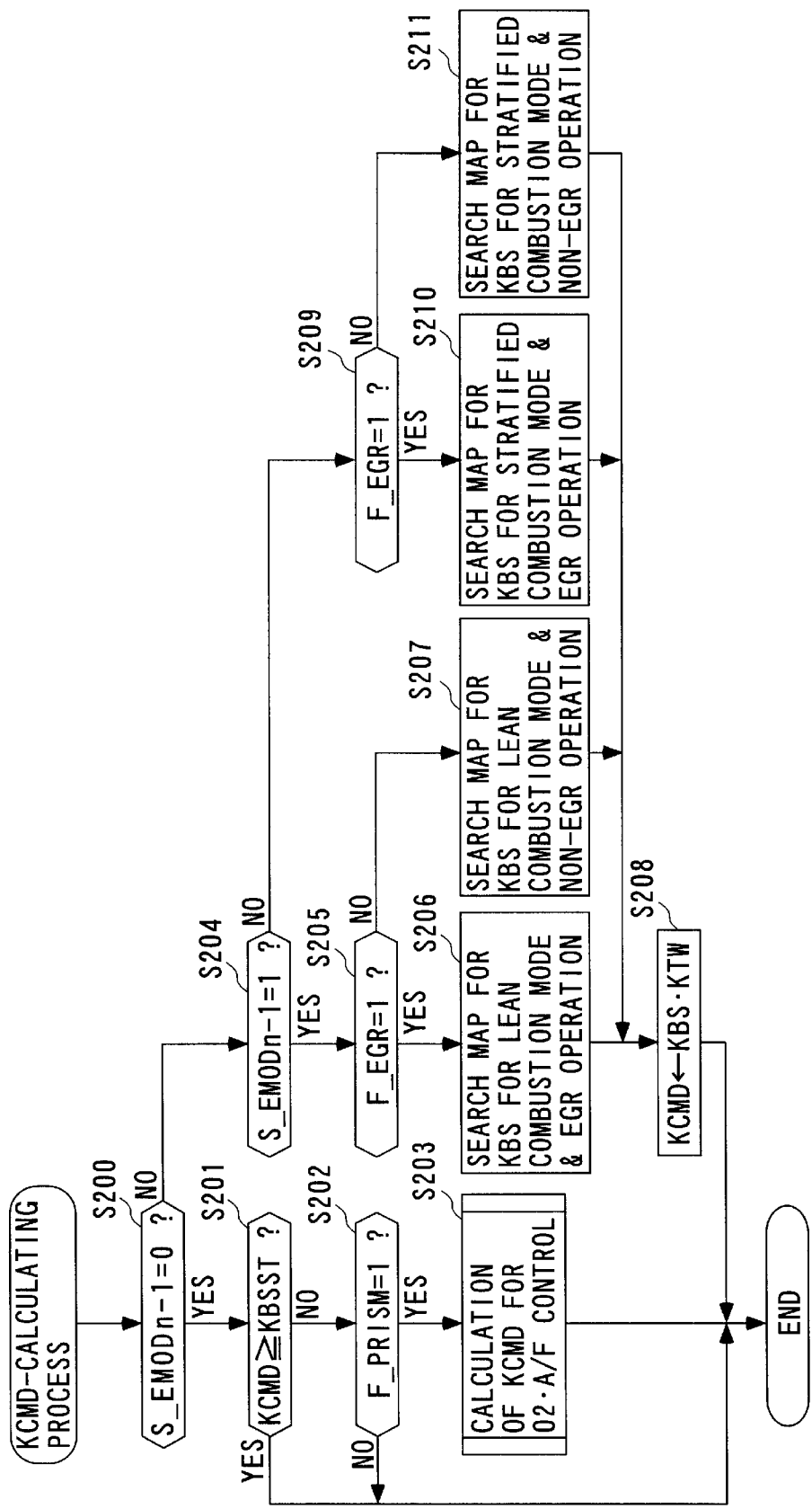
FIG. 17 is a flowchart showing a subroutine for carrying out a KCMD-calculating process which is executed at a step S83 in FIG. 7.

Next, the KCMD-calculating process at the step S83 of the FIG. 7 two-stage fuel injection combustion mode control process will be described with reference to FIG. 17. First, at a step S200, it is determined whether or not the immediately preceding value S_EMODn-1 of the combustion mode monitor assumes 0. If the answer to this question is affirmative (YES), i.e. if the combustion mode before transition to the two-stage fuel injection combustion mode is the stoichiometric combustion mode, the program proceeds to a step S201, wherein it is determined whether or not the immediately preceding value of the final target air-fuel ratio coefficient KCMD stored in the RAM 2b is equal to or higher than a predetermined value KBSST. The predetermined value KBSST is set to a value of the final target air-fuel ratio coefficient KCMD corresponding to the stoichiometric air-fuel ratio.

If the answer to this question is negative (NO), i.e. if the immediately preceding value of the final target air-fuel ratio coefficient KCMD is on a lean side with respect to the stoichiometric air-fuel ratio, the program proceeds to a step S202, wherein it is determined whether or not a flag F_PRISM assumes 1. The flag F_PRISM indicates whether or not the optimum A/F control responsive to the signal from the O2 sensor (hereinafter referred to as "the O2·A/F control") is being executed, and set to 1 when the O2·A/F control is being executed and to 0 when the same is not being executed.

If the answer to this question is affirmative (YES), i.e. if the O2·A/F control is being executed, the program proceeds to a step S203, wherein a KCMD-calculating process for the O2·A/F control is carried out to calculate the final target air-fuel ratio coefficient KCMD, followed by terminating the program.

On the other hand, if the answer to the question of the step S202 is negative (NO), i.e. if the O2·A/F control is not being executed, the program is immediately terminated without updating the immediately preceding value of the final target air-fuel ratio coefficient KCMD stored in the RAM 2b.

On the other hand, if the answer to the question of the step S201 is affirmative (YES), i.e. if the immediately preceding value of the final target air-fuel ratio coefficient KCMD is on a rich side with respect to the stoichiometric air-fuel ratio, the program is also immediately terminated without updating this value.

On the other hand, if the answer to the question of the step S200 is negative (NO), i.e. if the combustion mode before transition to the two-stage fuel injection combustion mode is not the stoichiometric combustion mode, the program process to a step S204, wherein it is determined whether or not the immediately preceding value S_EMODn-1 of the combustion mode monitor assumes 1. If the answer to this question is affirmative (YES), i.e. if the combustion mode before transition to the two-stage fuel injection combustion mode is the lean combustion mode, the program proceeds to a step S205, wherein it is determined whether or not the EGR-permitting flag F_EGR assumes 1.

If the answer to this question is affirmative (YES), i.e. if the EGR operation is being executed, the program proceeds to a step S206, wherein a basic target air-fuel ratio coefficient KBS for the lean combustion mode and EGR operation is determined by searching a map, not shown, based on the demanded torque PME determined at the step S1 and the engine rotational speed NE.

Then, the program proceeds to a step S208, wherein a value obtained by multiplying the basic target air-fuel ratio coefficient KBS by the coolant temperature-dependent correction coefficient KTW determined at the step 6 is set to the final target air-fuel ratio coefficient KCMD, followed by terminating the program.

On the other hand, if the answer to the question of the step S205 is negative (NO), i.e. if the EGR operation is not being executed, the program proceeds to a step S207, wherein in the same manner as at the step S206, a basic target air-fuel ratio coefficient KBS for the lean combustion mode and non-EGR operation is determined. Next, the program proceeds to the step S208, wherein the final target air-fuel ratio coefficient KCMD is calculated, followed by terminating the program.

On the other hand, if the answer to the question of the step S204 is negative (NO), i.e. if the combustion mode before transition to the two-stage fuel injection combustion mode is the stratified combustion mode, similarly to the steps S205 to S206, steps S209 to S211 are carried out. More specifically, if the EGR operation is being executed, in the same manner as at the step S206, a basic target air-fuel ratio coefficient KBS for the stratified combustion mode and EGR operation is determined at steps S209, S210, and then the above step S208 is executed, followed by terminating the program. On the other hand, if the EGR operation is not being executed, in the same manner as at the step S206, a basic target air-fuel ratio coefficient KBS for the stratified combustion mode and non-EGR operation is determined (steps S209, S211), and then the step S208 is executed, followed by terminating the program.

Figure 18:
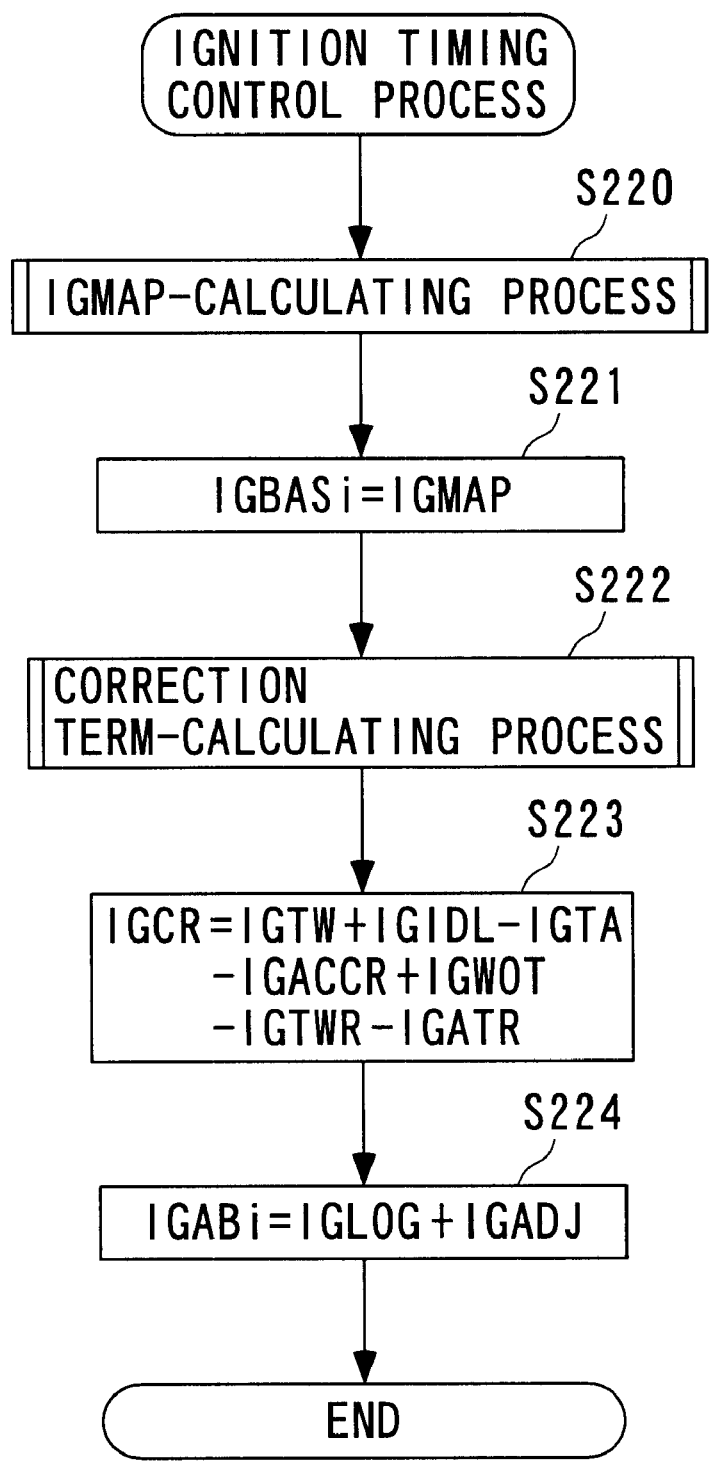
FIG. 18 is a flowchart showing a main routine for carrying out a fuel injection timing control process.

Hereafter, the ignition timing control process will be described with reference to FIGS. 18 to 26. FIG. 18 shows a main routine for this process, which is executed whenever the TDC signal is received, in a manner following the fuel injection control process described above.

Referring to FIG. 18, first, at a step S220, an IGMAP-calculating process, described hereinafter, is carried out to determine a map value IGMAP for injection timing IG. Then, the program proceeds to a step S221, wherein the map value IGMAP determined at the step S220 is set to a basic injection timing IGBASi.

Then, the program proceeds to a step S222, wherein a correction term-calculating process is carried out to calculate correction terms, referred to hereinafter. Then, the program proceeds to a step S223, wherein a total correction term IGCR is calculated by applying the correction terms determined at the step S222 to the following equation (5):

$$IGCR=IGTW+IGIDL-IGTA-IGACCR+IGWOT-IGTWR-IGATR \quad (5)$$

Next, the program proceeds to a step S224, wherein a final injection timing IGABi is calculated by applying a value IGLOG obtained by adding the total correction term IGCR to the basic injection timing IGBASi, to the following equation (6):

$$IGABi=IGLOG+IGADJ=(IGBASi+IGCR)+IGADJ \quad (6)$$

followed by terminating the program. A drive signal based on the final injection timing IGABi is delivered to the spark plug 5 as a signal indicative of the ignition timing IG. In the above equation (6), IGADJ represents a correction term for correcting errors in the detected values of the rotational angles of the crankshaft 3e and the camshaft 6 i.e. deviations from the proper values thereof, and correcting delay of signals from various sensors, and is calculated as a positive or negative value.

Figure 19:
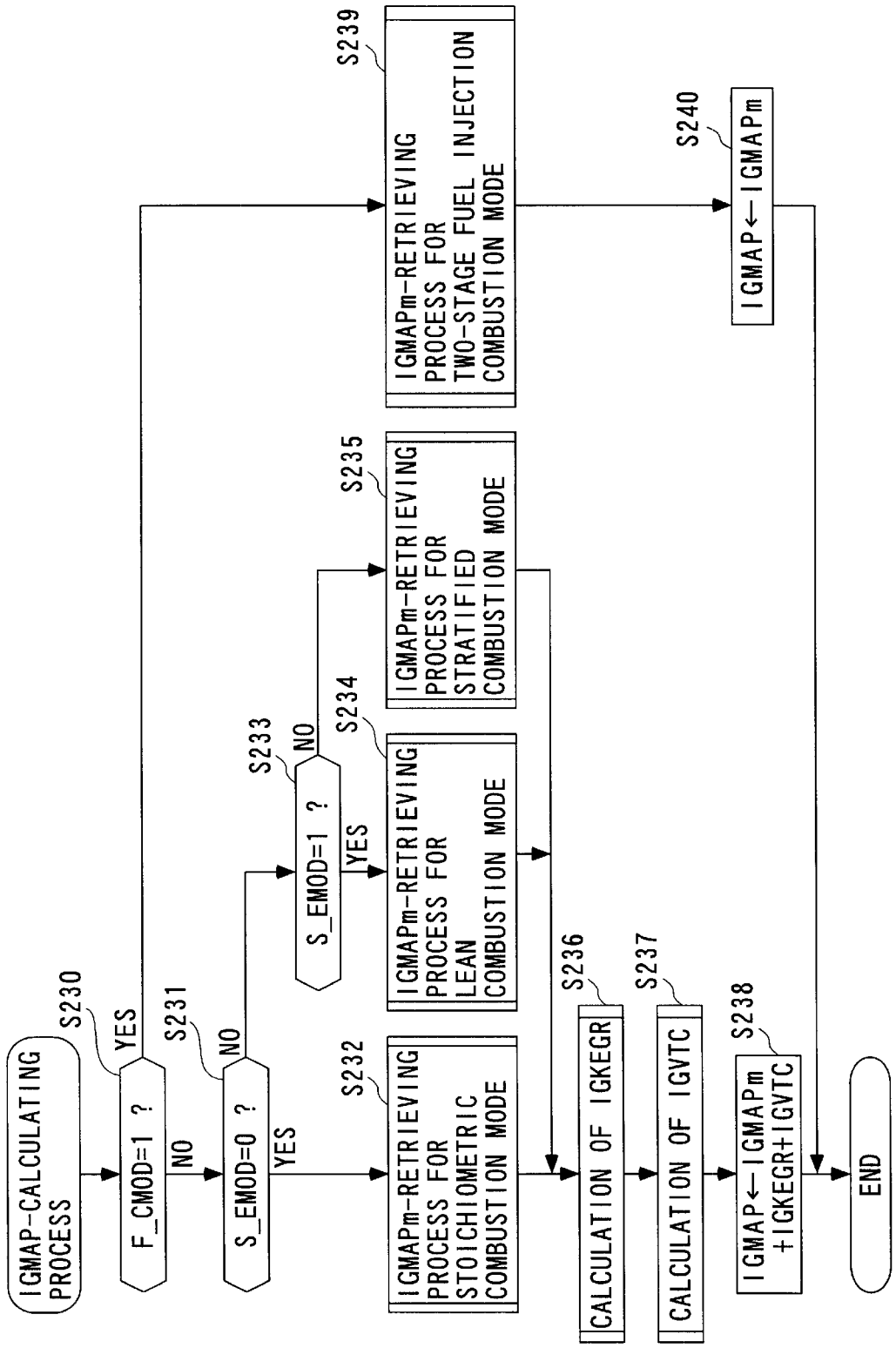
FIG. 19 is a flowchart showing an IGMAP-calculating process which is execute at a step S220 in FIG. 18.

Hereafter, the IGMAP-calculating process executed at the step S220 in FIG. 18 will be described with reference to FIG. 19. First, at a step S230, it is determined whether or not the combustion mode transition flag F_CMOD assumes 1. If the answer to this question is negative (NO), i.e. if the engine 3 is not in the two-stage fuel injection combustion mode, the program proceeds to a step S231, wherein it is determined whether or not the combustion mode monitor S_EMOD assumes 1.

If the answer to this question is affirmative (YES), i.e. if S_EMOD=0 holds, which means that the engine 3 is in the stoichiometric combustion mode, the program proceeds to a step S232, wherein an IGMAPm-retrieving process for the stoichiometric combustion mode is carried out to determine a basic map value IGMAPm for the stoichiometric combustion mode.

On the other hand, if the answer to the question of the step S231 is negative (NO), i.e. if the engine 3 is not in the stoichiometric combustion mode, the program proceeds to a step S233, wherein it is determined whether or not the combustion mode monitor S_EMOD assumes 1. If the answer to this question is affirmative (YES), i.e. if the engine 3 is in the lean combustion mode, the program proceeds to a step S234, wherein an IGMAPm-retrieving process for the lean combustion mode, described hereinafter, is carried out to determine a basic map value IGMAPm for the lean combustion mode.

On the other hand, if the answer to the question of the step S233 is negative (NO), i.e. if S_EMOD=2 holds, which means that the engine 3 is in the stratified combustion mode, the program proceeds to a step S235, wherein an IGMAPm-retrieving process for the stratified combustion mode is carried out to determine a basic map value IGMAPm for the stratified combustion mode.

Following any of IGMAPm-retrieving processes at the above steps S232, S234, and S235, the program proceeds to a step S236, wherein a table, not shown, is searched based on the EGR-dependent correction coefficient KEGR (KEGR determined at any of the steps S22, S42, and S62) for the corresponding combustion mode to determine a KEGR-dependent correction term IGKEGR.

Then, the program proceeds to a step S237, wherein a table, not shown, is searched based on the actual cam phase CAIN, to determine a VTC-dependent correction term IGVTC.

Next, the program proceeds to the step S238, wherein the KEGR-dependent correction term IGKEGR and the VTC-dependent correction term IGVTC are added to the basic map value IGMAPm determined at any of the steps S232, S234, and S235 to thereby determine the map value IGMAP, followed by terminating the program.

On the other hand, if the answer to the question of the step S230 is affirmative (YES), i.e. if the engine 3 is in the two-stage fuel injection combustion mode, the program proceeds to a step S239, wherein a map, not shown, is searched based on the engine rotational speed NE and the second-stage injection termination timing IJLOGD (injection termination timing for the stratified combustion mode) determined at the step S193 to determine the basic map value IGMAPm.

Then, the program proceeds to a step S240, wherein the basic map value IGMAPm is set to the map value IGMAP, followed by terminating the program. Thus, in the two-stage fuel injection combustion mode, the map value IGMAP is determined based on the engine rotational speed NE and the injection termination timing IJLOGD, i.e. the fuel injection timing θinj, for the stratified combustion mode. In this case, as described hereinbefore, the engine rotational speed NE has a significant influence on the stability of combustion in the two-stage fuel injection combustion mode, and at the same time, the fuel injection timing θinj for stratified combustion mode is set to the fuel injection timing during the compression stroke in the two-stage fuel injection combustion mode. The fuel injected this time is involved in the ignition in the two-stage fuel injection combustion mode. Therefore, by setting the map value IGMAP to such a value as will enable the stable ignition in the two-stage fuel injection combustion mode, it is possible to ensure the stable combustion of the engine.

Figure 20:
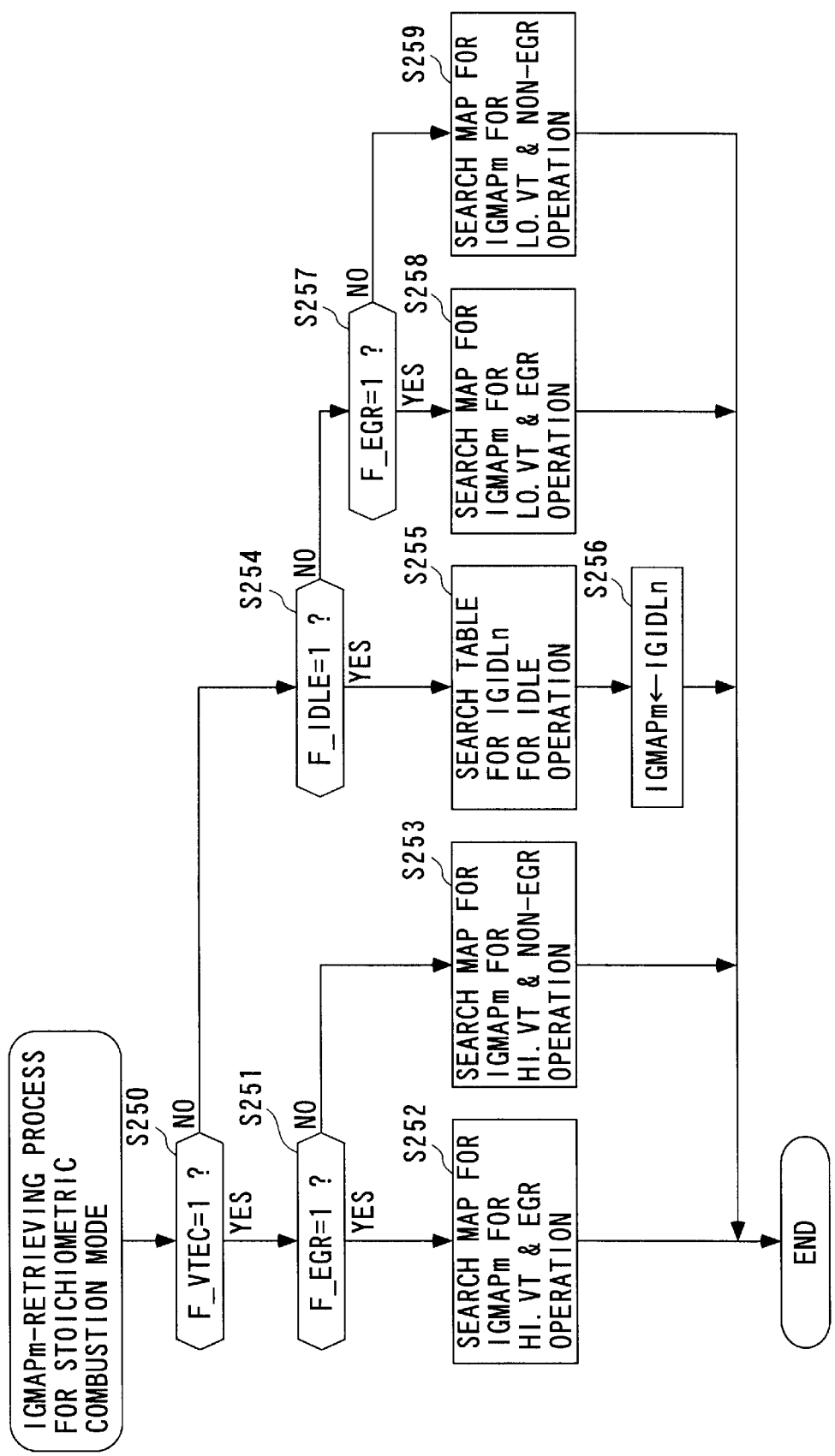
FIG. 20 is a flowchart showing an IGMAPm-retrieving process for the stoichiometric combustion mode, which is execute at a step S232 in FIG. 19.

Next, the IGMAPm-retrieving process for the stoichiometric combustion mode executed at the step S232 in FIG. 19 will be described with reference to FIG. 20. In this process, the basic map value IGMAPm is determined. First, at a step S250, it is determined whether or not the VTEC-permitting flag F_VTEC assumes 1. If the answer to this question is affirmative (YES), i.e. if the valve timing is set to HI.VT, the program proceeds to a step S251, wherein it is determined whether or not the EGR-permitting flag F_EGR assumes 1.

If the answer to this question is affirmative (YES), i.e. if the EGR operation is being executed, the program proceeds to a step S252, wherein a map, not shown, is searched based on the engine rotational speed NE and the demanded torque PME determined at the step S1 to determine a basic map value IGMAPm for HI.VT and EGR operation, followed by terminating the program.

On the other hand, if the answer to the question of the step S251 is negative (NO), i.e. if the EGR operation is not being executed, the program proceeds to a step S253, wherein in the same manner as at the step S252, a basic map value IGMAPm for HI.VT and non-EGR operation is determined, followed by terminating the program.

On the other hand, if the answer to the question of the step S250 is negative (NO), i.e. if the valve timing is set to LO.VT, the program proceeds to a step S254, wherein it is determined whether or not the idle flag F_IDLE assumes 1.

If the answer to this question is affirmative (YES), i.e. if the engine 3 is idling, the program proceeds to a step S255, wherein a table, not shown, is searched based on a target idle rotational speed NOBJ to determine a map value IGIDLn for idle operation. Then, the program proceeds to a step s256, wherein the map value IGIDLn for idle operation is set to the basic map value IGMAPm, followed by terminating the program.

On the other hand, if the answer to the question of the step S254 is negative (NO), i.e. if the engine 3 is not idling, the program proceeds to a step S257, wherein it is determined whether or not the EGR-permitting flag F_EGR assumes 1.

If the answer to this question is affirmative (YES), i.e. if the EGR operation is being executed, the program proceeds to a step S258, wherein in the same manner as at the step S252, a basic map value IGMAPm for LO.VT and EGR operation is determined, followed by terminating the program.

On the other hand, if the answer to the question of the step S257 is negative (NO), i.e. if the EGR operation is not being carried out, the program proceeds to a step S259, wherein in the same manner as at the step S252, a basic map value IGMAPm for LO.VT and non-EGR operation is determined, followed by terminating the program.

Figure 21:
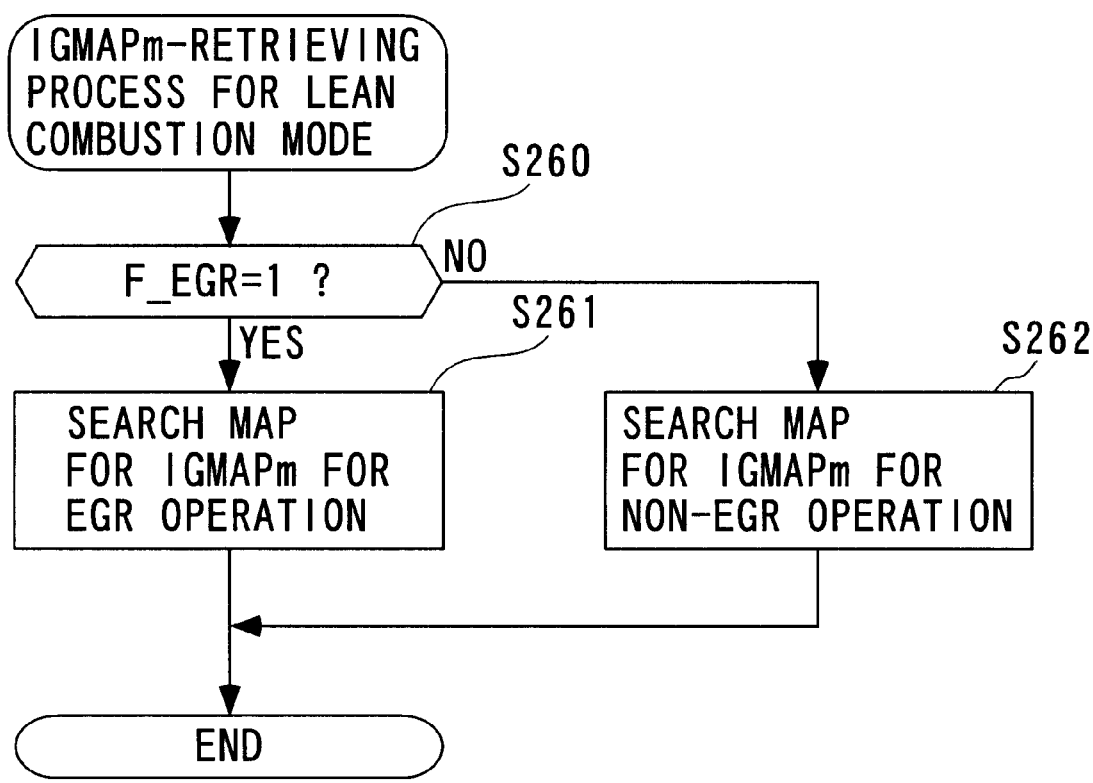
FIG. 21 is a flowchart showing an IGMAPm-retrieving process for the lean combustion mode, which is execute at a step S234 in FIG. 19.

Next, the IGMAPm-retrieving process for the lean combustion mode executed at the step S234 in FIG. 19 will be described with reference to FIG. 21. First, at a step S260, it is determined whether or not the EGR-permitting flag F_EGR assumes 1.

If the answer to this question is affirmative (YES), i.e. if the EGR operation is not being carried out, the program proceeds to a step S261, wherein a map, not shown, is searched based on the engine rotational speed NE and the demanded torque determined at the step S1, to determine a basic map value IGMAPm for EGR operation, followed by terminating the program.

On the other hand, if the answer to the question of the step S260 is negative (NO), i.e. if the EGR operation is not being carried out, the program proceeds to a step S262, wherein in the same manner as at the step S261, a basic map value IGMAPm for non-EGR operation is determined, followed by terminating the present program.

Figure 22:
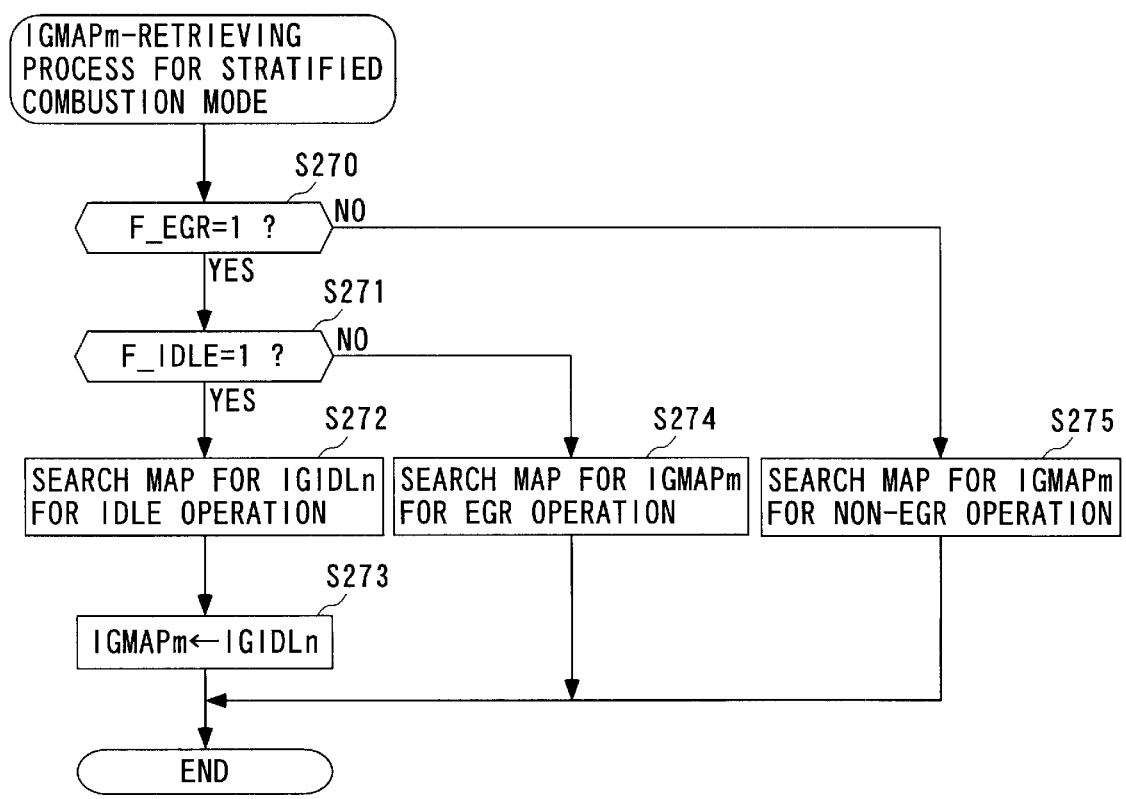
FIG. 22 is a flowchart showing an IGMAPm-retrieving process for the stratified combustion mode, which is execute at a step S235 in FIG. 19.

Next, the IGMAPm-retrieving process for the stratified combustion mode at the step S235 in FIG. 19 will be described with reference to FIG. 22. First, at the step S270, it is determined whether or not the EGR-permitting flag F_EGR assumes 1.

If the answer to this question is affirmative (YES), i.e. if the EGR operation is being carried out, the program proceeds to a step S271, wherein it is determined whether or not the idle flag F_IDLE assumes 1.

If the answer to this question is affirmative (YES), i.e. if the engine 3 is idling, the program proceeds to a step S272, wherein a map, not shown, is searched based on the injection termination timing IJLOGD during the compression stroke determined at the step S172 or at the step S193 and the engine rotational speed NE, to determine a map value IGIDLn for idle operation. Then, the program proceeds to a step S273, wherein the map value IGIDLn for idle operation is set to the basic map value IGMAPm, followed by terminating the program.

On the other hand, if the answer to the question of the step S271 is negative (NO), i.e. if the engine 3 is not idling, the program proceeds to a step S274, wherein a map, not shown, is searched based on the injection termination timing IJLOGD during the compression stroke determined at the step S172 or at the step 193 and the engine rotational speed NE, to determine a basic map value IGMAPm for EGR operation, followed by terminating the program.

On the other hand, if the answer to the question of the step S270 is negative (NO), i.e. if the EGR operation is not being carried out, the program proceeds to a step S275, wherein in the same manner as at the step S274, a basic map value IGMAPm for non-EGR operation is determined based on the injection termination timing IJLOGD during the compression stroke determined at the step S172 or the step S193 and the engine rotational speed NE, followed by terminating the program.

Figure 23:
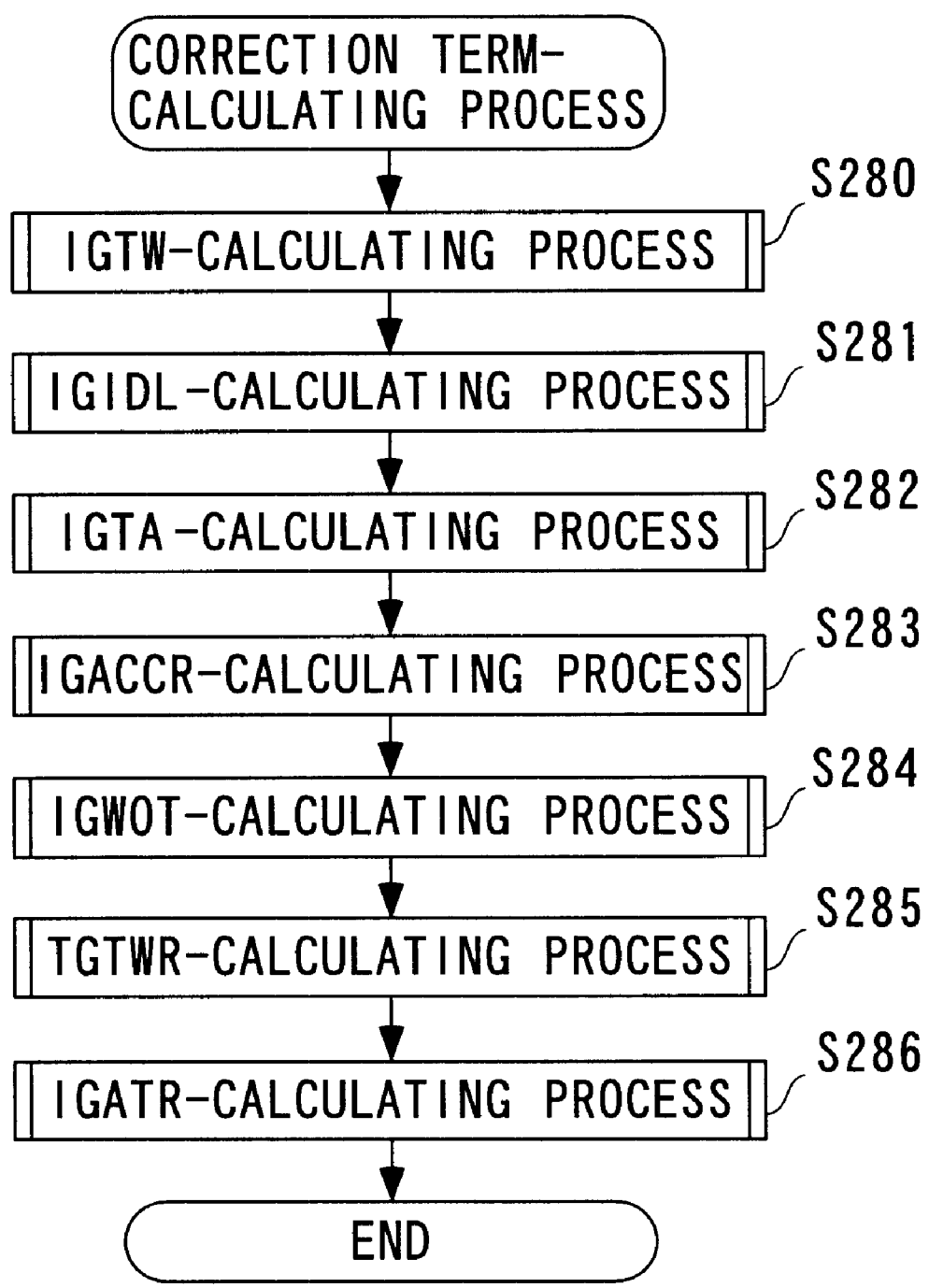
FIG. 23 is a flowchart showing a correction term-calculating process which is executed at a step S222 in FIG. 18.

Next, the correction term-calculating process executed at the step S222 in FIG. 18 will be described with reference to FIG. 23. As shown in the figure, first, at a step S280, an IGTW-calculating process is carried out. More specifically, a table, not shown, is searched based on the engine coolant temperature TW, to determine a low coolant temperature-dependent correction term IGTW.

Next, the program proceeds to a step S281, wherein an IGIDL-calculating process is carried out. In this process, a table, not shown, is searched based on the engine rotational speed NE during idle operation, to determine an idle rotation-dependent correction term IGIDL.

Then, the program proceeds to a step S282, wherein an IGTA-calculating process is carried out. More specifically, a table, not shown, is searched based on the intake air temperature TA to determine an intake air temperature-dependent correction term IGTA.

Then, the program proceeds to a step S283, wherein an IGACCR-calculating process is carried out. More specifically, a table, not shown, is searched based on a vehicle acceleration ACCR to determine an acceleration-dependent correction term IGACCR.

Next, the program proceeds to a step S284, wherein an IGWOT-calculating process is carried out. More specifically, a table, not shown, is searched in dependence on whether the throttle valve opening TH detected by the throttle valve opening sensor 32 is fully open, to determine a full open throttle-dependent correction term IGWOT.

Then, the program proceeds to a step S285, wherein an IGTWR-calculating process is carried out. Details of the this process will be described hereinafter.

Next, the program proceeds to a step S286, wherein an IGATR-calculating process is carried out, followed by terminating the present program. In this process, a table, not shown, is searched based on a gear stage NGAR of the automatic transmission detected by the gear stage sensor 31 to determine an AT shift-dependent correction term IGATR.

Figure 24:
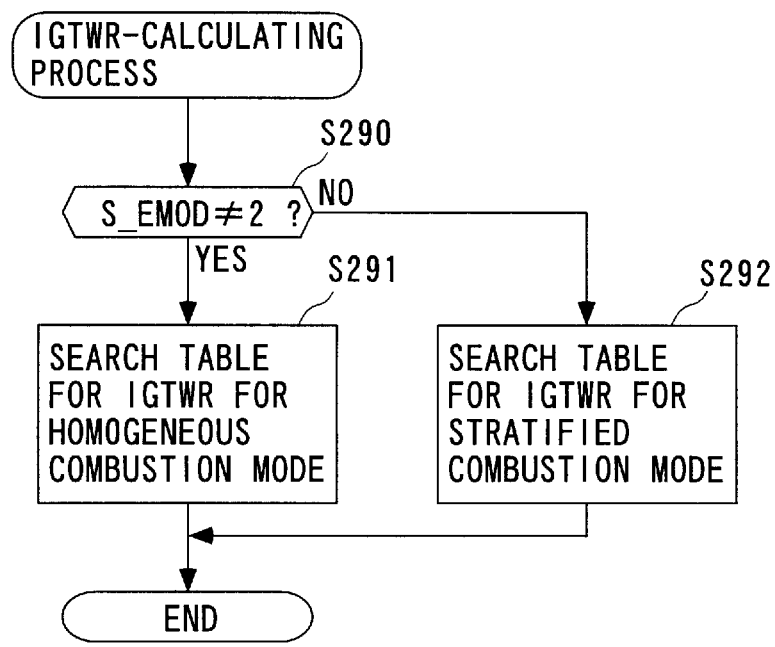
FIG. 24 is a flowchart showing a subroutine for carrying out an IGTWR-calculating process which is executed at a step 285 in FIG. 23.
Figure 25:
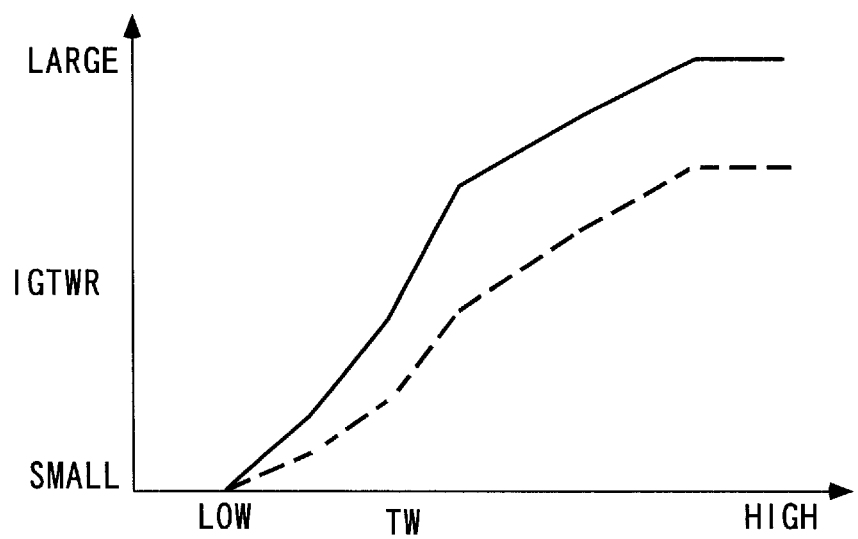
FIG. 25 shows an example of a TW-IGTWR table for use in the IGTWR-calculating process in FIG. 24.

Next, the IGTWR-calculating process executed at the step S285 in FIG. 23 will be described with reference to FIG. 24. As shown in the figure, in this process, first at a step S290, it is determined whether or not S_EMOD≠2 holds. If the answer to this question is affirmative (YES), i.e. if the engine 3 is not in the stratified combustion mode, the program proceeds to a step S291, wherein a TW-IGTWR table an example of which is shown in FIG. 25 is searched based on the engine coolant temperature TW to calculate a high engine coolant temperature-dependent correction term IGTWR, followed by terminating the present program.

In the TW-IGTWR table, a curve in the solid line indicates table values of the high coolant temperature-dependent correction term IGTWR, and the table is configured such that the table value increases as the engine coolant temperature TW is higher, for the following reason: As shown in the equation (5) used at the step S223, the high coolant temperature-dependent correction term IGTWR is a subtrahend term, and hence as this value is larger, the final ignition timing IGABi, i.e. the ignition timing IG is retarded. On the other hand, in the homogeneous combustion, in general, as the engine coolant temperature TW is higher, the combustion temperature becomes higher, which causes the knocking to more readily occur. Therefore, the ignition timing IG is retarded to a larger degree by setting the high coolant temperature-dependent correction term IGTWR to a larger value as the engine coolant temperature TW is higher, thereby enabling prevention of knocking.

On the other hand, if the answer to the question of the step S290 is negative (NO), i.e. if the engine 3 is in the stratified combustion mode, the program proceeds to a step S292, wherein the high coolant temperature-dependent correction term IGTWR is calculated in the same manner as at the step S291 to calculate the high coolant temperature-dependent correction term IGTWR for the stratified combustion mode, followed by terminating the program. In this case, a curve indicated by a broken line in FIG. 25 represents table values of the high coolant temperature-dependent correction term IGTWR for the stratified combustion mode. As is apparent from the figure, this table is configured such that the table value has a tendency similar to that for the homogeneous combustion mode but is smaller than the same. That is, the amount of retardation of the ignition timing IG is configured to be smaller than that for the homogeneous combustion mode, for the following reasons (1) and (2):

(1) First, in the stratified combustion mode, fuel is injected to the recess 3d of the piston 3a, and the fuel is evaporated by thermal exchange with this portion of the piston 3a to generate an air-fuel mixture, so that as the engine coolant temperature TW is higher, the evaporation of the mixture is promoted.

(2) Further, in the stratified combustion mode, the air-fuel mixture is ignited at the time of reaching the vicinity of the spark plug 5, and the mixture at the time of ignition is surrounded by air, so that knocking hardly occurs differently from the case of the homogeneous combustion mode.

Figure 26:
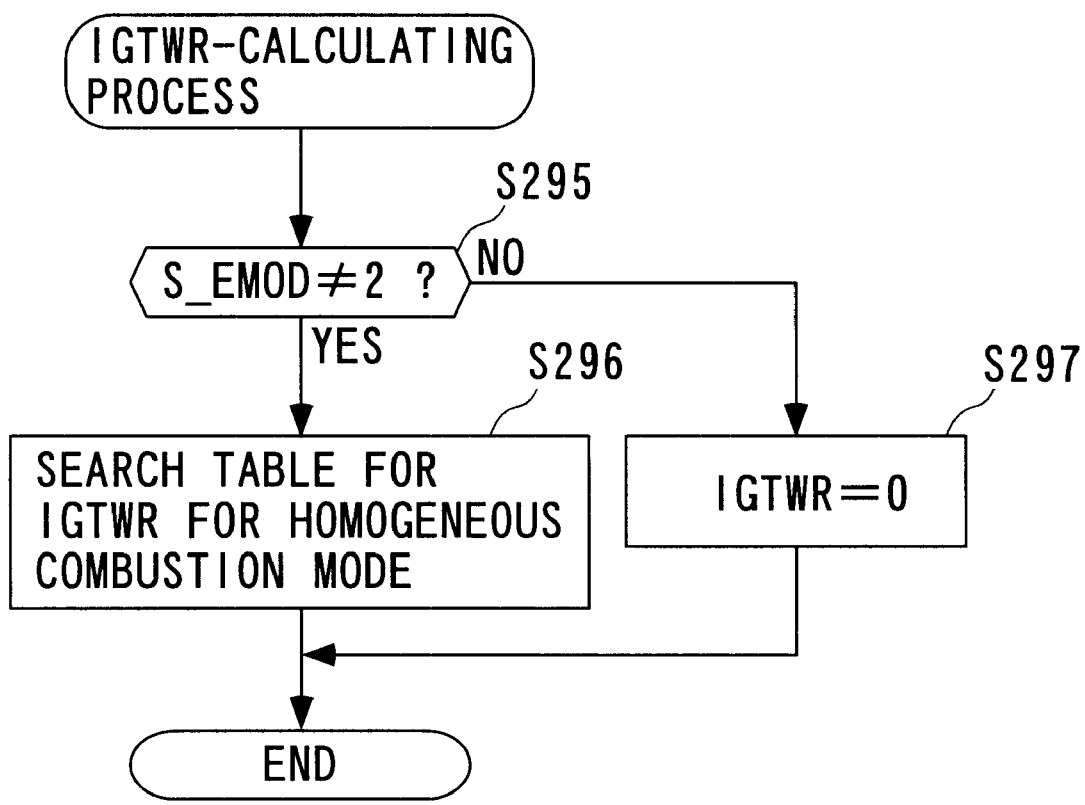
FIG. 26 is a flowchart showing a variation of the IGTWR-calculating process executed at the step S285 in FIG. 23.

It should be noted that the IGTWR-calculating process may be executed in a manner illustrated in FIG. 26. As shown in this figure, steps S295, S296 of this process are the same as the steps S290, S291 in FIG. 24, and hence only a step S297 will be described. At the step S297, the high coolant temperature-dependent correction term IGTWR for the stratified combustion mode is set to a value of 0. That is, in this process, when the engine is in the stratified combustion mode, the retardation of the ignition timing by the high coolant temperature-dependent correction term IGTWR is omitted. This is because knocking hardly occurs in the stratified combustion mode as described above.

Figure 27:
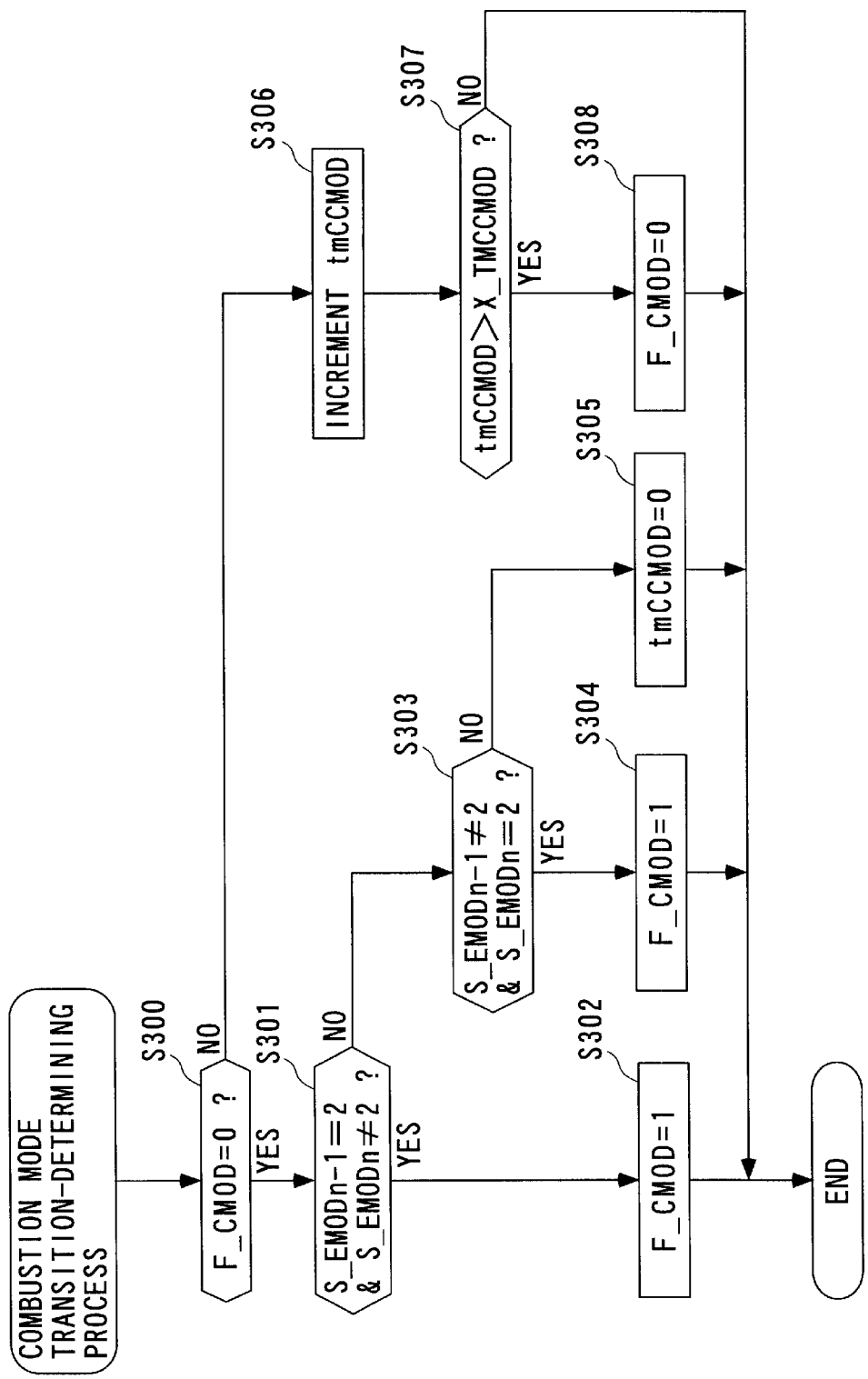
FIG. 27 is a flowchart showing a routine for carrying out a combustion mode transition-determining process.

Next, the combustion mode transition-determining process carried out for transition between the homogeneous combustion mode and the stratified combustion mode will be described with reference to FIG. 27. This process is executed whenever a predetermined time period (e.g. 10 msec.) elapses, according to settings of a program timer.

First, at a step S300, it is determined whether or not the combustion mode transition flag F_CMOD assumes 0. If the answer to this question is affirmative (YES), i.e. if the engine 3 is not in the two-stage fuel injection combustion mode, the program proceeds to a step S301, wherein it is determined whether or not the immediately preceding value S_EMODn-1 of the combustion mode monitor S_EMOD assumes 2 and at the same time the present value S_EMODn does not assume 2. This is for determining whether or not the operating region of the engine 3 has shifted from the stratified combustion region to the homogeneous combustion region shown in FIG. 3.

If the answer to this question is affirmative (YES), it is judged that the operating region of the engine 3 has shifted in the present loop from the stratified combustion region to the homogeneous combustion region, so that the two-stage fuel injection combustion mode should be started, and hence the program proceeds to a step S302, wherein the combustion mode transition flag F_CMOD indicative of this fact is set to 1, followed by terminating the program.

On the other hand, if the answer to the question of the step S301 is negative (NO), the program proceeds to a step S303, wherein it is determined whether or not the immediately preceding value S_EMODn-1 of the combustion mode monitor S_EMOD does not assume 2, but at the same time the present value S_EMODn assumes 2. If the answer to this question is affirmative (YES), it is judged that the operating region of the engine 3 has shifted in the present loop from the homogeneous combustion region to the stratified combustion region, and hence the engine 3 should be caused to enter the two-stage fuel injection combustion mode, so that the program proceeds to a step S304, wherein similarly to the step S302, the combustion mode transition flag F_CMOD is set to 1, followed by terminating the program.

If the answer to the question of the step S303 is negative (NO), i.e. if the operating region of the engine 3 has not shifted in the present loop between the stratified combustion region and the homogeneous combustion region, the program proceeds to a step S305, wherein the count tmCCMOD of a two-stage fuel injection combustion mode timer is set to 0, followed by terminating the program. The two-stage fuel injection combustion mode timer determines the termination timing of a duration period of the two-stage fuel injection combustion mode.

On the other hand, if the answer to the question of the step S300 is negative (NO), i.e. if the engine 3 is in the two-stage fuel injection combustion mode, the program proceeds to a step S306, wherein the count tmCCMOD of the two-stage fuel injection combustion mode timer is incremented. Then, the program proceeds to a step S307, wherein the count tmCCMOD incremented at the step S306 has exceeded a predetermined time period X_TMCCMOD (value corresponding to this period). The predetermined time period X_TMCCMOD (parameter indicative of response of the EGR control valve 16) represents the response of the EGR control valve 16, and set as a closing time period which the EGR valve 16 takes to close from a valve lift amount of 100% to a valve lift amount of 5%.

If the answer to this question is negative (NO), i.e. if tmCCMOD≦X_TMCCMOD holds, which means that the predetermined time period X_TMCCMOD has not elapsed from the start of the two-stage fuel injection combustion mode, the present program is immediately terminated to continue the two-stage fuel injection combustion mode.

On the other hand, if the answer to the question of the step S307 is affirmative (YES), i.e. if tmCCMOD >X_TMCCMOD holds, which means the predetermined time period X_TMCCMOD has elapsed after the start of the two-stage fuel injection combustion mode, it is determined that the two-stage fuel injection combustion mode should be terminated, so that the program proceeds to a step S308, wherein the combustion mode flag F_CMOD is set to 0 to indicate the above fact, followed by terminating the program.

As described above, the duration period of the two-stage fuel injection combustion mode is determined based on the predetermined time period X_TMCCMOD which is the closing time period which the EGR control valve 16 takes to close. As described above, the target valve lift amount LCMD of the EGR control valve 16 generally increases between the stratified combustion mode and the homogeneous combustion mode. Therefore, during transition between these modes, it takes time for the EGR control valve 16 to change to the target valve lift amount LCMD for the mode after the transition. Therefore, by setting the predetermined time period X_TMCCMOD which takes the response of the EGR control valve 16 into account, to the duration period of the two-stage fuel injection combustion mode as described above, the two-stage fuel injection combustion mode can be continued until the valve lift amount of the EGR control valve 16 is positively changed to that for the combustion mode after the two-stage fuel injection combustion mode. As a result, the stable combustion upon termination of the two-stage fuel injection combustion mode can be ensured, whereby e.g. stable drivability can be ensured with small changes in engine output between before and after the two-stage fuel injection combustion mode. Further, since the duration period of the two-stage fuel injection combustion mode is determined as described above, it is possible to reduce the duration period to a minimum required period, whereby degradation of exhaust emission characteristics due to an increase in NOx can be controlled to the lower level.

Figure 28:
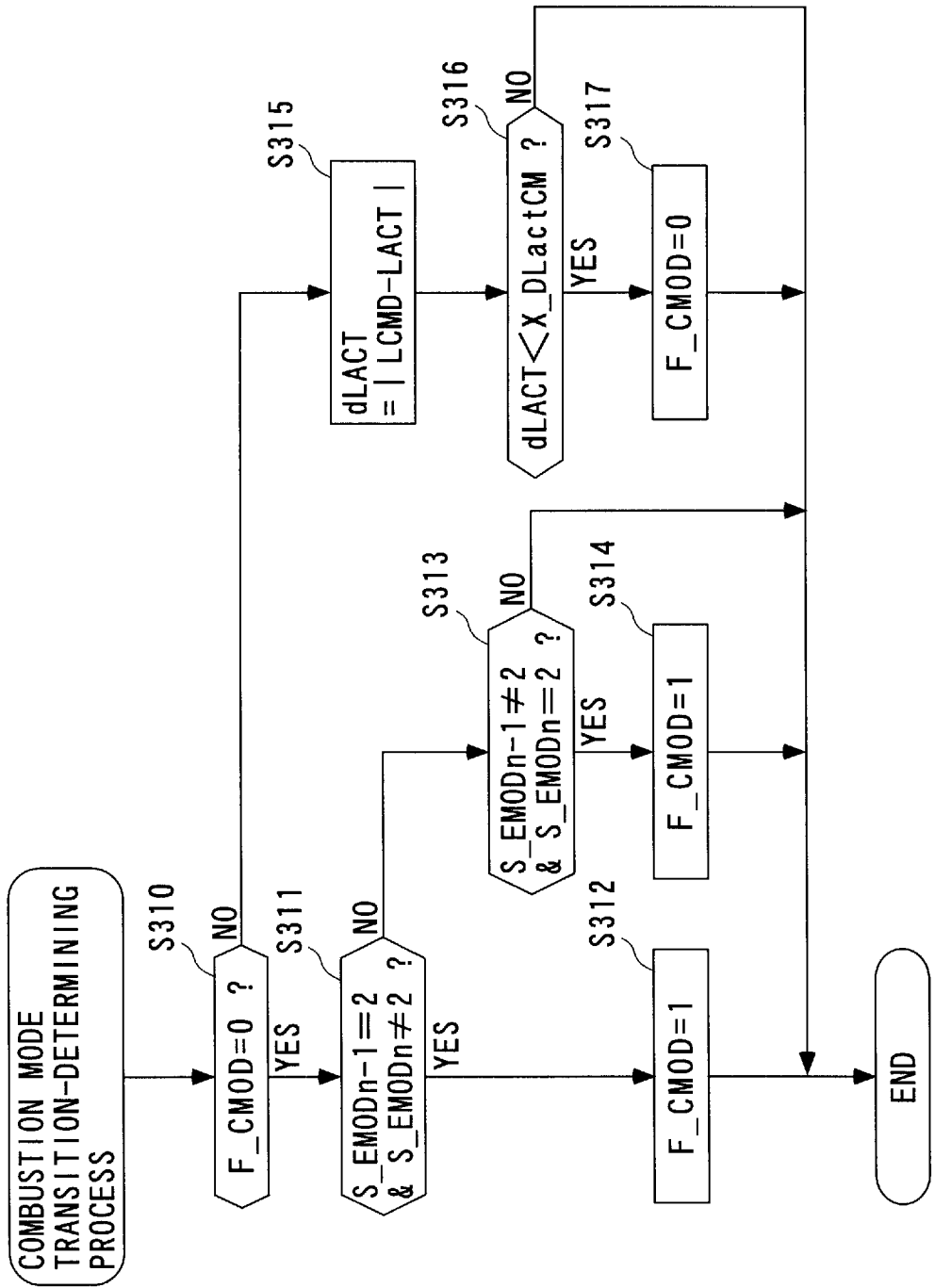
FIG. 28 is a flowchart showing a variation of the subroutine for carrying out the combustion mode transition-determining process.

It should be noted that the combustion mode transition-determining process may be carried out by a method illustrated in FIG. 28 in place of the method described above. The method illustrated in FIG. 28 determines the duration period of the two-stage fuel injection combustion mode by using a difference dLACT in valve lift amount in place of the count of the two-stage fuel injection combustion mode timer. As shown in FIG. 28, steps S310 to S314 are the same as the steps S300 to S304 of the FIG. 27 process, so that detailed description of the steps S310 to S314 is omitted, but only different points will be described.

In the process, if the answer to the question of the step S313 is negative (NO), i.e. if the engine 3 is not in the two-stage fuel injection combustion mode, the present program is immediately terminated.

On the other hand, if the answer to the question of the step S310 is negative (NO), i.e. if F_CMOD=1 holds, the program proceeds to a step S315, wherein the difference dLACT in valve lift amount is calculated. The difference dLACT (parameter indicative of the response of the EGR control valve 16) is calculated as the absolute value of a difference between the target valve lift amount LCMD and the actual valve lift amount LACT detected by the valve lift amount sensor 26.

Next, the program proceeds to a step S316, wherein it is determined whether or not the difference dLACT calculated at the step S315 is smaller than a predetermined difference X_DlactCM. The predetermined difference X_DlactCM is a threshold value for determining whether or not the actual valve lift amount LACT of the EGR control valve 16 is converged or changed to the target valve lift amount LCMD, and represents the response of the EGR control valve 16.

If the answer to this question is negative (NO), i.e. if dLACT≧X_DlactCM holds, it is judged that the actual lift amount LACT is not close enough to the target valve lift amount LACT, so that the program is immediately terminated.

On the other hand, if the answer to the question of the step S316 is affirmative (YES), i.e. if dLACT<X_DlactCM holds, it is judged that the actual valve lift amount of the EGR control valve 16 has become close enough to the target valve lift amount LCMD after the start of the two-stage fuel injection combustion mode, so that to terminate the two-stage fuel injection combustion mode, the program proceeds to a step S317, wherein the combustion mode transition flag F_CMOD is set to 0 to indicate this fact, followed by terminating the program. As described above, depending on whether the difference dLACT has become smaller than the predetermined difference X_DlactCM, i.e. if the actual valve lift amount of the EGR control valve 16 has substantially reached the target valve lift amount LCMD, the termination timing of the two-stage fuel injection combustion mode is determined, so that the same advantageous effects as obtained by the FIG. 27 process can be obtained.

As described above, according to the control system 1 of the present embodiment, the fuel injection time period ToutD (=ToutdbD) which corresponds to a fuel injection amount during the compression stroke in the two-stage fuel injection combustion mode is determined based on the engine rotational speed NE. This enables the fuel injection time period ToutD during the compression stroke in the two-stage fuel injection combustion mode to be set to the minimum amount in which injected fuel can be ignited, while causing a change in the state of flow of air within the cylinder caused by a change in the engine rotational speed NE to be reflected thereon even when this change occurs. Conversely, it is possible to secure as long a fuel injection time period ToutH as possible during the intake stroke in which a mixture in an easily flammable condition is produced. As a result, it is possible to ensure stable combustion of fuel injected in the two-stage fuel injection combustion mode as well as excellent fuel economy and drivability.

Further, the injection termination timings IJLOGH, IJLOGD during the intake stroke and the compression stroke in the two-stage fuel injection combustion mode are determined as the injection termination timings IJLOGH, IJLOGD for the homogeneous combustion mode and the stratified combustion mode, respectively. More specifically, they are calculated by using the basic injection termination timing INJMAPF for the homogeneous combustion mode and that for the stratified combustion mode stored in the ROM 2c and the coolant temperature-dependent correction term IJTW, independence on the engine coolant temperature TW, the engine rotational speed NE and the fuel injection time periods ToutH, ToutD. This makes it possible to execute the fuel injection at proper timings during the intake stroke and the compression stroke, respectively, in the two-stage fuel injection combustion mode, and since it is not necessary to provide a ROM or the like separately or additionally for use in determining the fuel injection termination timings IJLOGH, IJLOGD, or increase the capacity thereof for the same purpose, the manufacturing costs can be reduced by so much amount.

Further, since the map value IGMAP of the ignition timing IG in the two-stage fuel injection combustion mode is determined based on the engine rotational speed NE which has a significant influence on the stability of combustion in this mode and the fuel injection terminations timing IJLOGD for the stratified combustion mode, it is possible to ensure further stable combustion by setting the map value IGMAP to a value that ensures stable ignition in the two-stage fuel injection combustion mode.

Further, the duration period of the two-stage fuel injection combustion mode is determined based on the predetermined time period X_TMCCMOD or the difference dLACT, in which the response of the EGR control valve 16 is taken into account. This enables the two-stage fuel injection combustion mode to be continued until the actual valve lift amount LACT of the EGR control valve 16 is positively changed substantially to the target valve lift amount LCMD for the combustion mode after the two-stage fuel injection combustion mode. As a result, the stable combustion after the two-stage fuel injection combustion mode can be ensured, whereby stable drivability in which the engine output variation is small can be ensured. Further, since the duration period of the two-stage fuel injection combustion mode is determined as described above, it can be reduced to the minimum required time period, whereby the degradation of fuel economy can be prevented.

Further, in accordance with each combustion mode, the final target air-fuel ratio KCMD, the target valve lift amount LCMD, fuel injection timing θinj, and the ignition timing IG are set, and the use of the thus determined values of these parameters for fuel injection control enables the two-stage fuel injection combustion mode and the combustion modes before and after the two-stage fuel injection combustion mode to be controlled such that the torque generated by the engine 3 becomes equal to the demanded torque PME. As a result, differently from the prior art, it is possible to prevent torque steps from occurring upon the start and the termination of the two-stage fuel injection combustion mode.

Further, particularly in the case of an internal combustion engine of in-cylinder injection type as in the present embodiment, in which the injector 4 is disposed substantially in the center of a top wall of the combustion chamber 3c, and fuel is injected from the injector 4 toward the piston 3a, it has been confirmed by experiment that the advantageous effects of the present embodiment described above can be obtained in an optimized manner, though data of the experiment is not shown here.

It should be noted that the invention is not particularly limited to the engine 3 of in-cylinder injection type having each injector 4 is arranged in a substantially control potion of a top wall of a corresponding combustion chamber 3c, according to the present embodiment, but the invention can be applied to other engines of in-cylinder injection type which has injectors differently arranged, for instance.

It is further understood by those skilled in the art that the foregoing is a preferred embodiment of the invention, and that various changes and modifications may be made without departing from the spirit and scope thereof.

What is claimed is:

1. A control system for an internal combustion engine of an in-cylinder fuel injection type, the engine being operated while switching a combustion mode thereof between a homogeneous combustion mode in which fuel injection into each cylinder is performed during an intake stroke, a stratified combustion mode in which the fuel injection into the cylinder is performed during a compression stroke, and a two-stage fuel injection combustion mode in which the fuel injection into the cylinder is performed once during the intake stroke and once during the compression stroke during transition between the homogeneous combustion mode and the stratified combustion mode, the control system comprising:
a demanded torque-calculating module for calculating a demanded torque which is demanded of the engine;
an engine rotational speed-detecting module for detecting a rotational speed of the engine;
a combustion mode-determining module for determining, based on the calculated demanded torque, which of the homogeneous combustion mode, the stratified combustion mode, and the two-stage fuel injection combustion mode should be selected as the combustion mode; and
a fuel injection amount-determining module for determining an amount of fuel to be injected during the compression stroke in the two-stage fuel injection combustion mode, based on the detected rotational speed of the engine.

2. A control system according to claim 1, further including:
a storage module for storing data of a fuel injection timing for the homogeneous combustion mode and a fuel injection timing for the stratified combustion mode, which are set in advance in a manner correlated to an operating condition of the engine;
an operating condition-detecting module for detecting the operating condition of the engine; and
a fuel injection timing-setting module for setting a fuel injection timing during the intake stroke and a fuel injection timing during the compression stroke in the two-stage fuel injection combustion mode, to the fuel injection timing for the homogeneous combustion mode and the fuel injection timing for the stratified combustion mode, respectively, in dependence on the detected operating condition of the engine.

3. A control system according to claim 2, further including an ignition timing-determining module for determining ignition timing for the two-stage fuel injection combustion mode, based on the detected rotational speed of the engine and the fuel injection timing for the stratified combustion mode.

4. A control system according to claim 3, wherein the engine includes an intake system, and
the control system further including:
an EGR control valve for controlling an EGR rate at which exhaust gases are recirculated into the intake system; and
a duration period-determining module for determining a duration period of the two-stage fuel injection combustion mode, based on a parameter indicative of response of the EGR control valve.

5. A control system according to claim 3, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

6. A control system according to claim 2, wherein the engine includes an intake system, and
the control system further including:
an EGR control valve for controlling an EGR rate at which exhaust gases are recirculated into the intake system; and
a duration period-determining module for determining a duration period of the two-stage fuel injection combustion mode, based on a parameter indicative of response of the EGR control valve.

7. A control system according to claim 2, wherein the homogeneous combustion mode comprises a stoichiometric combustion mode in which an air-fuel mixture having an air-fuel ratio equal to or richer than a stoichiometric air fuel ratio is burned, and a lean combustion mode in which an air-fuel mixture having an air-fuel ratio leaner than the stoichiometric air-fuel ratio is burned, and wherein said fuel injection timing-setting module sets the fuel injection timing during the intake stroke in the two-stage fuel injection combustion mode to a fuel injection timing for the stoichiometric combustion mode when a combustion mode preceding the two-stage fuel injection combustion mode is the stoichiometric combustion mode, and to a fuel injection timing for the lean combustion mode when the combustion mode preceding the two-stage fuel injection combustion mode is other than the stoichiometric combustion mode.

8. A control system according to claim 2, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

9. A control system according to claim 1, wherein the engine includes an intake system, and
the control system further including:
an EGR control valve for controlling an EGR rate at which exhaust gases are recirculated into the intake system; and
a duration period-determining module for determining a duration period of the two-stage fuel injection combustion mode, based on a parameter indicative of response of the EGR control valve.

10. A control system according to claim 9, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

11. A control system according to claim 1, wherein said fuel injection amount-determining module sets the amount fuel to be injected during the compression stroke in the two-stage fuel injection combustion mode to a smaller valve as the rotational speed of the engine is higher.

12. A control system according to claim 11, including an applied mode-changing module for causing a total amount of fuel for the two-stage fuel injection combustion mode to be injected at an injection timing for the stratified combustion mode, if a sum total of the amount of fuel to be injected during the compression stroke in the two-stage fuel injection combustion mode determined by said fuel injection amount-determining module and a predetermined fuel injection amount is equal to or smaller than the total amount of fuel.

13. A control system according to claim 1, further including an operation control values-setting module for setting at least a target air-fuel ratio, a target EGR rate, a fuel injection timing, and an ignition timing, in dependence on the combustion mode determined to be selected.

14. A control system according to claim 1, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

15. A control method for an internal combustion engine of an in-cylinder fuel injection type, the engine being operated while switching a combustion mode thereof between a homogeneous combustion mode in which fuel injection into each cylinder is performed during an intake stroke, a stratified combustion mode in which the fuel injection into the cylinder is performed during a compression stroke, and a two-stage fuel injection combustion mode in which the fuel injection into the cylinder is performed once during the intake stroke and once during the compression stroke during transition between the homogeneous combustion mode and the stratified combustion mode, the control method comprising the steps of:
calculating a demanded torque which is demanded of the engine;
detecting a rotational speed of the engine;
determining, based on the calculated demanded torque, which of the homogeneous combustion mode, the stratified combustion mode, and the two-stage fuel injection combustion mode should be selected as the combustion mode; and
determining an amount of fuel to be injected during the compression stroke in the two-stage fuel injection combustion mode, based on the detected rotational speed of the engine.

16. A control method according to claim 15, further including the steps of:
storing data of a fuel injection timing for the homogeneous combustion mode and a fuel injection timing for the stratified combustion mode, which are set in advance in a manner correlated to an operating condition of the engine;
detecting the operating condition of the engine; and
setting a fuel injection timing during the intake stroke and a fuel injection timing during the compression stroke in the two-stage fuel injection combustion mode, to the fuel injection timing for the homogeneous combustion mode and the fuel injection timing for the stratified combustion mode, respectively, in dependence on the detected operating condition of the engine.

17. A control method according to claim 16, further including the step of determining ignition timing for the two-stage fuel injection combustion mode, based on the detected rotational speed of the engine and the fuel injection timing for the stratified combustion mode.

18. A control method according to claim 17, wherein the engine includes an intake system and an EGR control valve, and
the control method further including the steps of:
controlling an EGR rate at which exhaust gases are recirculated into the intake system via the EGR control valve; and
determining a duration period of the two-stage fuel injection combustion mode, based on a parameter indicative of response of the EGR control valve.

19. A control method according to claim 17, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

20. A control method according to claim 16, wherein the engine includes an intake system and an EGR control valve, and
the control method further including the steps of:
controlling an EGR rate at which exhaust gases are recirculated into the intake system via the EGR control valve; and
determining a duration period of the two-stage fuel injection combustion mode, based on a parameter indicative of response of the EGR control valve.

21. A control method according to claim 16, wherein the homogeneous combustion mode comprises a stoichiometric combustion mode in which an air-fuel mixture having an air-fuel ratio equal to or richer than a stoichiometric air fuel ratio is burned, and a lean combustion mode in which an air-fuel mixture having an air-fuel ratio leaner than the stoichiometric air-fuel ratio is burned, and wherein the step of setting the fuel injection timing includes setting the fuel injection timing during the intake stroke in the two-stage fuel injection combustion mode to a fuel injection timing for the stoichiometric combustion mode when a combustion mode preceding the two-stage fuel injection combustion mode is the stoichiometric combustion mode, and to a fuel injection timing for the lean combustion mode when the combustion mode preceding the two-stage fuel injection combustion mode is other than the stoichiometric combustion mode.

22. A control method according to claim 16, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

23. A control method according to claim 15, wherein the engine includes an intake system and an EGR control valve, and
the control method further including the steps of:
controlling an EGR rate at which exhaust gases are recirculated into the intake system via the EGR control valve; and
determining a duration period of the two-stage fuel injection combustion mode, based on a parameter indicative of response of the EGR control valve.

24. A control method according to claim 23, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

25. A control method according to claim 15, wherein the step of determining the amount of fuel to be injected includes setting the amount fuel to be injected during the compression stroke in the two-stage fuel injection combustion mode to a smaller valve as the rotational speed of the engine is higher.

26. A control method according to claim 25, including the step of causing a total amount of fuel for the two-stage fuel injection combustion mode to be injected at an injection timing for the stratified combustion mode, if a sum total of the amount of fuel to be injected during the compression stroke in the two-stage fuel injection combustion mode determined by the step of determining the amount of fuel to be injected and a predetermined fuel injection amount is equal to or smaller than the total amount of fuel.

27. A control method according to claim 15, including the step of setting at least a target air-fuel ratio, a target EGR rate, a fuel injection timing, and an ignition timing, in dependence on the combustion mode determined to be selected.

28. A control method according to claim 15, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

29. An engine control unit including a control program for causing a computer to carry out control of an internal combustion engine of an in-cylinder fuel injection type, the engine being operated while switching a combustion mode thereof between a homogeneous combustion mode in which fuel injection into each cylinder is performed during an intake stroke, a stratified combustion mode in which the fuel injection into the cylinder is performed during a compression stroke, and a two-stage fuel injection combustion mode in which the fuel injection into the cylinder is performed once during the intake stroke and once during the compression stroke during transition between the homogeneous combustion mode and the stratified combustion mode, wherein the control program causes the computer to calculate a demanded torque which is demanded of the engine, detect a rotational speed of the engine, determine, based on the calculated demanded torque, which of the homogeneous combustion mode, the stratified combustion mode, and the two-stage fuel injection combustion mode should be selected as the combustion mode, and determine an amount of fuel to be injected during the compression stroke in the two-stage fuel injection combustion mode, based on the detected rotational speed of the engine.

30. An engine control unit according to claim 29, wherein the control program further causes the computer to store data of a fuel injection timing for the homogeneous combustion mode and a fuel injection timing for the stratified combustion mode, which are set in advance in a manner correlated to an operating condition of the engine, detect the operating condition of the engine, and set a fuel injection timing during the intake stroke and a fuel injection timing during the compression stroke in the two-stage fuel injection combustion mode, to the fuel injection timing for the homogeneous combustion mode and the fuel injection timing for the stratified combustion mode, respectively, in dependence on the detected operating condition of the engine.

31. An engine control unit according to claim 30, wherein the control program further causes the computer to determine ignition timing for the two-stage fuel injection combustion mode, based on the detected rotational speed of the engine and the fuel injection timing for the stratified combustion mode.

32. An engine control unit according to claim 31, wherein the engine includes an intake system and an EGR control valve, and wherein the control program further causes the computer to control an EGR rate at which exhaust gases are recirculated via the EGR control valve into the intake system, and determine a duration period of the two-stage fuel injection combustion mode, based on a parameter indicative of response of the EGR control valve.

33. An engine control unit according to claim 31, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

34. An engine control unit according to claim 30, wherein the engine includes an intake system and an EGR control valve, and wherein the control program further causes the computer to control an EGR rate at which exhaust gases are recirculated via the EGR control valve into the intake system, and determine a duration period of the two-stage fuel injection combustion mode, based on a parameter indicative of response of the EGR control valve.

35. An engine control unit according to claim 30, wherein the homogeneous combustion mode comprises a stoichiometric combustion mode in which an air-fuel mixture having an air-fuel ratio equal to or richer than a stoichiometric air fuel ratio is burned, and a lean combustion mode in which an air-fuel mixture having an air-fuel ratio leaner than the stoichiometric air-fuel ratio is burned, and wherein when the control program causes the computer to set the fuel injection timing the control program causes the computer to set the fuel injection timing during the intake stroke in the two-stage fuel injection combustion mode to a fuel injection timing for the stoichiometric combustion mode when a combustion mode preceding the two-stage fuel injection combustion mode is the stoichiometric combustion mode, and to a fuel injection timing for the lean combustion mode when the combustion mode preceding the two-stage fuel injection combustion mode is other than the stoichiometric combustion mode.

36. An engine control unit according to claim 30, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

37. An engine control unit according to claim 29, wherein the engine includes an intake system and an EGR control valve, and wherein the control program further causes the computer to control an EGR rate at which exhaust gases are recirculated via the EGR control valve into the intake system, and determine a duration period of the two-stage fuel injection combustion mode, based on a parameter indicative of response of the EGR control valve.

38. An engine control unit according to claim 37, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

39. An engine control unit according to claim 29, wherein when the control program causes the computer to determine the amount of fuel to be injected, the control program causes the computer to set the amount fuel to be injected during the compression stroke in the two-stage fuel injection combustion mode to a smaller valve as the rotational speed of the engine is higher.

40. An engine control unit according to claim 39, wherein the control program causes the computer to cause a total amount of fuel for the two-stage fuel injection combustion mode to be injected at an injection timing for the stratified combustion mode, if a sum total of the determined amount of fuel to be injected during the compression stroke in the two-stage fuel injection combustion mode and a predetermined fuel injection amount is equal to or smaller than the total amount of fuel.

41. An engine control unit according to claim 29, wherein the control program causes the computer to set at least a target air-fuel ratio, a target EGR rate, a fuel injection timing, and an ignition timing, in dependence on the combustion mode determined to be selected.

42. An engine control unit according to claim 29, wherein the engine includes a fuel injection valve for injecting the fuel into the cylinder, the cylinder having a top wall facing a combustion chamber, and wherein the fuel injection valve is arranged in a central portion of the top wall such that the fuel injection valve injects the fuel downward therefrom.

43. A control system for an internal combustion engine of an in-cylinder fuel injection type, the engine being operated while switching a combustion mode thereof between a homogeneous combustion mode in which fuel injection into each cylinder is performed during an intake stroke, a stratified combustion mode in which the fuel injection into the cylinder is performed during a compression stroke, and a two-stage fuel injection combustion mode in which the fuel injection into the cylinder is performed once during the intake stroke and once during the compression stroke during transition between the homogeneous combustion mode and the stratified combustion mode, the control system comprising;

a demanded torque-calculating module for calculating a demanded torque which is demanded of the engine;

an engine rotational speed-detecting module for detecting a rotational speed of engine;

a combustion mode-determining module for determining, based on the calculated demanded torque, which of the homogeneous combustion mode, the stratified combustion mode, and the two-stage fuel injection combustion mode should be selected as the combustion mode;

a total fuel injection amount determining module for determining a total amount of fuel to be injected in the two-stage fuel injection combustion mode;

a compression stroke fuel injection amount determining module for determining an amount of fuel to be injected during the compression stroke in the two-stage fuel injection combustion mode, based on the detected rotational speed of the engine; and an intake stroke fuel injection amount-determining module for determining an amount of fuel to be injected during the intake stroke in the two-stage fuel injection combustion mode, based on the determined total fuel injection amount and the determined intake stroke fuel injection amount.

44. A control method for an internal combustion engine of an in-cylinder fuel injection type, the engine being operated while switching a combustion mode thereof between a homogeneous combustion mode in which fuel injection into each cylinder is performed during an intake stroke, a stratified combustion mode in which the fuel injection into the cylinder is performed during a compression stroke, and a two-stage fuel injection combustion mode in which the fuel injection into the cylinder is performed once during the intake stroke and once during the compression stroke during transition between the homogeneous combustion mode and the stratified combustion mode, the control method comprising the steps of;

calculating a demanded torque which is demanded of the engine;

detecting a rotational speed of engine;

determining, based on the calculated demanded torque, which of the homogeneous combustion mode, the stratified combustion mode, and the two-stage fuel injection combustion mode should be selected as the combustion mode;

determining a total amount of fuel to be injected in the two-stage fuel injection combustion mode;

determining an amount of fuel to be injected during the compression stroke in the two-stage fuel injection combustion mode, based on the detected rotational speed of the engine; and determining an amount of fuel to be injected during the intake stroke in the two-stage fuel injection combustion mode, based on the determined total fuel injection amount and the determined intake stroke fuel injection amount.

45. An engine control unit including a control program for causing a computer to carry out control for an internal combustion engine of an in-cylinder fuel injection type, the engine being operated while switching a combustion mode thereof between a homogeneous combustion mode in which fuel injection into each cylinder is performed during an intake stroke, a stratified combustion mode in which the fuel injection into the cylinder is performed during a compression stroke, and a two-stage fuel injection combustion mode in which the fuel injection into the cylinder is performed once during the intake stroke and once during the compression stroke during transition between the homogeneous combustion mode and the stratified combustion mode, wherein the control program causes the computer to calculate a demanded torque which is demanded of the engine, detect a rotational speed of engine, determine, based on the calculated demanded torque, which of the homogeneous combustion mode, the stratified combustion mode, and the two-stage fuel injection combustion mode should be selected as the combustion mode, determine a total amount of fuel to be injected in the two-stage fuel injection combustion mode, determine an amount of fuel to be injected during the compression stroke in the two-stage fuel injection combustion mode, based on the detected rotational speed of the engine, and determine an amount of fuel to be injected during the intake stroke in the two-stage fuel injection combustion mode, based on the determined total fuel injection amount and the determined intake stroke fuel injection amount.

* * * * *